United States Patent
Koto et al.

(10) Patent No.: US 11,696,525 B2
(45) Date of Patent: Jul. 11, 2023

(54) AUTOMATIC TRAVEL WORK MACHINE, AUTOMATIC TRAVEL GRASS MOWER, GRASS MOWER, AND GRASS MOWER AUTOMATIC TRAVEL SYSTEM

(71) Applicant: Kubota Corporation, Osaka (JP)

(72) Inventors: Hiroshi Koto, Amagasaki (JP); Yasushi Watabe, Amagasaki (JP); Taro Nakamura, Sakai (JP); Junichiro Takiguchi, Sakai (JP); Yusuke Minakata, Amagasaki (JP); Takanori Kobayashi, Amagasaki (JP); Masahiro Kawabata, Amagasaki (JP)

(73) Assignee: Kubota Corporation, Osaka (JP)

( * ) Notice: Subject to any disclaimer, the term of this patent is extended or adjusted under 35 U.S.C. 154(b) by 447 days.

(21) Appl. No.: 16/771,264

(22) PCT Filed: Dec. 19, 2018

(86) PCT No.: PCT/JP2018/046872
§ 371 (c)(1),
(2) Date: Jun. 10, 2020

(87) PCT Pub. No.: WO2019/124463
PCT Pub. Date: Jun. 27, 2019

(65) Prior Publication Data
US 2020/0375095 A1  Dec. 3, 2020

(30) Foreign Application Priority Data

Dec. 19, 2017 (JP) .................................. 2017-242685
Dec. 19, 2017 (JP) .................................. 2017-242686

(Continued)

(51) Int. Cl.
*A01D 34/00* (2006.01)
*A01D 34/125* (2006.01)
*A01D 34/28* (2006.01)

(52) U.S. Cl.
CPC ......... *A01D 34/008* (2013.01); *A01D 34/125* (2013.01); *A01D 34/28* (2013.01)

(58) Field of Classification Search
CPC .... A01D 34/008; A01D 34/125; A01D 34/28; A01D 34/64; G05D 2201/0201;
(Continued)

(56) References Cited

U.S. PATENT DOCUMENTS

2013/0282224 A1\* 10/2013 Yazaki ................. G05D 1/0219
701/24

FOREIGN PATENT DOCUMENTS

JP      9107717 A    4/1997
JP      H9107717 A   4/1997

(Continued)

OTHER PUBLICATIONS

Machine Translation of JP 2013/253928 (Year: 2013).\*

*Primary Examiner* — Alan D Hutchinson
(74) *Attorney, Agent, or Firm* — The Webb Law Firm

(57) ABSTRACT

The present invention provides an autonomous traveling work machine that can accurately receive positioning signals from navigation satellites and autonomously travel without deviating from a traveling path, even in the case of an inclined slope. The autonomous traveling work machine includes a traveling machine body, a positioning receiver that receives positioning signals from navigation satellites, an autonomous traveling control device that performs control for autonomous traveling along traveling paths based on the positioning signals, an inclination detection unit that detects the inclination of the traveling machine body and (Continued)

outputs inclination angle information, an inclination angle determination unit that determines an inclination angle based on the inclination angle information, and a rotation control mechanism that rotates the positioning receiver with one or more degrees of freedom. The rotation control mechanism keeps the positioning receiver horizontal based on the inclination angle.

8 Claims, 30 Drawing Sheets

(30) Foreign Application Priority Data

Dec. 19, 2017 (JP) .................................. 2017-242687
Dec. 19, 2017 (JP) .................................. 2017-242688

(58) Field of Classification Search
CPC ................. G05D 1/027; G05D 1/0278; G05D 2201/0208; G05D 1/021; A01B 69/00; A01B 69/008; G01S 19/14; G01S 19/36
See application file for complete search history.

(56) References Cited

FOREIGN PATENT DOCUMENTS

| | | |
|---|---|---|
| JP | 2009265941 A | 11/2009 |
| JP | 2011142900 A | 7/2011 |
| JP | 2013253928 A | 12/2013 |
| JP | 201629912 A | 3/2016 |
| JP | 2016187978 A | 11/2016 |
| JP | 2016189172 A | 11/2016 |
| JP | 2017182376 A | 10/2017 |

* cited by examiner

AUTOMATIC TRAVEL WORK MACHINE, AUTOMATIC TRAVEL GRASS MOWER, GRASS MOWER, AND GRASS MOWER AUTOMATIC TRAVEL SYSTEM

CROSS-REFERENCE TO RELATED APPLICATIONS

This application is the United States national phase of International Application No. PCT/JP2018/046872 filed Dec. 19, 2018, and claims priority to Japanese Patent Application Nos. 2017-242685, 2017-242686, 2017-242687, and 2017-242688, all filed Dec. 19, 2017, the disclosures of which are hereby incorporated by reference in their entirety.

TECHNICAL FIELD

The present invention relates to an autonomous traveling work machine that includes a traveling machine body, a positioning receiver that receives a positioning signal from a navigation satellite, and an autonomous traveling control device for autonomous traveling along a traveling path based on the positioning signal.

The present invention also relates to an autonomous traveling mowing machine that includes a traveling machine body that performs traveling mowing and a discharge mechanism that discharges cut grass from a discharge opening to the mowed ground surface.

The present invention also relates to a mowing machine that includes a traveling machine body that performs traveling mowing, a travel control unit that controls the traveling machine body, and a distance sensor.

The present invention also relates to an autonomous traveling system for a mowing machine that performs autonomous traveling mowing in a pre-set traveling area on a slope.

BACKGROUND ART

Background Art 1

As one example, Patent Document 1 discloses a remote control mowing machine that includes a traveling machine body ("frame 1-5" in the document), a positioning receiver ("GPS device 4" in the document) that obtains position information regarding the mowing machine, and an autonomous traveling control device ("control device 3" in the document) that performs traveling and mowing along a stored traveling route based on the position information.

Background Art 2

As another example, Patent Document 2 discloses an automatic mowing machine that includes a traveling machine body ("vehicle body 3" in the document) that performs traveling mowing, a detection device ("object detection unit 11" in the document) that detects an object located in a work region, a target line calculation unit ("reference line setting unit 13" in the document) that calculates a target line based on an object detected by the detection device, and an autonomous traveling control device ("travel control unit 16" in the document) that causes the traveling machine body to autonomously travel along the target line ("reference line SL" in the document) calculated by the target line calculation unit. In the case of the automatic mowing machine in Patent Document 2, two or more fruit trees in an orchard are used as target objects when the target line is calculated.

Background Art 3

As another example, Patent Document 2 discloses an automatic mowing machine that includes a traveling machine body ("vehicle body 3" in the document) that performs traveling mowing, a detection device ("object detection unit 11" in the document) that detects an object located in a work region, a distance calculation unit ("distance computation unit 14" in the document) that calculates the separation distance between the traveling machine body and a reference line (reference sign "SL" in the document) calculated based on an object detected by the detection device, and a travel control unit (reference sign "16" in the document) that controls traveling such that the distance from the reference line to the traveling machine body is within a pre-set range. In the case of this automatic mowing machine in Patent Document 2, two or more fruit trees in an orchard are used as target objects when the reference line is generated.

Background Art 4

As another example, Patent Document 3 discloses an autonomous moving device that includes an object detection unit ("distance detecting means 12" in the document) provided at the front face, with respect to the traveling direction, of the chassis, a storage unit ("storage means 11" in the document) that stores various parameters for traveling (including a destination) and a travel region map, a traveling path setting unit ("path generating means 14" in the document) that sets a path for traveling based on information stored in the storage unit, and a control instruction unit ("travel controlling means 16" in the document) that performs control for traveling to the destination based on the path set by the traveling path setting unit. The object detection unit detects a boundary line (reference sign "3" in the document) constituted by an object such as a wall, a fence, or any of various installed objects, and the traveling path setting unit sets a path so as to avoid the object based on the boundary line, and the control instruction unit can thus perform control.

PRIOR ART DOCUMENTS

Patent Documents

Patent Document 1: JP 2011-142900A
Patent Document 2: JP 2016-189172A
Patent Document 3: JP 2009-265941A

DISCLOSURE OF THE INVENTION

Problem to be Solved by the Invention

Issue 1

The following is an issue related to Background Art 1.

When a traveling machine body travels on an inclined slope, the inclination of the positioning receiver causes a decrease in the number of navigation satellites that can communicate with the positioning receiver, and there is a risk of a decrease in the positioning accuracy of the positioning receiver. Also, if a river or flooded paddy is located downhill of the inclined slope, the positioning receiver is likely to experience multipath effects due to the positioning signals transmitted by the navigation satellites being irregularly reflected by the river or flooded paddy, and there is a risk of a decrease in the positioning accuracy.

In light of the above-described circumstances, an object of the present invention is to provide an autonomous traveling work machine that, even in the case of an inclined slope, can accurately receive positioning signals from navigation satellites and perform autonomous traveling without deviating from the traveling path.

Issue 2

The following is an issue related to Background Art 2.

In the case of the invention described in Patent Document 2, given that the trunks of fruit trees rise upward from the ground surface, the target line calculation unit can easily calculate a target line with use of fruit trees as target objects. However, with a slope or the like, there are cases where there are no trunks or the like that rise upward from the ground surface, and there is a risk that target objects cannot be set and a target line cannot be calculated.

In light of the above-described circumstances, an object of the present invention is to provide an autonomous traveling mowing machine that can calculate a target line and perform autonomous traveling based on the target line even in the case where there are no target objects in a mowing region.

Issue 3

The following is an issue related to Background Art 3.

In the case of the invention described in Patent Document 2, given that the trunks of fruit trees rise upward from the ground surface and it is easy to distinguish between the fruit trees and the ground surface, the distance calculation unit can calculate the separation distance between the traveling machine body and a reference line that is generated with use of fruit trees as target objects. However, with a slope or the like, there are cases where there are no trunks or the like that rise upward from the ground surface, and there is a risk that target objects cannot be set and a reference line cannot be generated.

In light of the above-described circumstances, an object of the present invention is to provide a mowing machine that can accurately identify uncut grass and the mowed ground surface and perform autonomous traveling even in the case where there are no target objects in a mowing region.

Issue 4

The following is an issue related to Background Art 4.

In the case of a slope in a field for example, sometimes the traveling region does not include objects that can be detected by the object detection unit. In such a case, objects such as a fence or reflective plates need to be installed around the traveling region, and it is thought that such objects may need to then be removed after travelling, thus requiring labor for installing and removing such objects. Also, if a slope has an angle of inclination that is not uniform, or has protrusions/recessions, there is a risk that the object detection unit will lose sight of an object due to a rapid change in the inclination of the chassis, for example.

In light of the above-described circumstances, an object of the present invention is to provide a mowing machine autonomous traveling system that enables the object detection unit to accurately track an object even if a slope has an angle of inclination that is not uniform, or has protrusions/recessions.

Means for Solving Problem

The following is a means for solving the problems related to Issue 1.

An autonomous traveling work machine according to an aspect of the present invention includes: a traveling machine body; a positioning receiver configured to receive a positioning signal from a navigation satellite; an autonomous traveling control device configured to perform autonomous traveling along a traveling path based on the positioning signal; an inclination detection unit configured to detect inclination of the traveling machine body and output inclination angle information; an inclination angle determination unit configured to determine an inclination angle based on the inclination angle information; and a rotation control mechanism configured to rotate the positioning receiver with one or more degrees of freedom, wherein the rotation control mechanism keeps the positioning receiver horizontal based on the inclination angle.

In the present invention, due to the provision of the rotation control mechanism that keeps the positioning receiver horizontal, even if the traveling machine body is traveling on an inclined slope, the positioning receiver is kept horizontal by the rotation control mechanism, thus preventing the positioning receiver from being inclined. Accordingly, the positioning receiver can accurately communication with a sufficient number of navigation satellites, and is not likely to experience multipath effects. As a result, it is possible to realize an autonomous traveling work machine that can accurately receive positioning signals from navigation satellites and autonomously travel without deviating from a traveling path even in the case of an inclined slope.

In this configuration, it is preferable that the rotation control mechanism is provided directly below the positioning receiver.

Compared with a configuration in which the rotation control mechanism is provided on the upper side or a lateral side of the positioning receiver, in this configuration, the positioning signals transmitted by the navigation satellites are not blocked by the rotation control mechanism, and the positioning receiver can accurately communicate with a sufficient number of navigation satellites.

In this configuration, it is preferable that a shielding plate configured to cover an underside of the positioning receiver and block propagation of the positioning signal is provided.

According to this configuration, even if positioning signals transmitted by navigation satellites are irregularly reflected by a river or a flooded paddy, the irregularly reflected positioning signals are blocked by the shielding plate. Accordingly, the positioning receiver is not likely to experience multipath effects.

In this configuration, it is preferable that the autonomous traveling work machine further includes a traveling path setting unit configured to set a traveling path for the traveling machine body in advance, wherein the traveling path setting unit generates a plurality of line traveling paths that are parallel with a teaching traveling route obtained by manual operation of the traveling machine body.

According to this configuration, multiple line traveling paths are generated based on the teaching traveling route. For this reason, in the operation target region of the autonomous traveling work machine, a line traveling path is generated by manual operation in only one portion of the work target area, and autonomous traveling can be performed based on that line traveling path.

In this configuration, it is preferable that the inclination angle determination unit determines the inclination angle based on the inclination angle information detected along the teaching traveling route, and the rotation control mechanism rotates the positioning receiver at a timing before commencement of autonomous traveling on the line traveling paths.

If the positioning receiver rotates during autonomous traveling, the number of navigation satellites that the positioning receiver can communicate with is likely to change, and the positioning accuracy of the positioning receiver may become unstable. According to the above configuration, the positioning receiver rotates at a timing before the start of autonomous traveling, and therefore the positioning accuracy of the positioning receiver is more likely to be stable than in the case of a configuration in which the positioning receiver rotates during autonomous traveling.

In this configuration, it is preferable that the inclination angle determination unit updates the inclination angle based on the inclination angle information detected along one of the line traveling paths, and the rotation control mechanism rotates the positioning receiver at a timing before commencement of autonomous traveling along a subsequent line traveling path.

The inclination angle of a slope is not necessarily uniform, and there are cases where the inclination angle is different between the upward side and the downward side of the slope. However, the difference between the inclination angles of the slope on two adjacent line traveling paths is often smaller than the difference between the inclination angles of the slope on two distant line traveling paths that are not adjacent to each other. According to the above configuration, the inclination angle can be updated based on inclination angle information that was detected on the line traveling path that was travelled immediately previously, for example. For this reason, the inclination angle of the slope on the line traveling path that was travelled immediately previously can be used as an inclination angle that approximates the inclination angle of the slope on the next line traveling path.

In this configuration, it is preferable that the autonomous traveling work machine further includes a storage unit configured to store the inclination angle, wherein the storage unit stores the traveling path and the inclination angle at each of a plurality of pre-set points on the traveling path, the autonomous traveling control device performs autonomous traveling along the traveling path stored in the storage unit, and the rotation control mechanism rotates the positioning receiver at timings when the traveling machine body passes the points.

According to this configuration, the inclination angle of the slope can be stored at each of a plurality of points, and therefore the rotation control mechanism can be rotated at a location on the slope where the inclination angle changes a large amount during autonomous traveling, for example. Accordingly, the positioning receiver can be kept horizontal even at a location where the inclination angle changes a large amount during autonomous traveling.

In this configuration, it is preferable that the autonomous traveling work machine further includes a communication unit configured to exchange information with an external unit, wherein the traveling path and the inclination angle are transmitted to an external terminal via the communication unit and can be displayed by the external terminal.

According to this configuration, a change in the inclination angle can be reported to the operator by the traveling path and the inclination angle being displayed by the external terminal. Accordingly, the operator can check the extent of the change in inclination angle and the like and switch between autonomous traveling and manual traveling of the autonomous traveling work machine.

The following is a means for solving the problems related to Issue 2.

An autonomous traveling mowing machine according to an aspect of the present invention includes: a traveling machine body configured to perform traveling mowing; a discharge mechanism configured to discharge cut grass from a discharge opening to a mowed ground surface; a detection device configured to detect the cut grass discharged by the discharge mechanism; a target line calculation unit configured to calculate a target line based on the detection of cut grass; and an autonomous traveling control device configured to control autonomous traveling of the traveling machine body such that a distance between the traveling machine body and the target line calculated by the target line calculation unit is maintained at a pre-set distance.

According to present invention, cut grass is discharged from the discharge mechanism, and the discharged cut grass is detected by the detection device. For this reason, the target line can be calculated with use of the discharged cut grass as a target object. Accordingly, it is possible to realize an autonomous traveling mowing machine that can calculate a target line and perform autonomous traveling based on the target line even if a target object is not located in the mowing region.

In this configuration, it is preferable that the discharge mechanism is configured to discharge the cut grass in a form of clumped cut grass along a traveling route of the traveling machine body such that the clumped cut grass forms raised portions that are continuous or non-continuous along the traveling route of the traveling machine body.

According to this configuration, the cut grass is discharged in clumps, and raised portions are formed by the cut grass, thus making it possible for the detection device to accurately detect the cut grass.

In this configuration, it is preferable that the discharge mechanism is provided at a side portion of the traveling machine body that corresponds to the mowed ground surface.

Because the mowed ground surface is often flat, and the cut grass is discharged from the discharge mechanism onto the mowed ground surface in this configuration, the detection device can accurately detect cut grass that has been discharged on a flat ground surface.

In this configuration, it is preferable that the detection device is provided at a side portion of the traveling machine body that corresponds to the mowed ground surface.

According to this configuration, the detection device is provided in a side portion of the traveling machine body, and therefore the detection device can detect the cut grass even if the cut grass is located directly below the detection device. Accordingly, the detection device can detect the cut grass immediately after being discharged from the discharge mechanism.

In this configuration, it is preferable that a discharge path that extends from the traveling machine body to the discharge opening is formed in the discharge mechanism, and the discharge path is tapered such that a cross-sectional shape thereof becomes smaller toward the discharge opening.

According to this configuration, before being discharged from the discharge opening, the cut grass is compressed in the discharge path that becomes narrower toward the discharge opening, and thus the cut grass is likely to be in clumps when discharged.

In this configuration, it is preferable that the discharge mechanism is provided with a switching mechanism configured to open and close the discharge opening and a pressure detecting means for detecting a pressure of the cut grass, and the switching mechanism opens if the pressure detected by the pressure detecting means is greater than or equal to a pre-set pressure.

According to this configuration, the pressure of the cut grass can be raised to a pre-set pressure or higher before being discharged from the discharge opening. The cut grass can therefore be formed into clumps when discharged.

The following is a means for solving the problems related to Issue 3.

A mowing machine according to an aspect of the present invention includes: a traveling machine body configured to perform traveling mowing; a travel control unit configured to control the traveling machine body; a distance sensor configured to perform scanning to both sides in a machine body left-right direction to detect a distance between the traveling machine body and an object arranged in the machine body left-right direction; a decoding control unit configured to generate ground height data regarding both sides in the machine body left-right direction based on a scan angle and the distance detected through scanning performed by the distance sensor; an object detection unit configured to generate a ground surface reference line identified as a line indicating a mowed ground surface, and a grass reference line identified as a line indicating uncut grass, with use of an approximate line that is based on the ground height data; a target distance calculation unit configured to calculate a target distance based on a distance between the grass reference line and the traveling machine body; and a travel instruction unit configured to output an instruction signal such that the distance between the grass reference line and the traveling machine body matches the target distance.

Even in the case a mowing region that does not have prominent target objects such as trees, the mowing region includes grass that is to be mowed. According to the present invention, the distance sensor operates in the left-right direction of the traveling machine body and identifies the mowed ground surface and uncut grass, and the traveling machine body is controlled such that a pre-set distance is maintained between the traveling machine body and a grass reference line that is based on the identified grass. In view of this, the mowing machine can autonomously perform traveling mowing along the boundary between the mowed ground surface and uncut grass. As a result, it is possible to realize a mowing machine that can perform autonomous traveling by accurately identifying uncut grass and the mowed ground surface even if the mowing region does not include a target object.

In this configuration, it is preferable that the mowing machine further includes a travel mode determination unit configured to determine a traveling mode of the traveling machine body, wherein the traveling mode includes a manual control mode and an autonomous control mode, if the traveling mode is the manual control mode, the travel control unit controls the traveling machine body based on a manual control operation signal, and if the traveling mode is the autonomous control mode, the travel control unit controls the traveling machine body based on the instruction signal from the travel instruction unit.

It is preferable that the mowing machine can be remotely operated in accordance with the status of the mowing region and the status of the traveling machine body. According to the above configuration, whether the signal input by the travel control unit is an operation signal in the case of the manual control mode or an instruction signal in the case of the autonomous control mode can be switched based on the determination of the traveling mode by the travel mode determination unit.

In this configuration, it is preferable that the distance sensor is configured to perform scanning by rotating about a machine body front-rear direction.

According to this configuration, the scan angle of the distance sensor rotates about the front-rear direction, and therefore the distance sensor can scan a portion of the mowed ground surface that is in the region below the traveling machine body. Accordingly, the distance sensor can accurately scan the mowed ground surface and uncut grass.

In this configuration, it is preferable that the distance sensor is provided at one of a front portion and a rear portion of the traveling machine body.

According to this configuration, unlike with a configuration in which the distance sensor is provided in a central portion of the traveling machine body in the front-rear direction, the distance sensor can scan the ground surface directly below the distance sensor. Accordingly, the distance sensor can accurately scan the mowed ground surface and uncut grass.

In this configuration, it is preferable that the distance sensor is provided at both a front portion and a rear portion of the traveling machine body.

According to this configuration, a distance sensor provided at the front portion of the traveling machine body can scan the ground surface and the grass at a position where traveling mowing has not been performed, and a distance sensor provided at the rear portion of the traveling machine body can scan the ground surface and the grass at a position where traveling mowing has been performed. Accordingly, the mowing machine can accurately travel along the boundary between the mowed ground surface and uncut grass.

In this configuration, it is preferable that the object detection unit is configured to generate the ground surface reference line by calculating an approximate line based on, from among pieces of the ground height data, data corresponding to a pre-set range in the machine body left-right direction from a position immediately below the distance sensor with respect to a machine body vertical direction.

According to this configuration, the ground surface reference line is generated based on an approximate line, and therefore the mowed ground surface and uncut grass can be efficiently identified based on the ground height data.

In this configuration, it is preferable that the object detection unit is configured to generate a grass candidate line by calculating an approximate line based on, from among pieces of the ground height data, data that indicates a height from the ground surface reference line that is greater than or equal to a certain value at a certain number of consecutive locations or more.

According to this configuration, the ground height data that is used for generation of grass candidate line is limited to data that is consecutive over a certain range or more. For this reason, data that is not consecutive over the range is excluded from the data for grass candidate lines, and the risk of erroneous grass detection is reduced. Also, the grass candidate lines are generated based on an approximate line, and therefore the mowed ground surface and uncut grass can be efficiently identified based on the ground height data.

In this configuration, it is preferable that a plurality of the grass candidate lines are generated, the traveling machine body is provided with an inertial sensor that detects an inclination angle of the traveling machine body, and the object detection unit specifies, as the grass reference line, one of the grass candidate lines for which an inclination angle of the grass candidate line relative to the ground surface reference line and a calculated inclination angle calculated based on the inclination angle detected by the inertial sensor are in a predetermined reference range.

In general, it is often the case that grass grows upward along a specific direction (e.g., the vertical direction) even on inclined land. According to the above configuration, the specific direction can be calculated based on the inclination angle of the inertial sensor. For this reason, the grass identification accuracy is improved by specifying the one of the grass candidate lines that conforms to the specific direction as the grass reference line.

In this configuration, it is preferable that the grass reference line is defined in a pre-set height range from the ground surface reference line.

The upper portion of grass often sways due to wind, and according to this configuration, it is possible to prevent erroneous grass detection caused by disturbance due to wind or the like.

In this configuration, it is preferable that a plurality of values of the distance between the grass reference line and the traveling machine body are stored, including values calculated at a current time and a plurality of past times, and the target distance is calculated based on a moving average value of the plurality of values.

In traveling mowing, even if the distance between the grass and the traveling machine body is maintained in a certain range, cases are conceivable in which the distance between the grass reference line and the traveling machine body suddenly changes a large amount due to the detection of a rock, a post, or the like on the ground surface. According to the above configuration, the target distance is a moving average value, and therefore even if the distance between the grass reference line and the traveling machine body suddenly changes a large amount, the change in the target distance is smaller than the change in the distance between the grass reference line and the traveling machine body, and the instruction signal output by the travel instruction unit is stable.

The following is a means for solving the problems related to Issue 4.

An autonomous traveling system for a mowing machine according to an aspect of the present invention is an autonomous traveling system for a mowing machine that performs autonomous traveling mowing in a pre-set traveling area on a slope, the autonomous traveling system including: an object detection unit provided at an uppermost end of the slope and configured to detect an object by transmitting a detection signal and acquiring a reflection signal with respect to the detection signal; a reflecting portion that is provided on a side surface of the mowing machine that corresponds to the object detection unit, and that is configured to be detected by the object detection unit; communication units respectively provided in the object detection unit and the mowing machine; a storage unit configured to store area information regarding the traveling area and operation history information of the mowing machine; a traveling path setting unit configured to set a traveling path for the mowing machine; and a control instruction unit configured to transmit an instruction signal to the mowing machine, wherein the object detection unit is configured to track the reflecting portion, the control instruction unit calculates a traveling route for the mowing machine based on the reflection signal acquired by the object detection unit, calculates a difference between the traveling route of the mowing machine and the traveling path, and generates the instruction signal so as to reduce the difference, and the mowing machine is configured to perform autonomous traveling mowing along the traveling path in accordance with the instruction signal.

According to the present invention, the object detection unit is provided at the uppermost end of the slope, and the reflecting portion is provided on a side surface of the mowing machine. The object detection unit is fixed at a fixed point position, and the mowing machine can be used as the target object to be detected by the object detection unit, and therefore the reflecting portion of the mowing machine can be detected by the object detection unit in a stable state unlike the case where the object detection unit is provided in the mowing machine. In view of this, even if the inclination of the mowing machine suddenly changes due to protrusions/recessions or the like of the slope, the object detection unit can detect the reflecting portion of the mowing machine without being influenced by the protrusions/recession or the like of the slope. Accordingly, it is possible to realize a mowing machine autonomous traveling system that enables the object detection unit to accurately track an object even if a slope has an angle of inclination that is not uniform, or has protrusions/recessions.

In this configuration, it is preferable that the mowing machine is provided with an inclination sensor configured to detect an inclination angle of the mowing machine, and the object detection unit is provided with an inclination correction control unit configured to perform angle adjustment on the object detection unit such that an inclination angle of the object detection unit matches the inclination angle detected by the inclination sensor.

It is often the case that the inclination angle detected by the inclination sensor of the mowing machine conforms to the inclination angle of the slope, and therefore with the above configuration, the inclination angle of the object detection unit is changed by the inclination correction control unit in accordance with the inclination angle of the slope. Accordingly, the adjustment of the inclination of the object detection unit does not need to be performed manually each time for different slopes, and the object detection unit can easily track the reflecting portion of the mowing machine in accordance with any of various slope angles.

In this configuration, it is preferable that the reflecting portion is provided with a plurality of horizontally long reflective sheets that are arranged side-by-side in an up-down direction, and the reflective sheets have mutually different lengths in a lengthwise direction.

According to this configuration, when the object detection unit performs scanning in the horizontal direction, the object detection unit can detect the length of the horizontally long reflective sheets. Because the reflective sheets have mutually different lengths, the object detection unit can determine based on the lengths of the reflective sheets whether a higher position or a lower position of the reflecting portion is being tracked. Accordingly, the object detection unit can track the vertically central location of the reflecting portion, and the object detection unit can favorably track the reflecting portion even if the mowing machine suddenly moves up or down due to protrusions/recessions or the like of the slope.

In this configuration, it is preferable that the reflective sheets are arranged such that the lengths thereof in the lengthwise direction are longer the lower the reflective sheets are located relative to a machine body.

According to this configuration, the difference in length is the largest between the length of the reflective sheet located at the highest position and the length of the reflective sheet located at the lowest position. For this reason, the object detection unit can easily determine whether a higher position or a lower position of the reflecting portion is being tracked, thus making it possible to suppress an erroneous determination.

In this configuration, it is preferable that an attachment fixture configured to fix the object detection unit is provided at the uppermost end of the slope, and the object detection unit is configured to be detachably attached to the attachment fixture.

According to this configuration, the attachment fixture is fixed at the uppermost end of the slope, and the object detection unit can be carried, and therefore there is no need for the object detection unit to be fixedly disposed in all traveling areas. For this reason, the mowing machine autonomous traveling system can be constructed more inexpensively than in the case where the object detection unit is fixedly disposed in all traveling areas.

In this configuration, it is preferable that the storage unit is provided in the attachment fixture, and the area information and the operation history information can be read out from the storage unit to the object detection unit in a state where the object detection unit has been fixed to the attachment fixture.

According to this configuration, information necessary for autonomous traveling mowing is stored in the storage unit, and by merely mounting the object detection unit to the attachment fixture, area information and operation history information can be read out to the object detection unit. For this reason, the object detection unit can acquire information necessary for autonomous traveling mowing without needing to connect to a management computer at a remote location for example, and without needing to connect to a WAN (Wide Area Network) or the like. As a result, area information and operation history information can be easily read out to the object detection unit each time the slope has changed.

In this configuration, it is preferable that the area information and the operation history information can be stored from the object detection unit to the storage unit.

According to this configuration, when the area information and the operation history information have been updated during autonomous traveling mowing, the updated information is stored in the storage unit, and therefore the latest area information and operation history information can be read out even if a different object detection unit is used the next time autonomous traveling mowing is performed. Also, operation history information regarding the current autonomous traveling mowing can be used to predict variation or the like in the inclination angle in the next instance of autonomous traveling mowing, thus making it possible to perform autonomous traveling mowing that is more stable than in past autonomous traveling mowing.

In this configuration, it is preferable that the traveling path setting unit generates a plurality of line traveling paths that are parallel with a teaching traveling route obtained by manual operation of the mowing machine.

According to this configuration, multiple line traveling paths are generated based on the teaching traveling route. For this reason, in the work target region of autonomous traveling mowing, a line traveling path is generated by manual operation in only one portion of the work target area, and autonomous traveling can be performed based on that line traveling path.

In this configuration, it is preferable that the plurality of line traveling paths are arranged parallel with each other downward of the teaching traveling route in an upward-downward direction of the slope.

Because the object detection unit is provided at the upper end of the slope, with the above configuration, autonomous traveling mowing is performed from the upper side of the slope to the downstream side. For this reason, the mowed ground surface is always located between the object detection unit and the mowing machine, and the object detection unit can favorably track the reflecting portion of the mowing machine without being obstructed by uncut grass.

In this configuration, it is preferable that the teaching traveling route and the plurality of line traveling paths are stored in the storage unit as the operation history information, and based on the operation history information, the traveling path setting unit can reproduce the teaching traveling route as a line traveling path and can reproduce the plurality of line traveling paths.

According to this configuration, when autonomous traveling mowing is performed the next time on the same slope, teaching traveling does not need to be performed, and it is possible to reduce the manual operation burden.

DETAILED DESCRIPTION OF PREFERRED EMBODIMENTS

First Embodiment

The following describes a first embodiment of the present invention with reference to the drawings.

Basic Configuration of Autonomous Traveling Work Machine

The following describes an embodiment of an autonomous traveling work machine according to the present invention with reference to the drawings.

Figure 1:
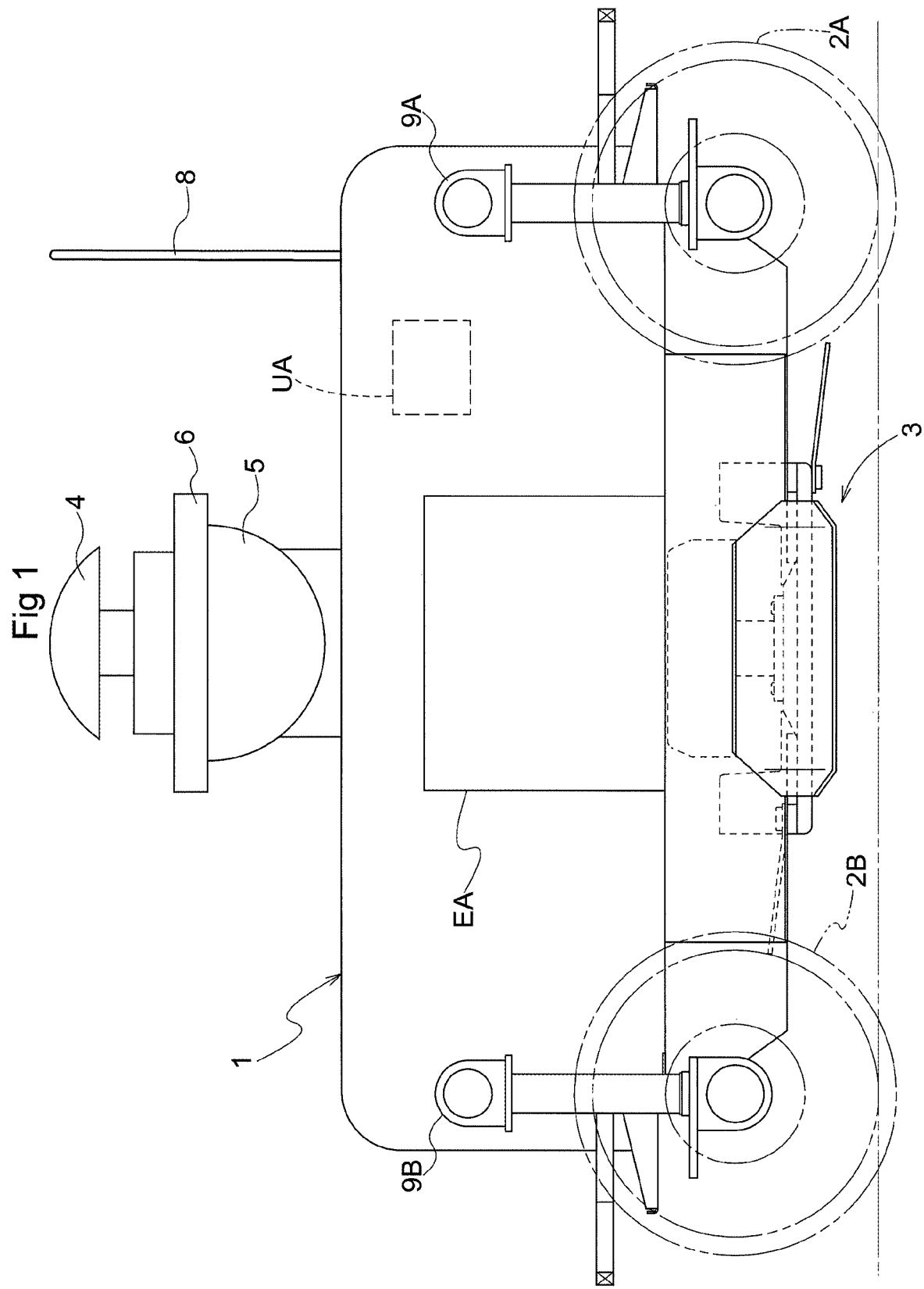
FIG. 1 is a diagram showing a first embodiment, and specifically is a side view of a configuration of an autonomous traveling mowing machine.

As shown in FIG. 1, an autonomous traveling mowing machine, which serves as the autonomous traveling work machine illustrated in the present embodiment, includes a traveling machine body 1, first wheels 2A, second wheels 2B, a mowing device 3, a positioning receiver 4, and a rotation control mechanism 5. A pair of left and right first wheels 2A are provided on one end side of the traveling machine body 1 in the lengthwise direction. A pair of left and right second wheels 2B are provided on the other end side of the traveling machine body 1 in the lengthwise direction. The mowing device 3 is provided between the first wheels 2A and the second wheels 2B in the lower portion of the traveling machine body 1. The positioning receiver 4 is provided above the traveling machine body 1. The rotation control mechanism 5 can rotate with multiple degrees of freedom, and is provided between the positioning receiver 4 and the traveling machine body 1. The positioning receiver 4 is configured to receive positioning signals with use of a GNSS (Global Navigation Satellite System) for detecting the position of the machine body by receiving radio waves from navigation satellites, one example of which is GPS (Global Positioning System), which is known technology. Note that the positioning receiver 4 is not limited to using GPS, and may be configured to be compatible with GNSSes. A shielding plate 6 is provided between the positioning receiver 4 and the rotation control mechanism 5. The shielding plate 6 is provided at a position directly below the positioning receiver 4.

An antenna 8 for communication with a transmitter 7 (see FIG. 4) is provided on the traveling machine body 1. The transmitter 7 is configured to enable manual operation of the autonomous traveling work machine while being held by an operator. The transmitter 7 may enable operations with use of a proportional type of transmitter that is operated in the worker's hands, or may enable operations with use of a mobile terminal device that has a touch panel type of display screen.

Figure 2:
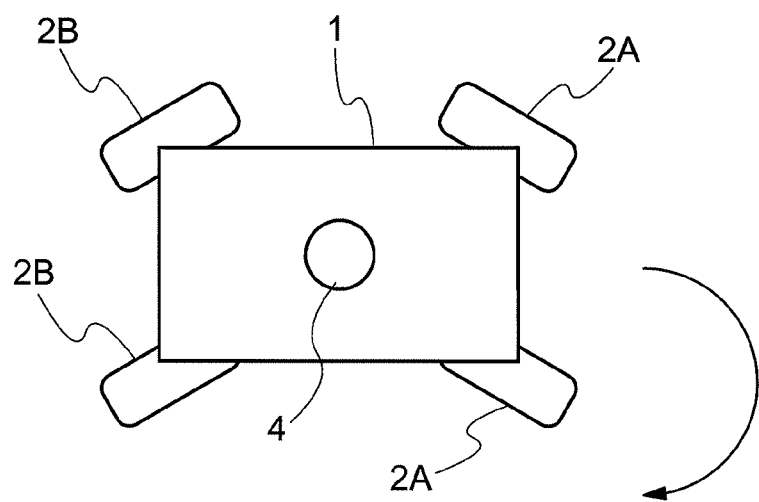
FIG. 2 is a diagram showing the first embodiment, and specifically is a plan view of a turning state.
Figure 3:
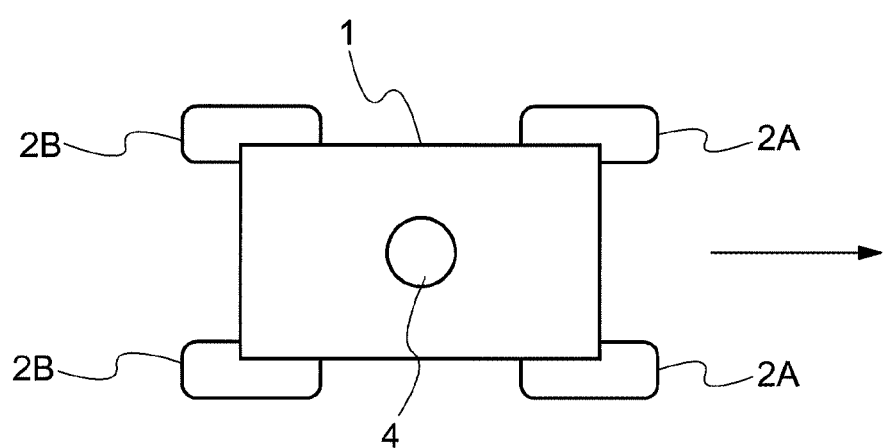
FIG. 3 is a diagram showing the first embodiment, and specifically is a plan view of a straight advancing state.

Although not shown, the traveling machine body 1 is provided with a transmission mechanism that transmits motive power from an engine EA to the first wheels 2A and the second wheels 2B, and also transmits motive power to the mowing device 3. The transmission mechanism is configured to be capable of engaging and disengaging the transmission of motive power to the first wheels 2A and the second wheels 2B and also to the mowing device 3. Due to motive power being transmitted from the engine EA to the first wheels 2A and the second wheels 2B and to the mowing device 3, it is possible to perform mowing while the machine body travels. The first wheels 2A are provided with a first steeling motor 9A, and the first wheels 2A are configured to be steerable by swinging about a vertical axis with use of drive power from the first steering motor 9A. Also, the second wheels 2B are provided with a second steering motor 9B, and the second wheels 2B are configured to be steerable by swinging about a vertical axis with use of drive power from the second steering motor 9B. As shown in FIGS. 2 and 3, the first wheels 2A and the second wheels 2B can both change orientation between any of a straight advancing orientation, a right swing orientation, and a left swing orientation.

Autonomous Traveling Control Device

Figure 4:
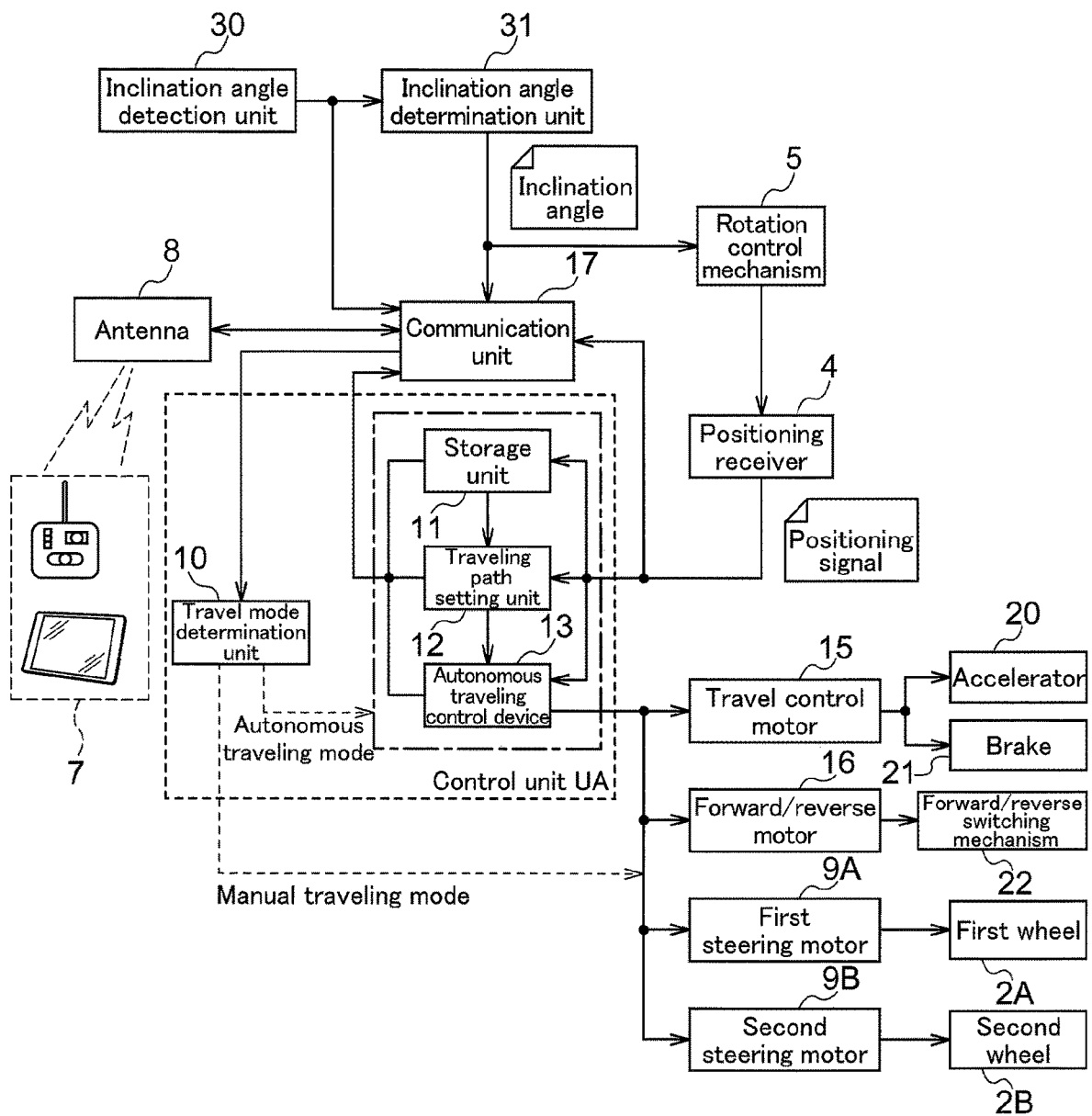
FIG. 4 is a diagram showing the first embodiment, and specifically is a block diagram showing an autonomous traveling control device and an inclination angle determination unit.

As shown in FIG. 4, a control unit UA, which enables the autonomous traveling mowing machine to autonomously travel along a pre-set traveling path, is provided in the autonomous traveling mowing machine in the form of being integrated in a microcomputer, for example. The control unit UA includes a travel mode determination unit 10, a storage unit 11, a traveling path setting unit 12, and an autonomous traveling control device 13. The storage unit 11 is configured to be able to store position information that is based on positioning signals received by the positioning receiver 4. The traveling path setting unit 12 sets traveling paths for autonomous traveling of the traveling machine body 1. The autonomous traveling control device 13 is configured to cause the traveling machine body 1 to travel along the traveling paths set by the traveling path setting unit 12. The control unit UA is also configured to enable switching between an autonomous travel mode and a manual travel mode in accordance with a determination made by the travel mode determination unit 10. In the manual travel mode, the autonomous traveling work machine performs traveling mowing and the like based on manual operations made via the transmitter 7, and therefore the autonomous traveling control device 13 is disabled, and a configuration is possible in which the traveling path setting unit 12 is also disabled in conjunction with the autonomous traveling control device 13.

The autonomous traveling control device 13 outputs signals to a travel control motor 15, a forward/reverse motor 16, the first steering motor 9A, and the second steering motor 9B. The travel control motor 15 operates an accelerator 20 that adjusts the amount of fuel supplied to the engine EA, and brakes 21 that brake the first wheels 2A and the second wheels 2B. The forward/reverse motor 16 switches a forward/reverse switching mechanism 22. Although not shown, the forward/reverse switching mechanism 22 is provided in the transmission device that transmits motive power from the engine EA to the first wheels 2A and the second wheels 2B, and is a gear mechanism for switching the motive power from the engine EA between a forward direction and a reverse direction. The first steering motor 9A steers the first wheels 2A, and the second steering motor 9B steers the second wheels 2B. The travel control motor 15 and the forward/reverse motor 16 may each be an electric motor or an electromagnetic switch.

The autonomous traveling control device 13 specifies the position and the direction of the traveling machine body 1 based on positioning signals received by the positioning receiver 4. The autonomous traveling control device 13 is configured to cause the traveling machine body 1 to travel along later-described traveling paths by outputting control signals to the travel control motor 15, the forward/reverse motor 16, the first steering motor 9A, and the second steering motor 9B. The autonomous traveling control device 13 is also configured to be able to switch between the autonomous travel mode, in which traveling is performed based on control signals from the control device 13, and the manual travel mode, in which traveling is performed based on control signals given through manual operations.

The traveling machine body 1 is provided with a communication unit 17 that can receive, via the antenna 8, operation signals wirelessly transmitted by the transmitter 7. The information received by the communication unit 17 is input to the control unit UA.

The status of the autonomous traveling mowing machine can be transmitted from the communication unit 17 to a device that is outside the machine body, and the current position and status of the autonomous traveling mowing machine can also be displayed on the display screen of a mobile terminal device, for example. The status of the autonomous traveling mowing machine may include the speed during traveling mowing, the remaining fuel amount, and problems regarding various devices included in the autonomous traveling mowing machine.

Traveling Path Setting Unit

Figure 5:
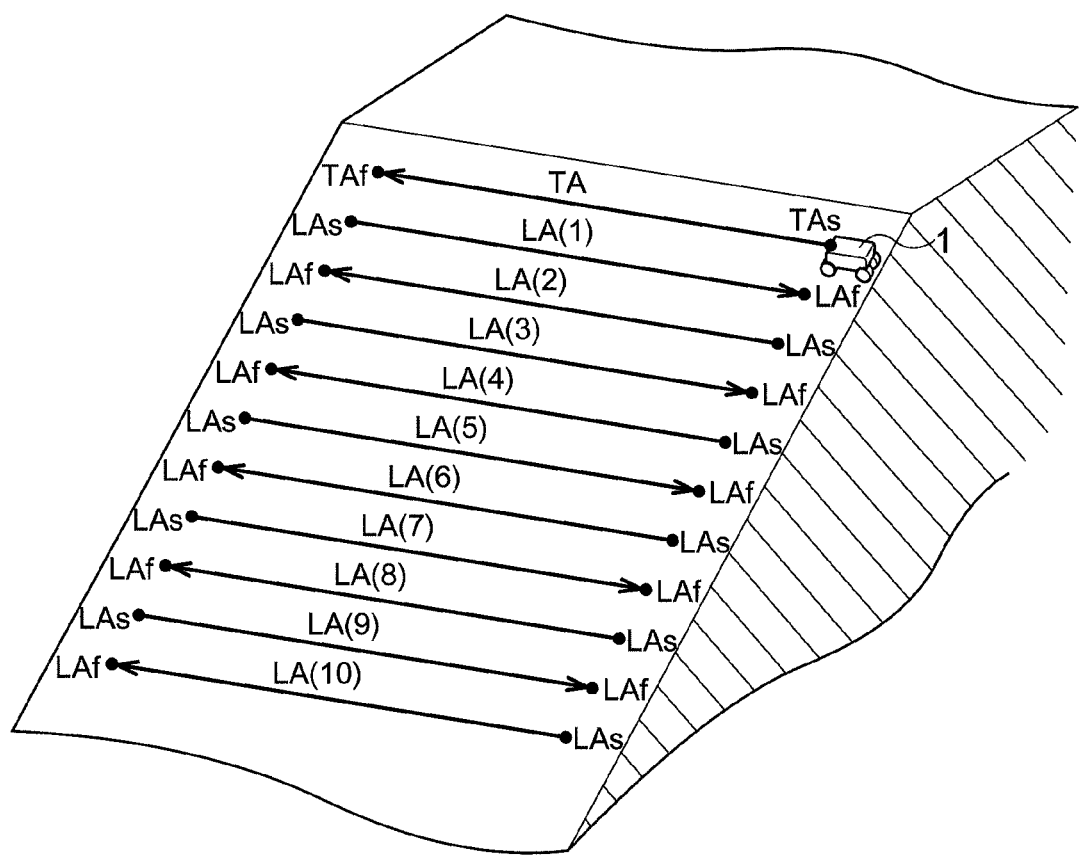
FIG. 5 is a diagram showing the first embodiment, and specifically is a perspective view of traveling paths on a slope.

As shown in FIG. 4, the traveling path setting unit 12 is provided in the control unit UA. Traveling paths for autonomous traveling of the traveling machine body 1 are set in advance by the traveling path setting unit 12. As shown in FIG. 5, multiple straight line traveling paths LA have been set as traveling paths for autonomous traveling on a slope. In the present embodiment, the line traveling paths LA are generated by the traveling path setting unit 12 through the following procedure.

First, in the manual travel mode, teaching traveling is performed along the upper edge portion of the slope. Teaching traveling is based on manual operations given through operations performed on the transmitter 7 by the operator. In the present embodiment, while the traveling machine body 1 is located at a start position TAs, the operator performs a start position setting operation on the transmitter 7. The operator then steers the traveling machine body 1 along a straight line from the start position TAs to a finish position TAf, and then while the traveling machine body 1 is located at the start position TAs, the operator performs a finish position setting operation on the transmitter 7. Teaching processing is thus executed. Specifically, this is processing for setting a teaching path TA that connects the start position TAs to the finish position TAf based on position coordinates that are based on positioning data acquired by the positioning receiver 4 at the start position TAs and position coordinates that are based on positioning data acquired by the positioning receiver 4 at the finish position TAf.

A configuration is also possible in which the position of the traveling machine body 1 is successively measured by the positioning receiver 4 during teaching traveling, and the positioning signals are stored in the storage unit 11. Here, the teaching path TA is obtained by extracting chronological position coordinates of the traveling machine body 1 from the set of positioning signals over the period from the start position TAs in teaching traveling to the finish position TAf in teaching traveling. This configuration is particularly useful in the case where the teaching path TA is curved.

Multiple line traveling paths LA are then generated as traveling paths that are parallel with the teaching path TA and are at equal intervals downward along the slope. In the present embodiment, line traveling paths LA(1) to LA(10) that are parallel with the teaching path TA are generated at equal intervals downward from the teaching path TA on the slope. Note that taking the width of the region that is to be mowed and the mowing operation width of the work vehicle into consideration, the line traveling paths LA are set such that the operation widths are slightly overlapped in order to prevent unmowed regions from remaining.

The line traveling paths LA(1) to LA(10) are each assigned a start position LAs and a finish position LAf, and the line traveling paths LA(1) to LA(10) are configured such that the direction from the start position LAs to the finish position LAf is the advancing direction of the traveling machine body 1. Also, a route is set such that the traveling machine body 1 travels along the line traveling paths LA(1) to LA(10) in order, and in the present embodiment, the route is set such that the traveling machine body 1 travels back and forth in straight lines from the upward side of the slope to the downward side. Specifically, traveling paths are set such that the finish position LAf of any one line traveling path LA(n) among the line traveling paths LA(1) to LA(9) has, adjacent thereto on the slope downstream side, the start position LAs of the line traveling path LA(n+1) that has been assigned next along the route.

The autonomous traveling mowing machine performs mowing while autonomously traveling along the line traveling paths LA. For example, when the traveling machine body 1 arrives at the finish position LAf of the first line traveling path LA(1), the autonomous traveling control device 13 outputs control signals such that the traveling machine body 1 moves to the start position LAs of the line traveling path LA(2) that has been assigned as next along the route. At this time, the autonomous traveling control device 13 may output control signals such that the traveling machine body 1 moves to the start position LAs of the next line traveling path LA(2) by making a U-turn, or may output control signals such that the traveling machine body 1 moves to the start position LAs of the next line traveling path LA(2) by repeatedly zig-zagging instead of turning around. More specifically, zig-zagging in the present embodiment refers to a form of traveling in which, upon reaching the finish position LAf, the traveling machine body 1 repeatedly moves forward and rearward through switching of the forward/reverse switching mechanism 22 such that the position of the traveling machine body 1 shifts downward from the finish position LAf and arrives at the start position LAs. Alternatively, movement from the finish position LAf to the next start position LAs may be performed in the manual travel mode. In this case, after the traveling machine body 1 has moved to the next start position LAs, the switch from the manual travel mode to the autonomous travel mode may be performed manually or automatically.

After the traveling machine body 1 has arrived at the start position LAs of the line traveling path LA(2) and the advancing direction of the traveling machine body 1 matches the advancing direction of the line traveling path LA(2), the autonomous traveling mowing machine then performs mowing while autonomously traveling along the line traveling path LA(2).

Rotation Control Mechanism

The autonomous traveling control device 13 is configured to specify the position and the direction of the traveling machine body 1 based on positioning signals received by the positioning receiver 4, but if the autonomous traveling mowing machine of the present embodiment travels on an inclined slope, the positioning receiver 4 also becomes inclined in accordance with the inclination of the slope. Due to this inclination of the positioning receiver 4, there is a risk of a decrease in the number of navigation satellites that can communicate with the positioning receiver 4. Also, if a river or flooded paddy is located downhill of the inclined slope, the positioning receiver 4 is likely to experience multipath effects due to the positioning signals transmitted by the navigation satellites being irregularly reflected by the river or flooded paddy, and there is a risk of a decrease in the positioning accuracy. In particular, with the positioning receiver 4 provided in the autonomous traveling mowing machine of the present embodiment, the distance between the positioning receiver 4 and the ground surface is often short, and the aforementioned problems are likely to arise. In view of this, the shielding plate 6 is provided directly below the positioning receiver 4, and the shielding plate 6 shields the underside of the positioning receiver 4 from positioning signals that have been irregularly reflected by a river or flooded paddy. Accordingly, the positioning receiver 4 is not likely to experience multipath effects, and the risk of a decrease in positioning accuracy is reduced. Also, the rotation control mechanism 5 for mitigating the inclining of the positioning receiver 4 is provided below the positioning receiver 4.

Figure 6:
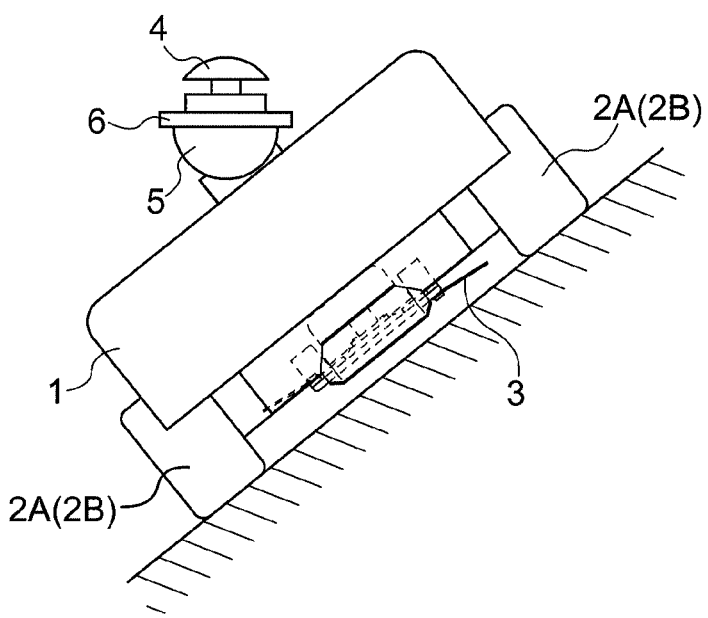
FIG. 6 is a diagram showing the first embodiment, and specifically is a front view of the autonomous traveling mowing machine that shows orientation control for a positioning receiver when the autonomous traveling mowing machine travels on a slope.

As shown in FIG. 6, in this configuration, the shielding plate 6 is provided below the positioning receiver 4, and the rotation control mechanism 5 is provided below the shielding plate 6, and the positioning receiver 4 and the shielding plate 6 are configured to be able to integrally swing about a rotation shaft of the rotation control mechanism 5. In the present embodiment, the rotation control mechanism 5 is configured to rotate with two degrees of freedom. Specifically, the rotation control mechanism 5 is configured to be able to rotate about a roll axis that matches the chassis front-rear direction of the traveling machine body 1 and a pitch axis that matches the chassis left-right direction of the traveling machine body 1. Accordingly, the positioning receiver 4 rotates with multiple degrees of freedom. In this way, even if the traveling machine body 1 travels on an inclined slope, the rotation control mechanism 5 rotates such that positioning receiver 4 is kept in a horizontal orientation.

Inclination Angle Determination Unit

An inclination angle detection unit 30 provided in the traveling machine body 1 is an IMU (Inertial Measurement Unit), which is one example of an inertial sensor, and the inclination angle detection unit 30 detects the inclination of the traveling machine body 1 and outputs inclination angle information ImA. An angle for holding the positioning receiver 4 in the horizontal orientation is determined by an inclination angle determination unit 31, and the inclination angle determination unit 31 determines an inclination angle IA for output to the rotation control mechanism 5 based on the inclination angle information ImA. The inclination angle IA includes a roll angle with respect to the chassis front-rear direction of the traveling machine body 1 and a pitch angle with respect to the chassis left-right direction of the traveling machine body 1. The determined inclination angle IA is output to the rotation control mechanism 5, and the rotation control mechanism 5 adjusts the rotation angle with respect to the roll axis and the pitch axis based on the input inclination angle IA.

The inclination angle determination unit 31 can also be configured to directly use the inclination angle information ImA detected by the inclination angle detection unit 30 as the inclination angle IA, and directly output the inclination angle IA to the rotation control mechanism 5. Furthermore, the rotation control mechanism 5 can be configured to keep the positioning receiver 4 horizontal in real-time by immediately rotating the positioning receiver 4 based on the input inclination angle IA. However, in the case of this configuration, the positioning receiver 4 continuously rotates relative to the traveling machine body 1 in accordance with protrusions and recessions in the ground surface as the traveling machine body 1 travels, and there is a risk that the inclination of the positioning receiver 4 relative to the traveling machine body 1 will not be stable. This leads to the risk of a change in the number of communicable navigation satellites during traveling, and a loss of stability in the positioning accuracy is also conceivable. For this reason, it is desirable that the timing of the rotation of the positioning receiver 4 relative to the traveling machine body 1, that is to say the timing of rotation of the rotation control mechanism 5, is a timing at which the traveling machine body 1 is stopped.

Figure 7:
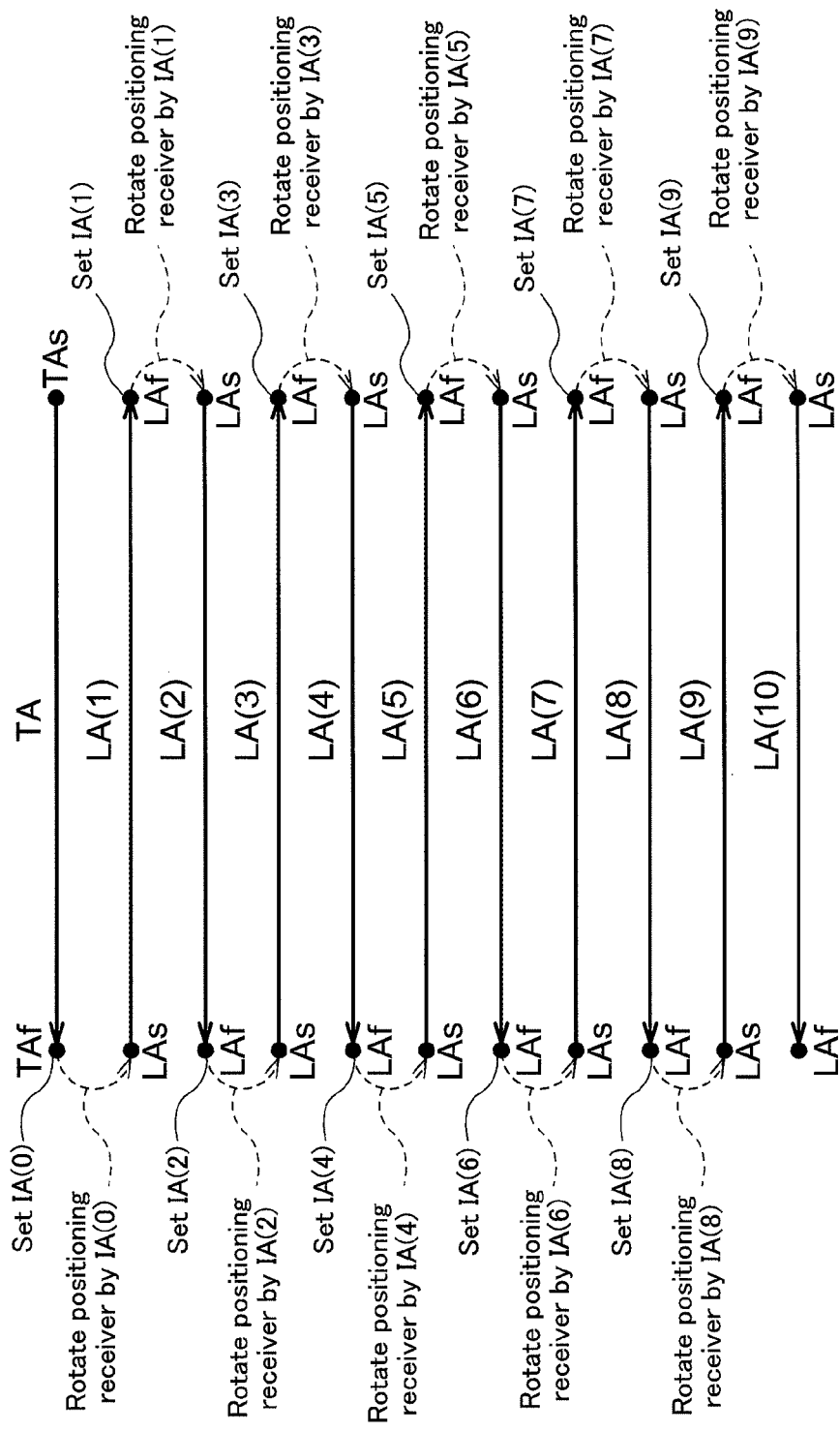
FIG. 7 is a diagram showing the first embodiment, and specifically is a diagram showing a relationship between traveling paths and inclination angles.

As shown in FIG. 7, while teaching traveling is being performed, the inclination angle detection unit 30 continuously detects the inclination angle information ImA from the start position TAs to the finish position TAf in teaching traveling, and continuously outputs the inclination angle information ImA to the inclination angle determination unit 31. The inclination angle determination unit 31 also calculates the average value of the inclination angle information ImA detected between the start position TAs and the finish position TAf, and sets the average value as the inclination angle IA(0).

When the traveling machine body 1 autonomously travels along the first line traveling path LA(1), the rotation control mechanism 5 positions and maintains the positioning receiver 4 such that the positioning receiver 4 maintains the inclination angle IA(0) relative to the traveling machine body 1. The timing when the rotation control mechanism 5 rotates the positioning receiver 4 is a timing during movement of the traveling machine body 1 from the finish position TAf to the start position LAs of the first line traveling path LA(1).

While the traveling machine body 1 is traveling along the first line traveling path LA(1), the inclination angle detection unit 30 continuously detects the inclination angle information ImA from the start position LAs to the finish position LAf of the line traveling path LA(1), and continuously outputs the inclination angle information ImA to the inclination angle determination unit 31. The inclination angle determination unit 31 then calculates the average value of the inclination angle information ImA detected between the start position LAs and the finish position LAf of the first line traveling path LA(1), and sets the average value as the inclination angle IA(1). In other words, the inclination angle determination unit 31 updates the inclination angle IA from the inclination angle IA(0) to the inclination angle IA(1). After the traveling machine body 1 arrives at the finish position LAf of the first line traveling path LA(1), the rotation control mechanism 5 rotates based on the inclination angle IA(1) before the traveling machine body 1 moves to the start position LAs of the next line traveling path LA(2).

While the traveling machine body 1 is traveling along the line traveling path LA(2), the rotation control mechanism 5 positions and maintains the positioning receiver 4 such that the positioning receiver 4 maintains the inclination angle IA(1) relative to the traveling machine body 1. Also, in order for the inclination angle determination unit 31 to calculate the inclination angle IA(2), the inclination angle detection unit 30 continuously detects the inclination angle information ImA from the start position LAs to the finish position LAf of the line traveling path LA(2), and continuously outputs the inclination angle information ImA to the inclination angle determination unit 31. Then, when the traveling machine body 1 has arrived at the finish position LAf of the line traveling path LA(2), the inclination angle determination unit 31 updates the inclination angle IA from the inclination angle IA(1) to the inclination angle IA(2).

In this way, in this configuration, while the traveling machine body 1 is traveling along any one line traveling path LA(n) among the line traveling paths LA(2) to LA(10), the rotation control mechanism 5 positions and maintains the positioning receiver 4 at the inclination angle IA(n−1) that was determined on the immediately previous traveling path LA(n−1). The difference between the inclination angles of the slope on the adjacent line traveling paths LA(n−1) and LA(n) is often smaller than the difference between the inclination angles of the slope on two distant line traveling paths LA that are not adjacent to each other. For this reason, even if there is a large difference between the inclinations of the slope on the upward side and the downward side, the positioning receiver 4 can be kept approximately horizontal with use of the inclination angle IA(n−1) on the immediately previously line traveling path LA(n−1).

If the transmitter 7 is a mobile terminal device or the like and has a display screen, the transmitter 7 is configured to be able to receive the inclination angle information ImA and the inclination angle IA via the communication unit 17 and display them on the display screen. Traveling paths including the teaching traveling route and the line traveling paths LA can also be displayed on the display screen.

Variations of First Embodiment

The present invention is not limited to the configurations illustrated in the above embodiment, and the following are representative variations of the present invention.

(1) In the configuration in the above embodiment, the line traveling paths LA(1) to LA(10) are generated from the teaching path TA that is based on positioning signals stored in the storage unit 11 during teaching traveling, but the present invention is not limited to the above embodiment. For example, a configuration is possible in which all traveling paths including the teaching path TA and the line traveling paths LA are stored in the storage unit 11, and autonomous traveling is performed along the traveling paths stored in the storage unit 11 when the autonomous traveling mowing machine autonomously travels the next time. This therefore eliminates the need to perform teaching traveling before the next instance of autonomous traveling, and makes it possible to mitigate the burden of manual operation. Also, similarly to the traveling paths, the inclination angles IA(0) to I(9) may also be stored in the storage unit 11. Here, a configuration is possible in which, while the traveling machine body 1 moves from the finish position LAf of any one line traveling path LA(n) among the line traveling paths LA(1) to LA(9) to the start position LAs of the next line traveling path LA(n+1), the rotation control mechanism 5 rotates the positioning receiver 4 based on the inclination angle IA(n) that corresponds to the line traveling path LA(n+1).

Also, the teaching path TA, the line traveling paths LA, and the inclination angles IA are not limited to being stored in the storage unit 11, and may be managed in an external terminal, for example. In this case, the communication unit 17 is configured to be able to communicate with the external terminal via a WAN (Wide Area Network) or the like, and here, a configuration is possible in which the teaching path TA, the line traveling paths LA, and the inclination angles IA may be read out from the external terminal via the communication unit 17, and a configuration is possible in which the teaching path TA, the line traveling paths LA, and the inclination angles IA are stored in the external terminal via the communication unit 17.

Figure 8:
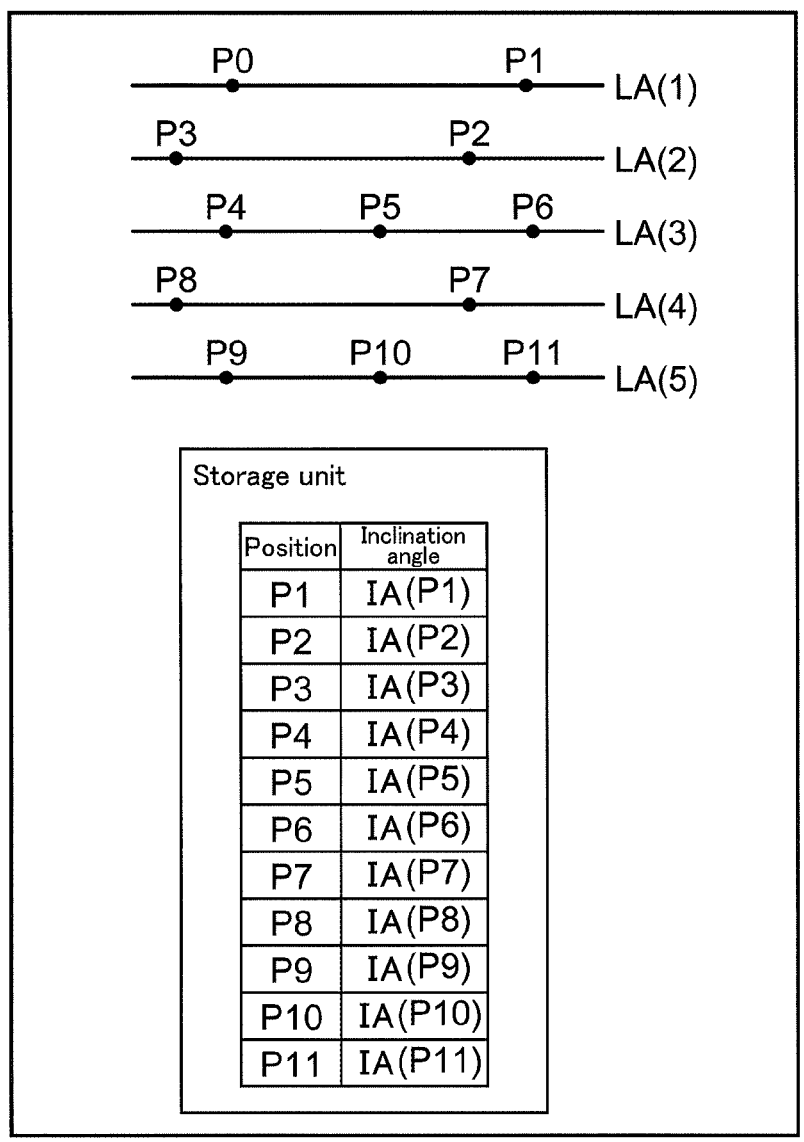
FIG. 8 is a diagram showing the first embodiment, and specifically is a diagram showing a variation regarding traveling paths and inclination angles.

(2) In the configuration in the above embodiment, the inclination angle determination unit 31 updates the inclination angle IA when the finish position LAf of each of the line traveling paths LA has been reached, but the present invention is not limited to the above embodiment. For example, a configuration is possible in which the inclination angle IA is stored in the storage unit 11 in association with position information that is based on positioning signals received by the positioning receiver 4, and the positioning receiver 4 is kept horizontal by being rotated by the rotation control mechanism 5 when the traveling machine body 1 passes a specific position. For example, as shown in FIG. 8, a configuration is possible in which position information regarding positions P1 to P11 along the line traveling paths LA(1) to LA(5) is stored in the storage unit 11, and inclination angles IA(P1) to I(P11) that correspond to the position information regarding the positions P1 to P11 are stored in the storage unit 11. As the traveling machine body 1 passes the positions P1 to P11, the inclination angle determination unit 31 reads out the inclination angles IA(P1) to I(P11) that correspond to the position information regarding the positions P1 to P11, and the rotation control mechanism 5 rotates the positioning receiver 4. Accordingly, the positioning receiver can be kept horizontal even at a location where the inclination angle changes a large amount during autonomous traveling, such as on basin-shaped land.

Figure 9:
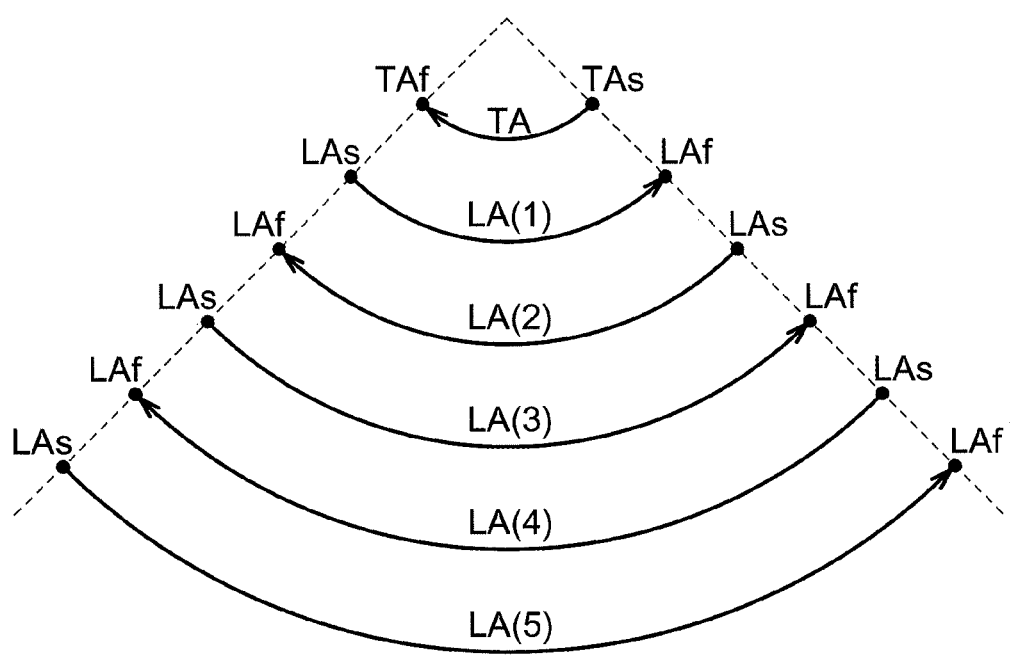
FIG. 9 is a diagram showing the first embodiment, and specifically is a diagram showing a variation regarding traveling paths.

(3) In the above embodiment, the line traveling paths LA are set based the straight teaching path TA, but they may be set based on a curved teaching path TA. For example, as shown in FIG. 9, based on a curved teaching path TA, curved line traveling paths LA that are parallel with the teaching path TA may be set at equal intervals.

(4) In the configuration in the above embodiment, the inclination angle determination unit 31 updates the inclination angle IA when the finish position LAf of each of the line traveling paths LA has been reached, but the present invention is not limited to the above embodiment. For example, a configuration is possible in which the inclination angle determination unit 31 calculates the average value of the inclination angle information ImA that was detected from the start position TAs to the finish position TAf during teaching traveling, sets the average value as the inclination angle IA, and does not update the inclination angle IA thereafter.

(5) Although an IMU is illustrated as an example of the inclination angle detection unit 30 described above, the present invention is not limited to the above embodiment. For example, the inclination angle detection unit 30 may be a pendulum type or floating type of inclination angle detector. Also, the inertial sensor may be a gyrosensor or an acceleration sensor.

(6) The positioning receiver 4 and the rotation control mechanism 5 illustrated in the above embodiment may be integrated with each other.

(7) Although the case where the autonomous traveling mowing machine performs mowing while autonomously traveling is described in the above embodiment, the autonomous traveling mowing machine can be used as another work vehicle such as a chemical spraying vehicle.

Second Embodiment

The following describes a second embodiment of the present invention with reference to the drawings.

Basic Configuration of Autonomous Traveling Work Machine

The following describes an embodiment of an autonomous traveling work machine according to the present invention with reference to the drawings.

Figure 10:
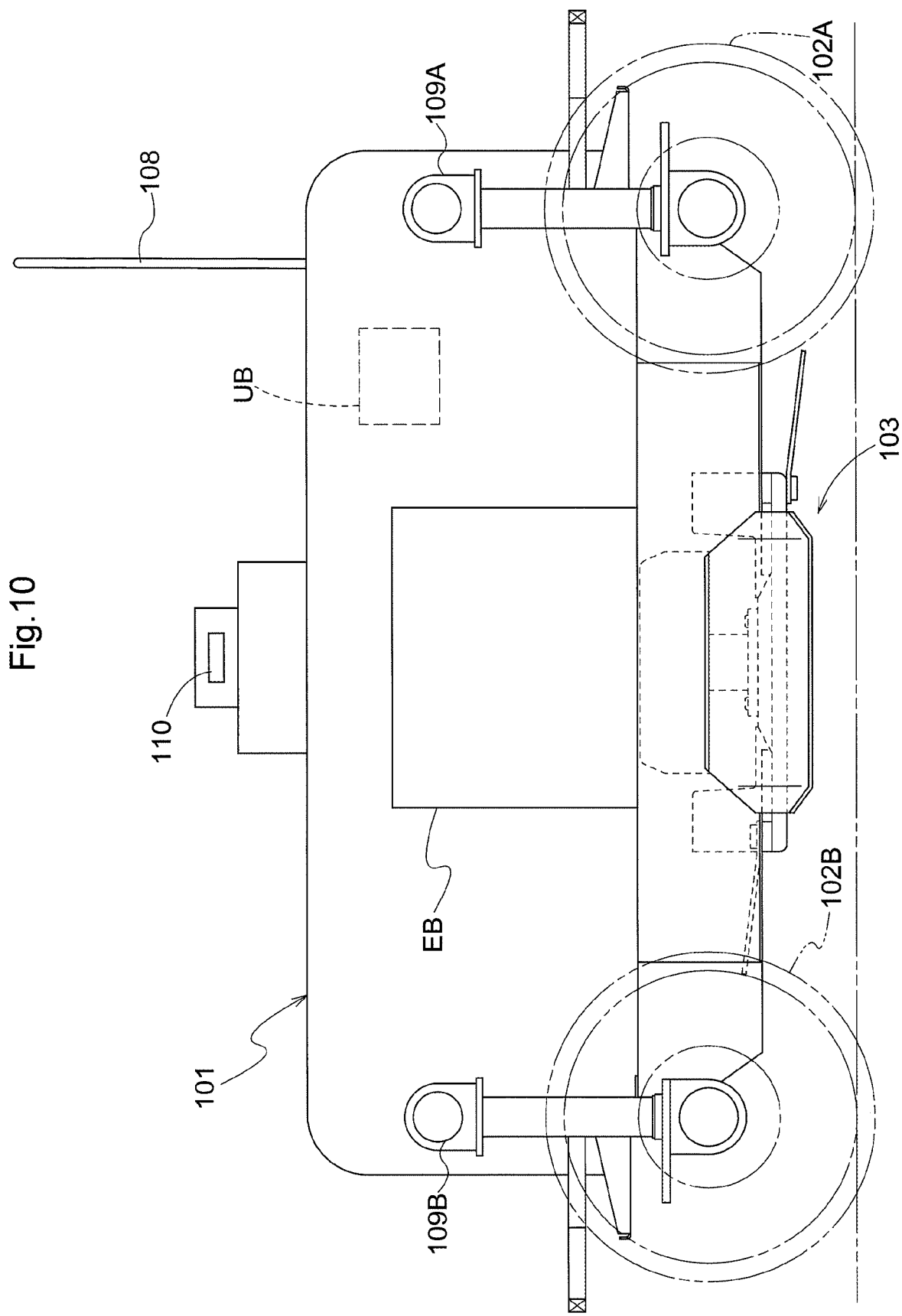
FIG. 10 is a diagram showing a second embodiment, and specifically is a side view of a configuration of an autonomous traveling mowing machine.

As shown in FIG. 10, an autonomous traveling mowing machine, which serves as the autonomous traveling work machine illustrated in the present embodiment, includes a traveling machine body 101, first wheels 102A, second wheels 102B, and a mowing device 103. A pair of left and right first wheels 102A are provided on one end side of the traveling machine body 101 in the lengthwise direction. A pair of left and right second wheels 102B are provided on the other end side of the traveling machine body 101 in the lengthwise direction. The mowing device 103 is provided between the first wheels 102A and the second wheels 102B in the lower portion of the traveling machine body 101. Also, a discharge mechanism 104 (see FIGS. 13 and 14) is provided in a portion on one end side of the traveling machine body 101, and the discharge mechanism 104 discharges grass that has been cut by the mowing device 103. Furthermore, a detection device 110 is provided at an upper portion of the traveling machine body 101. The detection device 110 will be described later.

An antenna 108 for communication with a transmitter 107 (see FIG. 13) is provided at an upper portion of the traveling machine body 101. The transmitter 107 is configured to enable manual operation of the autonomous traveling work machine while being held by an operator. The transmitter 107 may enable operations with use of a proportional type of transmitter that is operated in the worker's hands, or may enable operations with use of a mobile terminal device that has a touch panel type of display screen.

Figure 11:
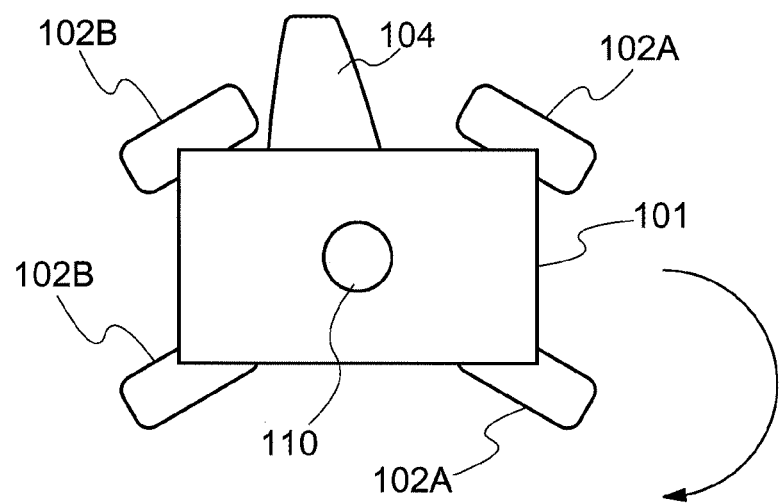
FIG. 11 is a diagram showing the second embodiment, and specifically is a plan view of a turning state.
Figure 12:
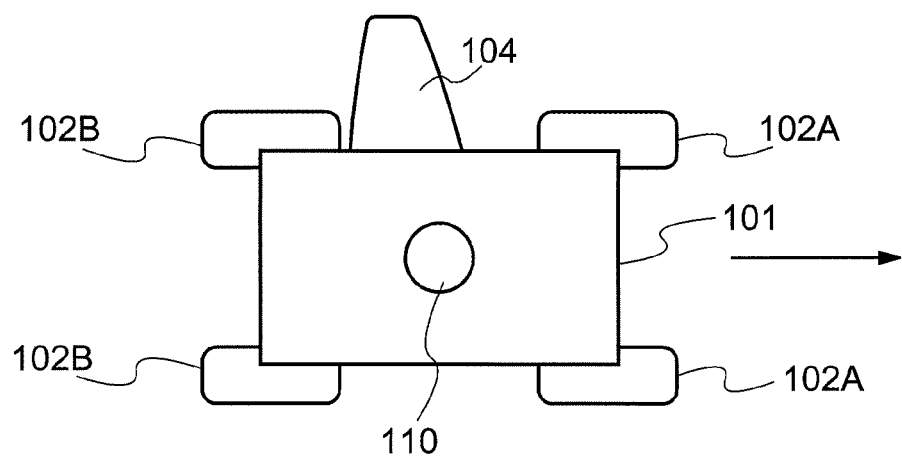
FIG. 12 is a diagram showing the second embodiment, and specifically is a plan view of a straight advancing state.

Although not shown, the traveling machine body 101 is provided with a transmission mechanism that transmits motive power from an engine EB to the first wheels 102A and the second wheels 102B, and also transmits motive power to the mowing device 103. The transmission mechanism is configured to be capable of engaging and disengaging the transmission of motive power to the first wheels 102A and the second wheels 102B and also to the mowing device 103. Due to motive power being transmitted from the engine EB to the first wheels 102A and the second wheels 102B and to the mowing device 103, it is possible to perform mowing while the machine body travels. The first wheels 102A are provided with a first steering motor 109A, and the first wheels 102A are configured to be steerable by swinging about a vertical axis with use of drive power from the first steering motor 109A. Also, the second wheels 102B are provided with a second steering motor 109B, and the second wheels 102B are configured to be steerable by swinging about a vertical axis with use of drive power from the second steering motor 109B. As shown in FIGS. 11 and 12, the first wheels 102A and the second wheels 102B can both change orientation between any of a straight advancing orientation, a right swing orientation, and a left swing orientation.

Discharge Mechanism

Figure 13:
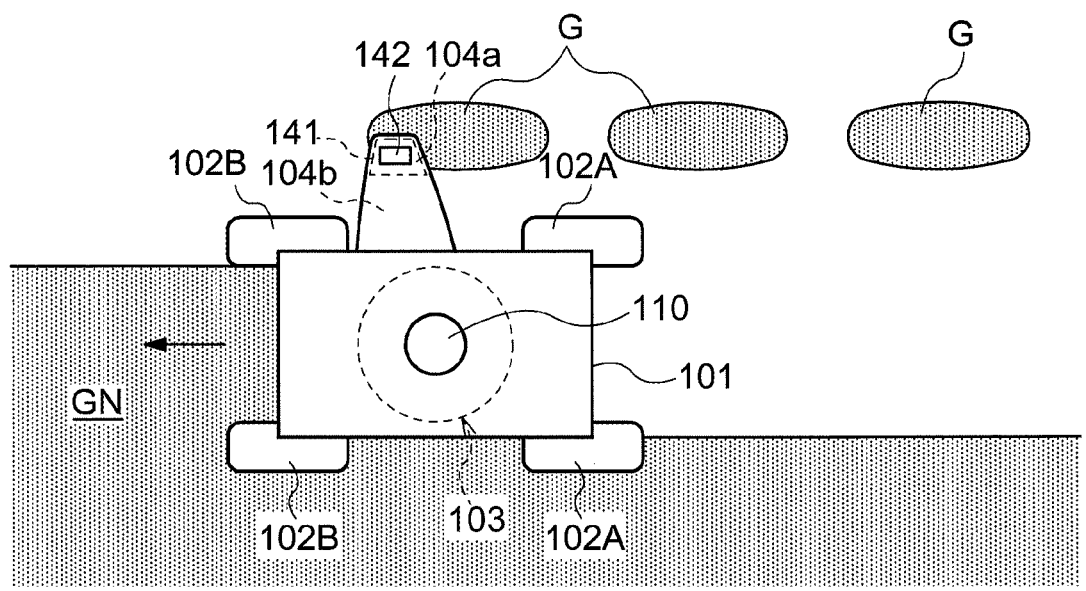
FIG. 13 is a diagram showing the second embodiment, and specifically is a plan view of a configuration of the autonomous traveling mowing machine and a discharge mechanism.
Figure 14:
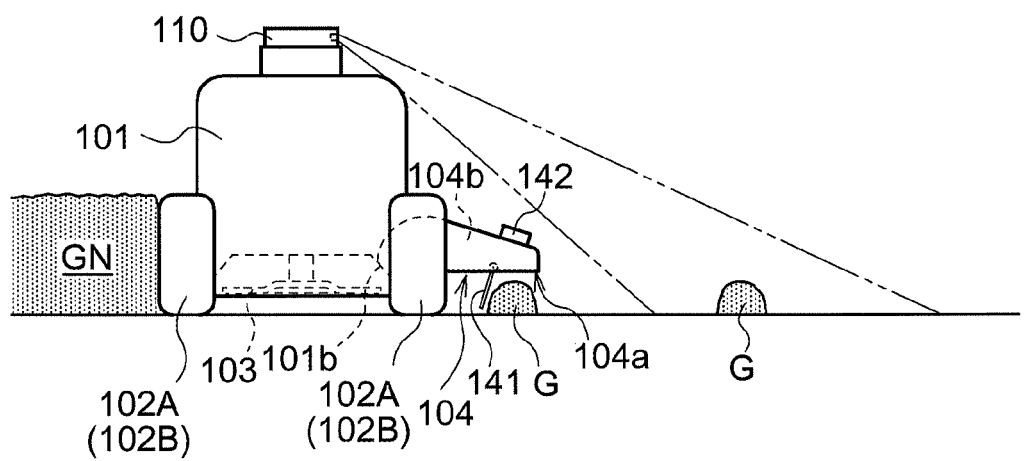
FIG. 14 is a diagram showing the second embodiment, and specifically is a front view of the configuration of the autonomous traveling mowing machine and the discharge mechanism.

As shown in FIGS. 13 and 14, the discharge mechanism 104 is provided in a state of protruding from either the left or right side portion of the traveling machine body 101. Note that in FIG. 13, dotted regions GNB denote unmowed regions in a mowing region. This similarly applies to regions GNB shown in later-described FIGS. 16 to 22 as well. In the present embodiment, the discharge mechanism 104 is provided on the side of the traveling machine body 101 that corresponds to the mowed ground surface. A discharge opening 104*a* is formed in the protruding leading end portion of the discharge mechanism 104. The discharge mechanism 104 is also provided with a discharge path 104*b* that extends between a discharge opening 101*b* of the traveling machine body 101 and the discharge opening 104*a* of the discharge mechanism 104. The discharge path 104*b* has a tapered shape according to which the cross-sectional shape thereof becomes smaller as it extends toward the discharge opening 104*a*. According to this shape, grass cut by the mowing device 103 enters the discharge path 104*b* through the discharge opening 101*b* and is then compressed on the discharge opening 104*a* side and becomes clumped cut grass G.

The discharge opening 104*a* is provided with a switching mechanism 141 for opening and closing the discharge opening 104*a*. Also, a pressure sensor 142 (pressure detecting means), which is for measuring how compressed the cut grass is, is provided on the discharge opening 104*a* side in the discharge mechanism 104. The switching mechanism 141 is configured to be able to switch between an open state in which the discharge opening 104*a* is open, and a closed state in which the discharge opening 104*a* is closed. The pressure sensor 142 is a switch that activates when subjected to a pressure greater than or equal to a pre-set pressure for example, and the switching mechanism 141 is configured to be in the open state while the pressure sensor 142 is activated. Accordingly, cut grass that passes through the discharge path 104*b*, which has a tapered shape, is further compressed into clumps at a stage before being discharged from the discharge opening 104*a*. Note that the switching mechanism 141 may be configured to perform switching with use of an electric motor, or may be configured to perform switching with use of an electromagnetic switch. The pressure sensor 142 may be a load cell, or may be a spring-type switch that activates due to the pressure of cut grass resisting biasing force.

In the present embodiment, the discharge mechanism 104 is provided on the side of the traveling machine body 101 that corresponds to the mowed ground surface. For this reason, while the traveling machine body 101 is performing traveling mowing, the cut grass is discharged in clumps from the discharge opening 104*a* to the mowed ground surface, and thus a straight line of clumped cut grass G is formed on the mowed ground surface. In other words, a continuous raised portion that extends along the traveling route of the traveling machine body 101 is formed by the clumped cut grass G on the mowed ground surface. There are also cases where non-continuous portions of the clumped cut grass G are formed on the mowed ground surface due to switching between the open state and the closed state in the switching mechanism 141. In this case, non-continuous raised portions that extend along the traveling route of the traveling machine body 101 are also formed. In this way, a continuous or non-continuous line is formed by the raised portion(s) made up of clumped cut grass G on the mowed ground surface.

Autonomous Traveling Control Device

Figure 15:
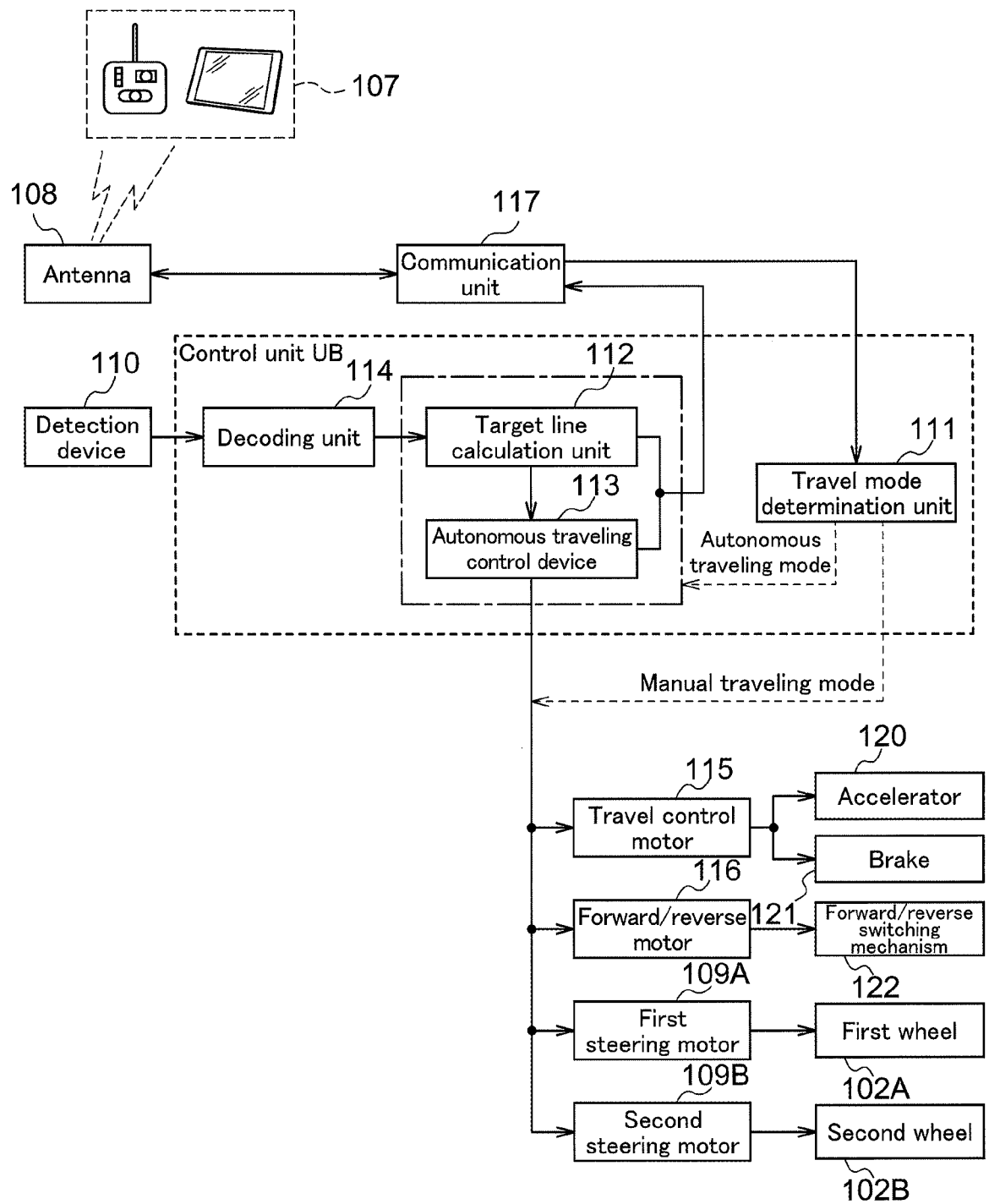
FIG. 15 is a diagram showing the second embodiment, and specifically is a block diagram showing a control unit.

As shown in FIG. 15, a control unit UB, which enables the autonomous traveling mowing machine to autonomously travel along a pre-set traveling path, is provided in the autonomous traveling mowing machine in the form of being integrated in a microcomputer, for example. The control unit UB includes a travel mode determination unit 111, a target line calculation unit 112, an autonomous traveling control device 113, and a decoding unit 114. The target line calculation unit 112 sets target lines LB for autonomous traveling of the traveling machine body 101. The autonomous traveling control device 113 is configured to cause the traveling machine body 101 to travel parallel with the target lines LB set by the target line calculation unit 112. The decoding unit 114 converts detection signals detected by the detection device 110 into data for calculation of the target lines LB by the target line calculation unit 112. The control unit UB is also configured to enable switching between an autonomous travel mode and a manual travel mode in accordance with a determination made by the travel mode determination unit 111. In the manual travel mode, the autonomous traveling work machine performs traveling mowing and the like based on manual operations made via the transmitter 107, and therefore the autonomous traveling control device 113 is disabled, and a configuration is possible in which the target line calculation unit 112 is also disabled in conjunction with the autonomous traveling control device 113.

The autonomous traveling control device 113 outputs signals to a travel control motor 115, a forward/reverse motor 116, the first steering motor 109A, and the second steering motor 109B. The travel control motor 115 operates an accelerator 120 that adjusts the amount of fuel supplied to the engine EB, and brakes 121 that brake the first wheels 102A and the second wheels 102B. The forward/reverse motor 116 switches a forward/reverse switching mechanism 122. Although not shown, the forward/reverse switching mechanism 122 is provided in the transmission device that transmits motive power from the engine EB to the first wheels 102A and the second wheels 102B, and is a gear mechanism for switching the motive power from the engine EB between a forward direction and a reverse direction. The first steering motor 109A steers the first wheels 102A, and the second steering motor 109B steers the second wheels 102B. The travel control motor 115 and the forward/reverse motor 116 may each be an electric motor or an electromagnetic switch.

The traveling machine body 101 is provided with a communication unit 117 that can receive, via the antenna 108, operation signals wirelessly transmitted by the transmitter 107. The information received by the communication unit 117 is input to the control unit UB.

The status of the autonomous traveling mowing machine can be transmitted from the communication unit 117 to a device that is outside the machine body, and the current position and status of the autonomous traveling mowing machine can also be displayed on the display screen of a mobile terminal device, for example. The status of the autonomous traveling mowing machine may include the speed during traveling mowing, the remaining fuel amount, and problems regarding various devices included in the autonomous traveling mowing machine.

For example, as shown in FIG. 14, the detection device 110 is provided at an upper portion of the traveling machine body 101. The detection device 110 is an LRF (Laser Range Finder) for example, and transmits an air-propagating signal, such as laser beams, as a detection signal. When a detection signal strikes a detection object, the detection signal is reflected by the surface of the detection object. The detection device 110 then acquires, as a reflection signal, the detection signal that was reflected by the surface of the detection object. In other words, the detection device 110 transmits a detection signal toward a detection range of the detection device 110, and acquires a reflection signal with respect to the detection signal. The detection device 110 is configured to then calculate the distance between the detection device 110 and the detection object based on the time from transmission of the detection signal to the acquisition of the reflection signal. The process in which the detection device 110 transmits a detection signal and acquires a reflection signal is hereinafter called "scanning".

The detection device 110 performs detection by scanning the linear shape of a raised portion formed by clumped cut grass G. The ground height of the raised portion is then calculated by the decoding unit 114 based on the distance detected through scanning and the scan angle of the detection device 110. According to this configuration, it is possible to distinguish between the mowed ground surface and the clumped cut grass G.

The target line calculation unit 112 recognizes the clumped cut grass G detected through scanning performed by the detection device 110, and calculates a target line LB. Specifically, using the clumped cut grass G as a target object, the target line calculation unit 112 calculates a target line LB based on the linear shape of the clumped cut grass G. Note that if the clumped cut grass G is non-continuous, and the linear shape of the clumped cut grass G is non-continuous, the target line calculation unit 112 calculates the target line LB by performing linear interpolation on the non-continuous linear shape with use of an approximate line.

Figure 16:
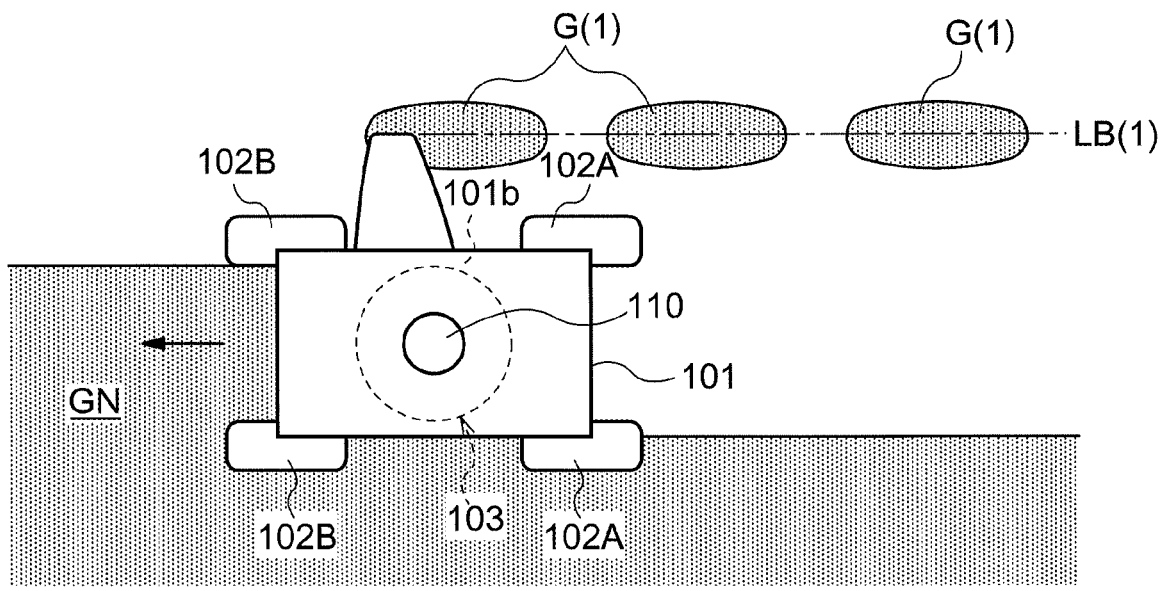
FIG. 16 is a diagram showing the second embodiment, and specifically is an illustrative diagram showing the discharge of grass during teaching traveling.

As shown in FIG. 16, in the present embodiment, first, traveling mowing is performed in the manual travel mode in the mowing region to obtain a region of mowed ground surface. Next, traveling mowing is performed in teaching traveling, and clumped cut grass G(1) is formed in a line or spots on the mowed ground surface. Accordingly, portions of clumped cut grass G(1) are formed on the mowed ground surface, and each portion of clumped cut grass G(1) is used as a target object for setting of a target line LB(1) by the target line calculation unit 112. Accordingly, a linear shape is formed by the line of portions of clumped cut grass G(1), the detection device 110 can detect each portion of clumped cut grass G(1) through scanning, and the target line LB(1) can be calculated by the target line calculation unit 112. In the present embodiment, spots of clumped cut grass G(1) are formed, and the linear shape of the line of spots is non-continuous, but a configuration is possible in which a line of clumped cut grass G(1) is formed, and the linear shape thereof is continuous.

The discharge mechanism 104 is provided on the side of the traveling machine body 101 that corresponds to the mowed ground surface. For this reason, even after teaching traveling is complete, the discharge mechanism 104 needs to autonomously travel in order to be able to continuously discharge the clumped cut grass G from the side corresponding to the mowed ground surface. In view of this, the traveling machine body 101 needs to autonomously travel without turning, such that the discharge mechanism 104 does not face the side corresponding to the unmowed region GNB. In other words, traveling mowing is performed while the traveling machine body 101 zig-zags, that is to say, while the traveling machine body 101 repeatedly moves forward and rearward. In view of this, the terminal end of the line of clumped cut grass G(1) formed on the mowed ground surface through teaching traveling is used as the start point of the target line LB that is to be calculated by the target line calculation unit 112. Also, the start end of the line of clumped cut grass G(1) formed on the mowed ground surface through teaching traveling is used as the end point of the target line LB that is to be calculated by the target line calculation unit 112.

Figure 17:
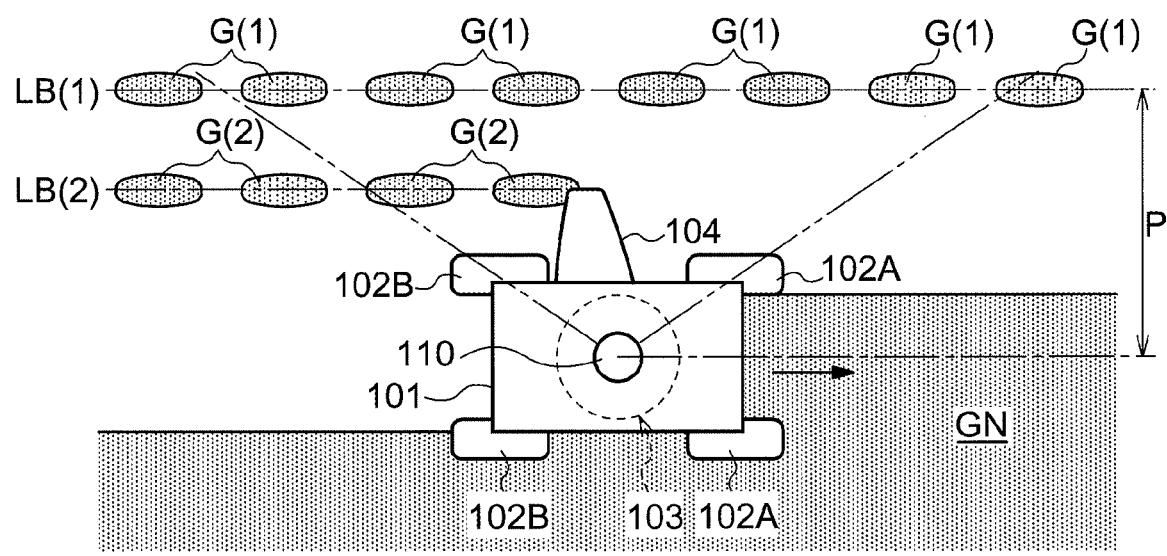
FIG. 17 is a diagram showing the second embodiment, and specifically is an illustrative diagram showing autonomous traveling along target lines.

After teaching traveling is complete, the mode is switched to the autonomous travel mode such that traveling mowing is performed autonomously, and this switch from the manual travel mode to the autonomous travel mode may be made manually or automatically. After the switch to the autonomous travel mode, as shown in FIG. 17, the detection device 110 continuously performs periodic scanning in order to detect the clumped cut grass G(1) that was discharged during teaching traveling, and the target line calculation unit 112 continues to calculate the target line LB(1) based on an approximate line that approximates the clumped cut grass G(1) detected by the detection device 110. In other words, the target line calculation unit 112 continues to update the target line LB(1) by continuously calculating the target line LB(1). At this time, the target line calculation unit 112 may be configured to calculate the target line LB(1) based on the moving average of previous approximate lines that were periodically calculated.

The autonomous traveling control device 113 calculates the distance between the target line LB(1) and the traveling machine body 101 based on the scanning performed by the detection device 110. The autonomous traveling control device 113 outputs control signals to the travel control motor 115, the forward/reverse motor 116, the first steering motor 109A, and the second steering motor 109B such that the traveling machine body 101 keeps a pre-set distance Pd from the target line LB(1). The traveling machine body 101 is located on the side opposite to the side corresponding to the clumped cut grass G(1) while adjacent to the traveling route of traveling mowing in the teaching traveling. In view of this, the distance Pd, which is the distance from the center of the operation width of the mowing device 103 to the target line LB(1) is approximately 1.5 times the operation width in traveling mowing. Note that in order to prevent unmowed regions from remaining during traveling mowing before and after the completion of teaching traveling, the operation width in traveling mowing along the target line LB(1) may be partially overlapped with the operation width in traveling mowing during teaching traveling. In other words, the distance Pd can be changed as appropriate.

During traveling mowing performed along the target line LB(1), new clumped cut grass G(2) is discharged from the discharge opening 104a, and the new clumped cut grass G(2) forms a continuous or non-continuous line on the mowed ground surface and becomes a new target object for the calculation of the next target line LB(2) by the target line calculation unit 112. The new clumped cut grass G(2) is shifted more to the side corresponding to the traveling machine body 101 than the clumped cut grass G(1) discharged during teaching traveling is, and therefore a new straight line is formed on the mowed ground surface by the raised portion formed by the new clumped cut grass G(2).

Figure 18:
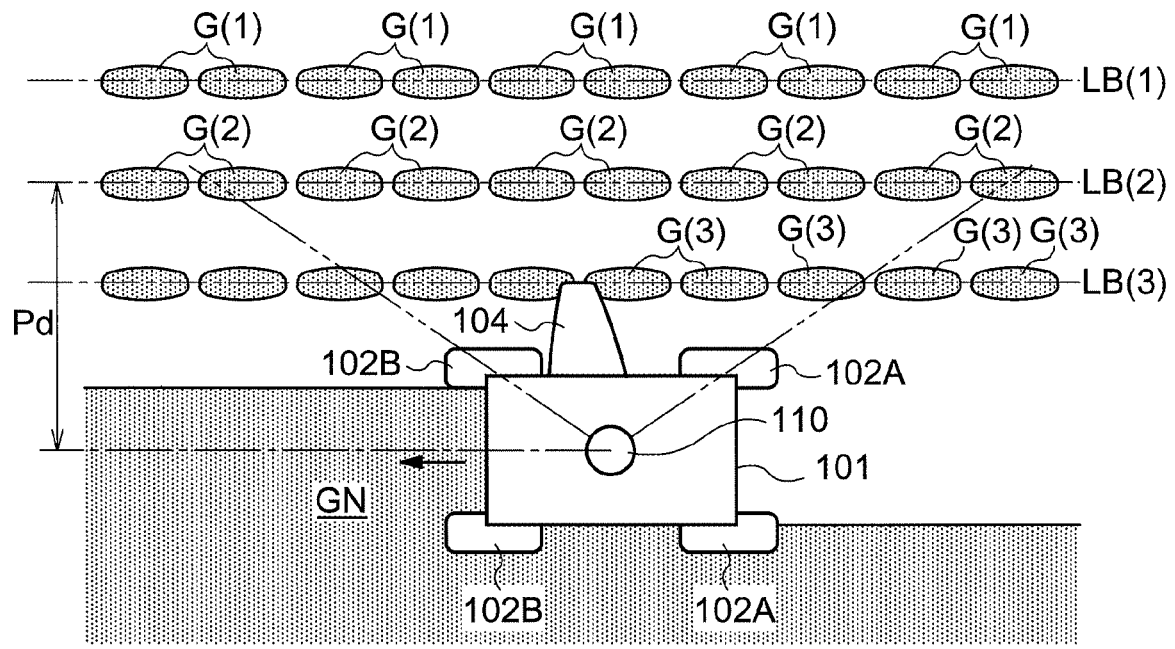
FIG. 18 is a diagram showing the second embodiment, and specifically is an illustrative diagram showing autonomous traveling along target lines.

As shown in FIG. 18, when the traveling mowing performed by the traveling machine body 101 along the target line LB(1) is complete, the target line calculation unit 112 continues on to calculate the next target line LB(2) based on an approximate line of the clumped cut grass G(2). At this time, the autonomous travel mode may be continued, or the mode may be switched to the manual travel mode. Then, due to a switching operation of the forward/reverse switching mechanism 122, the traveling machine body 101 reverses the advancing direction, and the autonomous traveling control device 113 performs control such that autonomous traveling is performed along the next target line LB(2). The detection device 110 continuously performs periodic scanning, and detects the clumped cut grass G(2) discharged during teaching traveling, and the target line calculation unit 112 continues to calculate the target line LB(2) based on an approximate line of the clumped cut grass G(2) detected by the detection device 110. In other words, similarly to the case in which autonomous traveling was performed along the target line LB(1), the target line calculation unit 112 continues to update the target line LB(2) by continuously calculating the target line LB(2).

The autonomous traveling control device 113 calculates the distance between the target line LB(2) and the traveling machine body 101 based on the scanning performed by the detection device 110. The autonomous traveling control device 113 outputs control signals to the travel control motor 115, the forward/reverse motor 116, the first steering motor 109A, and the second steering motor 109B such that the traveling machine body 101 keeps a pre-set distance Pd from the target line LB(2).

During traveling mowing performed along the target line LB(2), new clumped cut grass G(3) is discharged from the discharge opening 104a, and the new clumped cut grass G(3) forms a continuous or non-continuous line on the mowed ground surface. In other words, the new clumped cut grass G(3) is discharged at a location adjacent to the clumped cut grass G(2), and a new line is formed on the mowed ground surface. The clumped cut grass G(3) becomes a new target object for calculation of the next target line LB(3) by the target line calculation unit 112. In this way, the autonomous traveling mowing machine is configured to calculate target lines LB as paths for autonomous traveling based on clumped cut grass G arranged in a line.

If the transmitter 107 is a mobile terminal device or the like and has a display screen, the transmitter 107 may be configured to be able to receive information regarding the target lines LB and deviation of the traveling machine body 101 via the communication unit 117 and display such information on the display screen.

Variations of Second Embodiment

The present invention is not limited to the configurations illustrated in the above embodiment, and the following are representative variations of the present invention.

Figure 19:
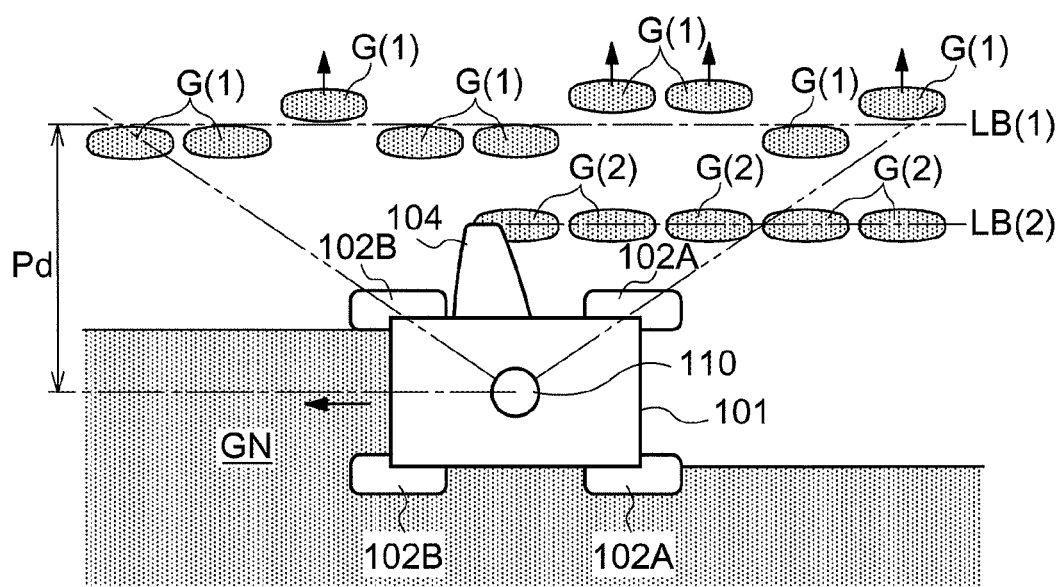
FIG. 19 is a diagram showing the second embodiment, and specifically is an illustrative diagram showing a variation regarding target line calculation.

(1) In the configuration of the above embodiment, the target line calculation unit 112 is configured to calculate a target line LB based on clumped cut grass G that was discharged in a line on the mowed ground surface, but the present invention is not limited to the above embodiment. For example, as shown in FIG. 19, there are cases where portions of the clumped cut grass G(1) shift or collapse due to wind or the like, and the portions of clumped cut grass G(1) are not necessarily arranged in a straight line. Even in such cases, the target line calculation unit 112 may be configured to calculate the target line LB(1) based on an approximate straight line with respect to the portions of clumped cut grass G(1). Furthermore, taking the case of change in the shifting of the portions of clumped cut grass G(1) over time as well, the target line calculation unit 112 may be configured to calculate the target line LB based on the moving average of past approximate straight lines that have been calculated periodically.

Figure 20:
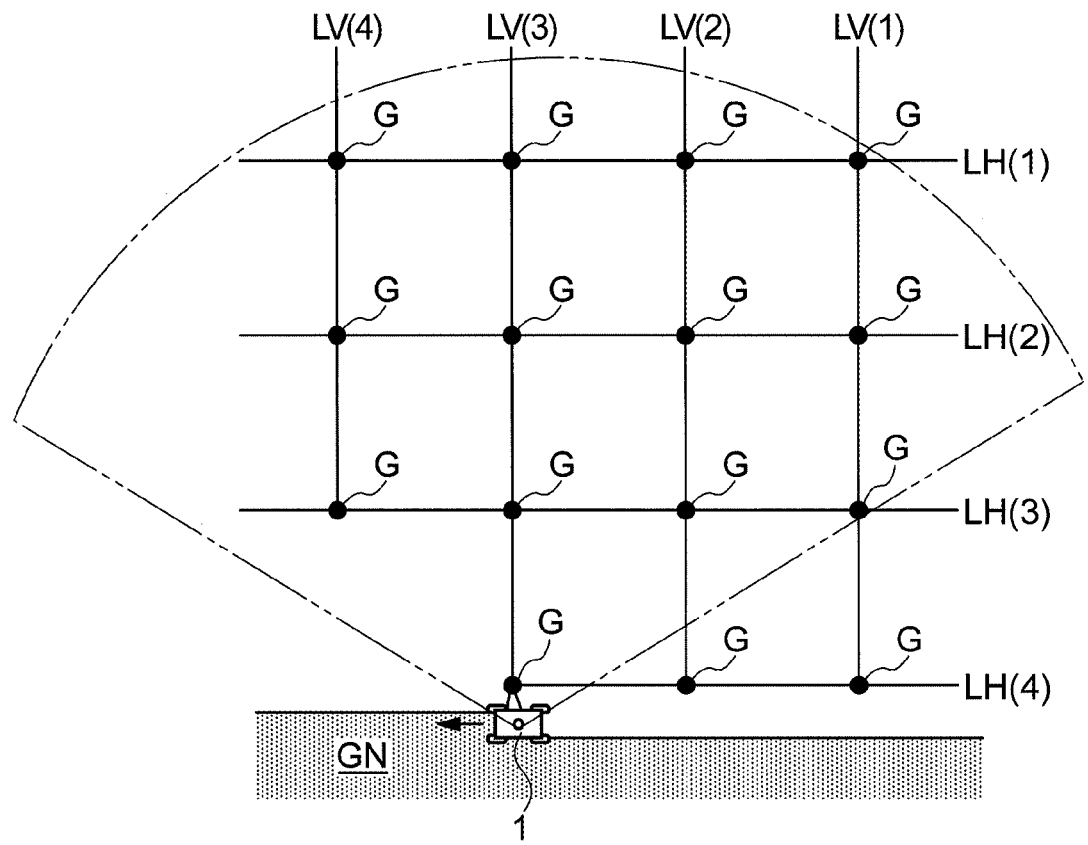
FIG. 20 is a diagram showing the second embodiment, and specifically is an illustrative diagram showing a variation regarding target line calculation.

(2) Aspects of the discharging of the clumped cut grass G by the discharge mechanism 104 can be changed as appropriate. For example, as shown in FIG. 20, a configuration is possible in which the clumped cut grass G is discharged so as to be arranged in a grid, and the target line calculation unit 112 calculates horizontal target lines LBH and vertical target lines LBV. According to this configuration, the autonomous traveling control device 113 can cause the traveling machine body 101 to autonomously travel along any of the target lines LBH and LBV in the two directions.

Figure 21:
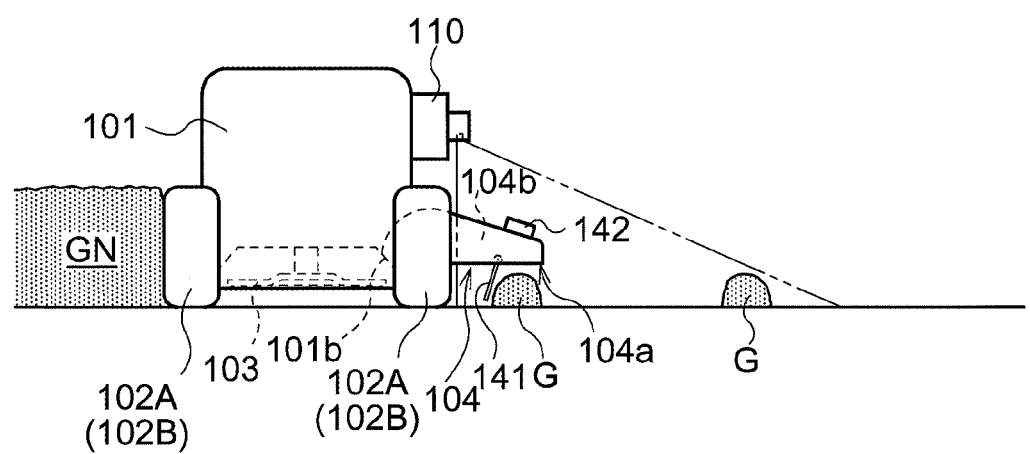
FIG. 21 is a diagram showing the second embodiment, and specifically is an illustrative diagram showing a variation regarding a detection device.

(3) Although the detection device 110 is provided at the upper portion of the traveling machine body 101 in the above embodiment, a configuration is possible in which the detection device 110 is provided at a side portion of the traveling machine body 101. For example, as shown in FIG. 21, a configuration is possible in which the detection device 110 is provided in a side portion of the traveling machine body 101 that is on the side corresponding to the discharge mechanism 104, that is to say the side portion that corresponds to the mowed ground surface. According to this configuration, even if cut grass is located directly below the detection device 110, the detection device 110 can detect that cut grass. Accordingly, the detection device 110 can detect the clumped cut grass G immediately after being discharged from the discharge mechanism 104.

Figure 22:
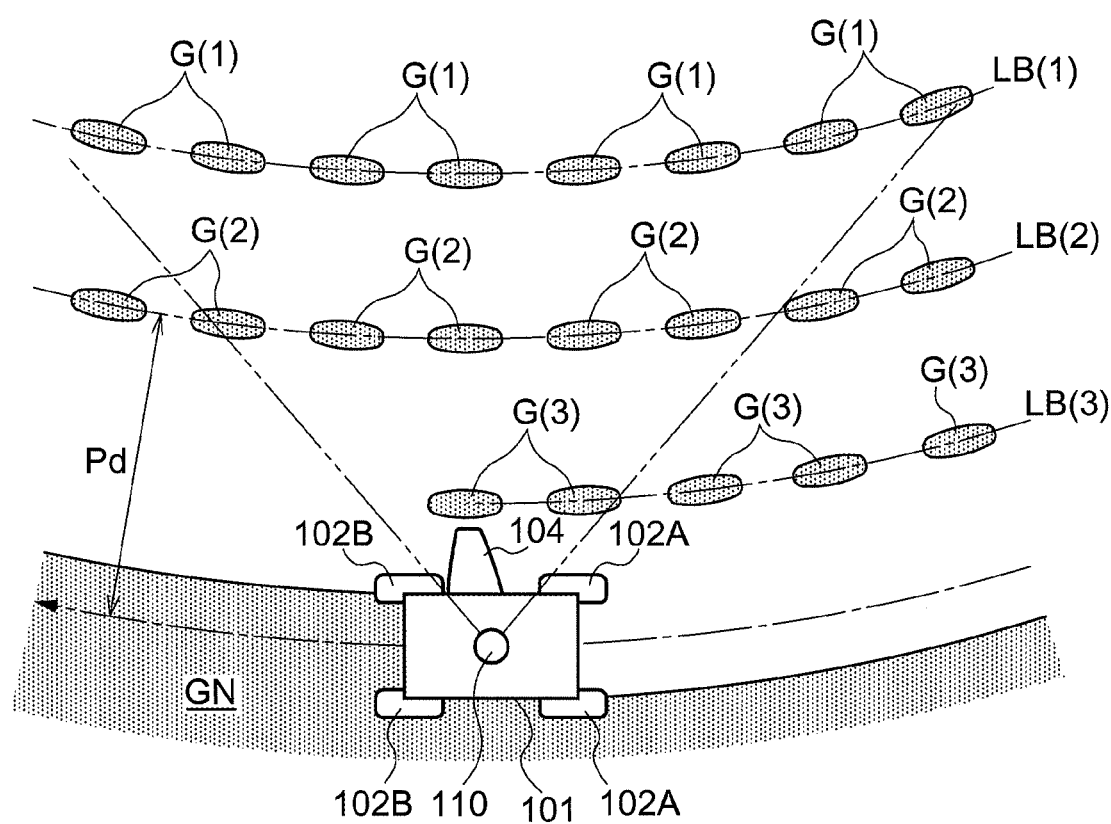
FIG. 22 is a diagram showing the second embodiment, and specifically is an illustrative diagram showing a variation regarding target line calculation.

(4) In the configuration of the above embodiment, the target line calculation unit 112 is configured to calculate a straight target line LB based on clumped cut grass G that was discharged in a straight line on the mowed ground surface, but the present invention is not limited to the above embodiment. For example, as shown in FIG. 22, a configuration is possible in which, during teaching traveling, the traveling machine body 101 travels in arcs, clumped cut grass G(1) to G(3) is discharged in arc lines, the portions of clumped cut grass G detected by the detection device 110 form arcs, and the target line calculation unit 112 calculates curved target lines LB(1) to LB(3) based on approximate curved lines with respect to the portions of clumped cut grass G.

(5) In the configuration of the above embodiment, the target line calculation unit 112 is configured to calculate the first target line LB with use of the clumped cut grass G that was discharged by the discharge mechanism 104 during teaching traveling, but the present invention is not limited to the above embodiment. For example, the target line calculation unit 112 may be configured to calculate the first target line LB with use of target objects that have been provided on the ground surface or the like in advance, instead of using the clumped cut grass G. Examples of such target objects include rope, a block fence, an earth pile or retaining wall, a fence or guard rail, traffic cones arranged in a line, and cone bars extending between such traffic cones. Another example of such target objects is trees or the like planted at equal intervals.

(6) In the configuration of the above embodiment, the detection device 110 continuously performs periodic scanning and detects a line of clumped cut grass G that was discharged during teaching traveling, and the target line calculation unit 112 continuously calculates a target line LB based on an approximate line with respect to the line of clumped cut grass G that was detected by the detection device 110, but the present invention is not limited to the above embodiment. For example, the target line calculation unit 112 may be configured to calculate the target line LB only one time based on an approximate line with respect to the line of clumped cut grass G. In this case, a configuration is possible in which travel control is performed based on an inertial sensor (not shown) or the like such that the traveling machine body 101 travels in a direction from the start of the target line LB to the end thereof.

(7) Although the switching mechanism 141 is provided in the discharge mechanism 104 in the above embodiment, the switching mechanism 141 is not necessary required, and a configuration is possible in which the switching mechanism 141 is not provided in the discharge mechanism 104.

(8) The detection device 110 in the above embodiment does not need to be an LRF, and may be the image sensor of a camera or the like.

(9) Although the case where the autonomous traveling mowing machine performs mowing while autonomously traveling is described in the above embodiment, the autonomous traveling mowing machine can be used as another work vehicle such as a chemical spraying vehicle.

Third Embodiment

The following describes a third embodiment of the present invention with reference to the drawings.

Basic Configuration of Mowing Machine

The following describes an embodiment of a mowing machine according to the present invention with reference to the drawings.

Figure 23:
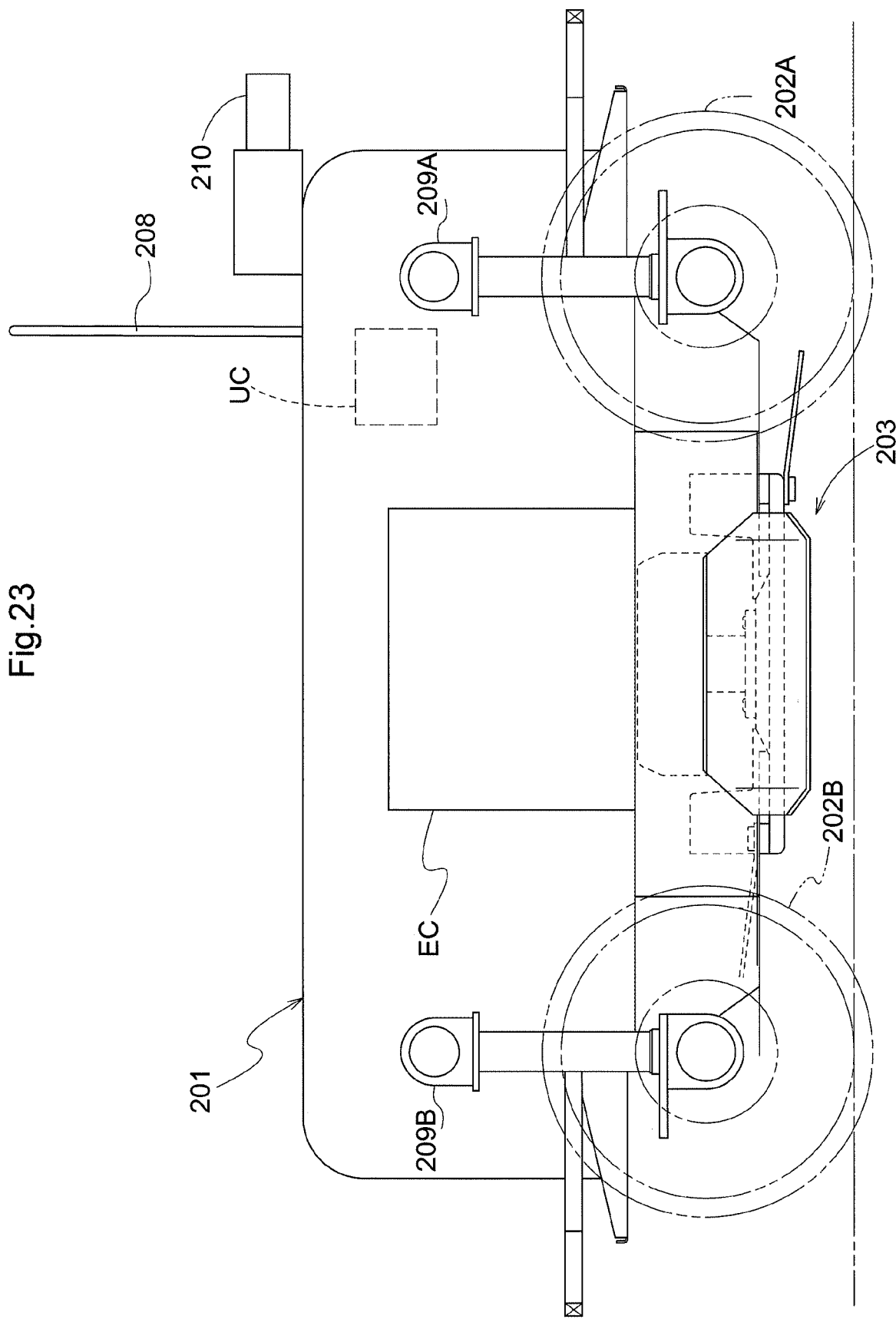
FIG. 23 is a diagram showing a third embodiment, and specifically is a side view of a configuration of a mowing machine.

As shown in FIG. 23, a mowing machine illustrated in the present embodiment includes a traveling machine body 201, first wheels 202A, second wheels 202B, and a mowing device 203. A pair of left and right first wheels 202A are provided on one end side of the traveling machine body 201 in the lengthwise direction. A pair of left and right second wheels 202B are provided on the other end side of the traveling machine body 201 in the lengthwise direction. The mowing device 203 is provided between the first wheels 202A and the second wheels 202B in the lower portion of the traveling machine body 201.

An antenna 208 for communication with a transmitter 207 (see FIG. 26) is provided at an upper portion of the traveling machine body 201. The transmitter 207 is configured to enable manual operation of the mowing machine while being held by an operator. The transmitter 207 may enable operations with use of a proportional type of controller that is operated in the worker's hands, or may enable operations with use of a mobile terminal device that has a touch panel type of display screen.

Figure 24:
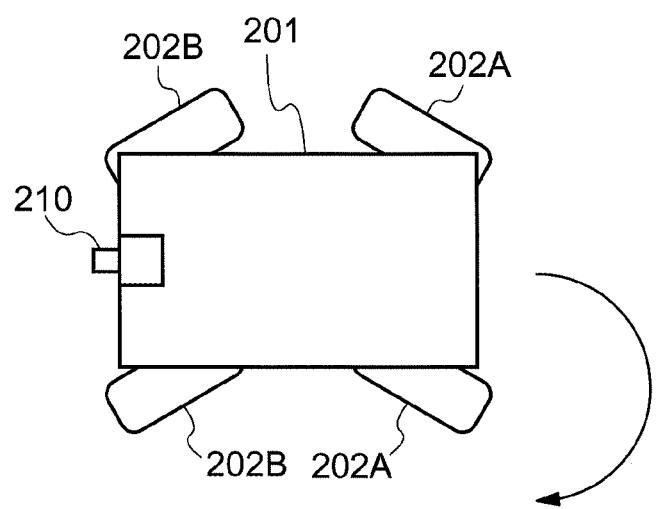
FIG. 24 is a diagram showing the third embodiment, and specifically is a plan view of a turning state.
Figure 25:
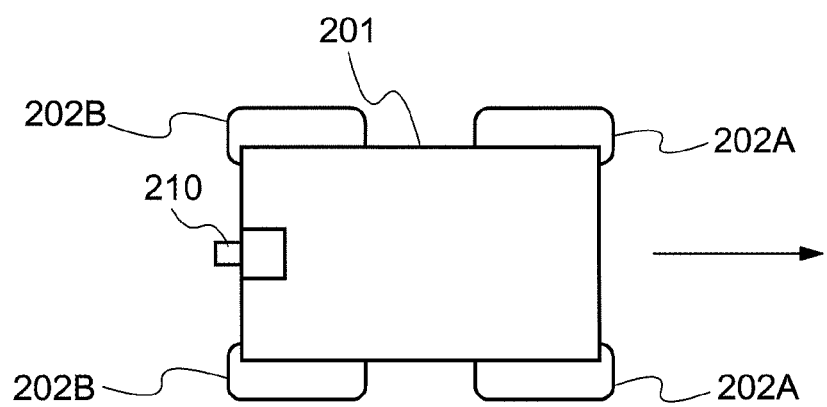
FIG. 25 is a diagram showing the third embodiment, and specifically is a plan view of a straight advancing state.

Although not shown, the traveling machine body 201 is provided with a transmission mechanism that transmits motive power from an engine EC to the first wheels 202A and the second wheels 202B, and also transmits motive power to the mowing device 203. The transmission mechanism is configured to be capable of engaging and disengaging the transmission of motive power to the first wheels 202A and the second wheels 202B and also to the mowing device 203. Due to motive power being transmitted from the engine EC to the first wheels 202A and the second wheels 202B and to the mowing device 203, it is possible to perform mowing while the machine body travels. The first wheels 202A are provided with a first steering motor 209A, and the first wheels 202A are configured to be steerable by swinging about a vertical axis with use of drive power from the first steering motor 209A. Also, the second wheels 202B are provided with a second steering motor 209B, and the second wheels 202B are configured to be steerable by swinging about a vertical axis with use of drive power from the second steering motor 209B. As shown in FIGS. 24 and 25, the first wheels 202A and the second wheels 202B can both change orientation between any of a straight advancing orientation, a right swing orientation, and a left swing orientation.

A distance sensor 210 is provided at a front upper portion or a rear upper portion of the traveling machine body 201. The distance sensor 210 is an LRF (Laser Range Finder) for example, and transmits an air-propagating signal, such as laser beams or ultrasonic waves, as a detection signal. When a detection signal strikes a detection object, the detection signal is reflected by the surface of the detection object. The distance sensor 210 then acquires, as a reflection signal, the detection signal that was reflected by the surface of the detection object. In other words, the distance sensor 210 transmits a detection signal toward a detection range of the distance sensor 210, and acquires a reflection signal with respect to the detection signal. The distance sensor 210 is configured to then calculate the distance between the distance sensor 210 and the detection object based on the time from transmission of the detection signal to the acquisition of the reflection signal. The process in which the distance sensor 210 transmits a detection signal and acquires a reflection signal is hereinafter called "scanning".

An inclination angle detection unit 211 provided in the traveling machine body 201 is an IMU (Inertial Measurement Unit), which is one example of an inertial sensor, and the inclination angle detection unit 211 detects the inclination of the traveling machine body 201 and outputs inclination angle information ImC.

Control Configuration

Figure 26:
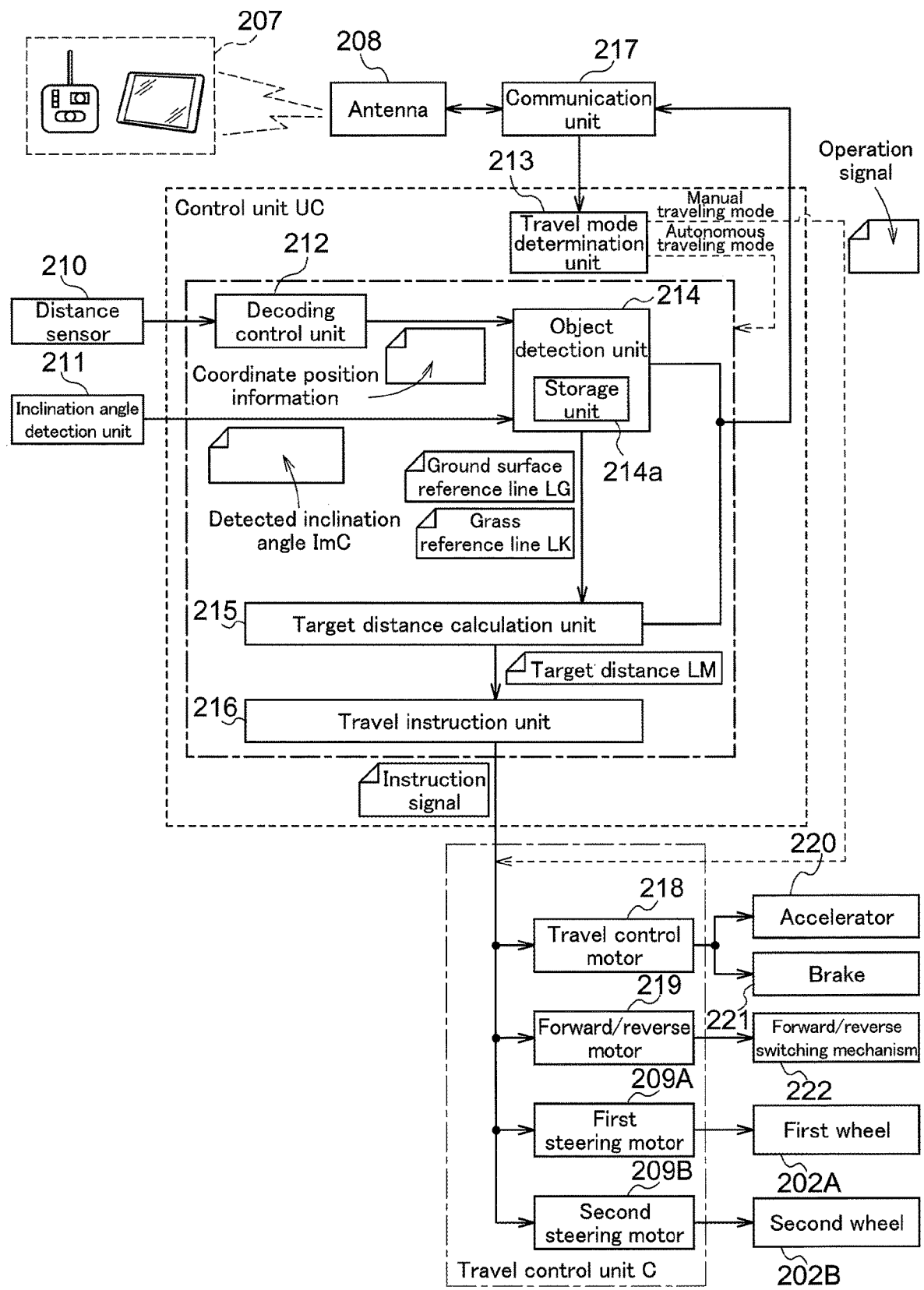
FIG. 26 is a diagram showing the third embodiment, and specifically is a block diagram showing a control unit.

As shown in FIG. 26, a control unit UC, which enables the mowing machine to autonomously travel, is provided in the mowing machine in the form of being integrated in a microcomputer, for example. The control unit UC is provided with a decoding control unit 212, a travel mode determination unit 213, an object detection unit 214, a target distance calculation unit 215, and a travel instruction unit 216. The decoding control unit 212 calculates coordinate position information that includes a horizontal distance from the distance sensor 210 in the machine body left-right direction and a vertical distance from the distance sensor 210 in the machine body up-down direction, based on distances calculated through scanning performed by the distance sensor 210 and scan angles during calculation. The control unit UC is also configured to enable switching between an autonomous travel mode and a manual travel mode, and whether the current mode is the autonomous travel mode or the manual travel mode is determined in accordance with a determination made by the travel mode determination unit 213.

Although described in more detail later, the object detection unit 214 generates a ground surface reference line LG, which is an approximate straight line that represents the mowed ground surface based on coordinate position information, and a grass reference line LK, which is an approximate straight line that represents a line of uncut grass. The object detection unit 214 is provided with a storage unit 214a, and the storage unit 214a is a RAM (Random Access Memory) or the like that chronologically stores the coordinate position information calculated by the decoding control unit 212. The ground surface reference line LG and the grass reference line LK are generated using the coordinate position information stored in the storage unit 214a.

The target distance calculation unit 215 calculates the separation distance between the grass reference line LK and the distance sensor 210. The target distance calculation unit 215 also calculates a target distance LM, which is for causing the traveling machine body 201 to favorably perform traveling mowing while keeping a separation distance between the position of the distance sensor 210 and the grass reference line LK. The travel instruction unit 216 outputs a control signal such that the separation distance between the grass reference line LK and the distance sensor 210 is maintained at the target distance LM.

The traveling machine body 201 is provided with a communication unit 217 that can receive, via the antenna 208, operation signals wirelessly transmitted by the transmitter 207. The information received by the communication unit 217 is input to the control unit UC. In the manual travel mode, traveling mowing and the like is performed based on manual operations made via the transmitter 207. The travel instruction unit 216 is therefore disabled in the manual travel mode, and a configuration is possible in which the object detection unit 214 and the target distance calculation unit 215 are also disabled in conjunction with the travel instruction unit 216.

The travel instruction unit 216 outputs signals to a travel control unit C, and the travel control unit C is provided with a travel control motor 218, a forward/reverse motor 219, the first steering motor 209A, and the second steering motor 209B. The travel control motor 218 operates an accelerator 220 that adjusts the amount of fuel supplied to the engine EC, and brakes 221 that brake the first wheels 202A and the second wheels 202B. The forward/reverse motor 219 switches a forward/reverse switching mechanism 222. Although not shown, the forward/reverse switching mechanism 222 is provided in the transmission device that transmits motive power from the engine EC to the first wheels 202A and the second wheels 202B, and is a gear mechanism for switching the motive power from the engine EC between a forward direction and a reverse direction. The first steering motor 209A steers the first wheels 202A, and the second steering motor 209B steers the second wheels 202B. The travel control motor 218 and the forward/reverse motor 219 may each be an electric motor or an electromagnetic switch.

When the travel mode is the autonomous travel mode, the travel control unit C performs control based on instruction signals from the travel instruction unit 216. When the travel mode is the manual travel mode, operation signals that are based on manual operations made on the transmitter 207 are input to the travel control unit C via the communication unit 217 and the travel mode determination unit 213, and the travel control unit C performs control based on such operation signals.

The status of the mowing machine can be transmitted from the communication unit 217 to a device that is outside the machine body, and the current position and status of the mowing machine can also be displayed on the display screen of a mobile terminal device, for example. The status of the mowing machine may include the speed during traveling mowing, the remaining fuel amount, and problems regarding various devices included in the mowing machine.

Uncut Grass Detection Processing

Figure 27:
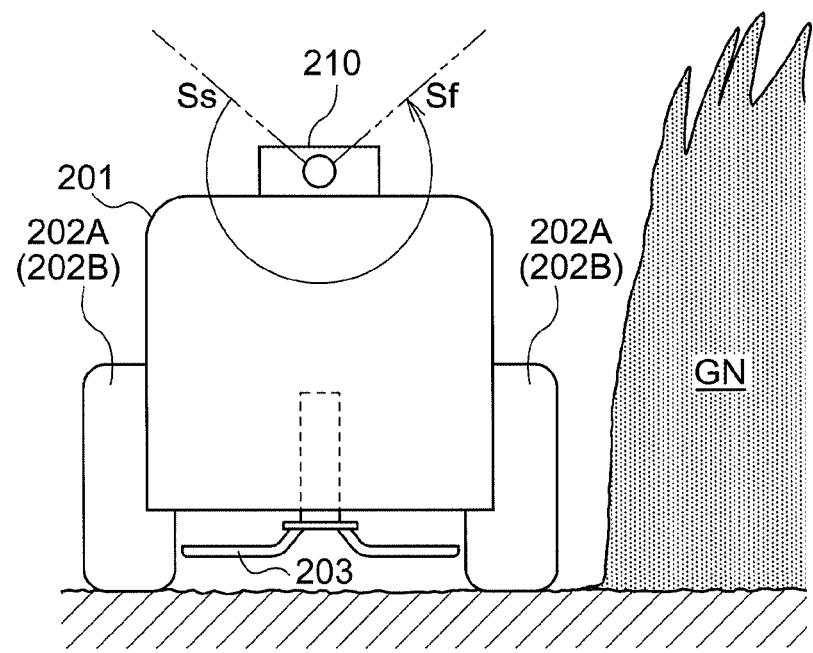
FIG. 27 is a diagram showing the third embodiment, and specifically is a front view of traveling mowing performed by the mowing machine.

As shown in FIG. 27, when the mowing machine performs mowing while autonomously traveling, the distance sensor 210 performs scanning while rotating about the front-rear direction of the traveling machine body 201 so as to acquire the separation distance of the distance sensor 210 from the ground surface and uncut grass (region denoted by GNC in FIG. 27). In the present embodiment, the scanning performed by the distance sensor 210 is performed in the counter-clockwise direction shown in FIG. 27 over a scan angle range of 270 degrees between a scan angle Ss and a scan angle Sf, which are respectively angles of 45 degrees to the left and right of the vertically upward direction of the machine body. Note that the inclination angles of the scan angle Ss and the scan angle Sf can be changed as appropriate, and are not required to be the same inclination angle.

Through the scanning performed by the distance sensor 210, distance information that is based on a reflection signal is acquired at each scan angle during the scanning of the distance sensor 210. Using a method that employs a trigonometric function or the like, the decoding control unit 212 converts the scan angles and the distance information into a horizontal distance from the distance sensor 210 in the machine body left-right direction and a vertical distance from the distance sensor 210 in the machine body up-down direction. Accordingly, the distance information acquired through scanning performed by the distance sensor 210 over time is successively converted into two-dimensional coordinate position information, and the set of coordinate position information is stored in the storage unit 214a provided in the object detection unit 214.

Figure 28:
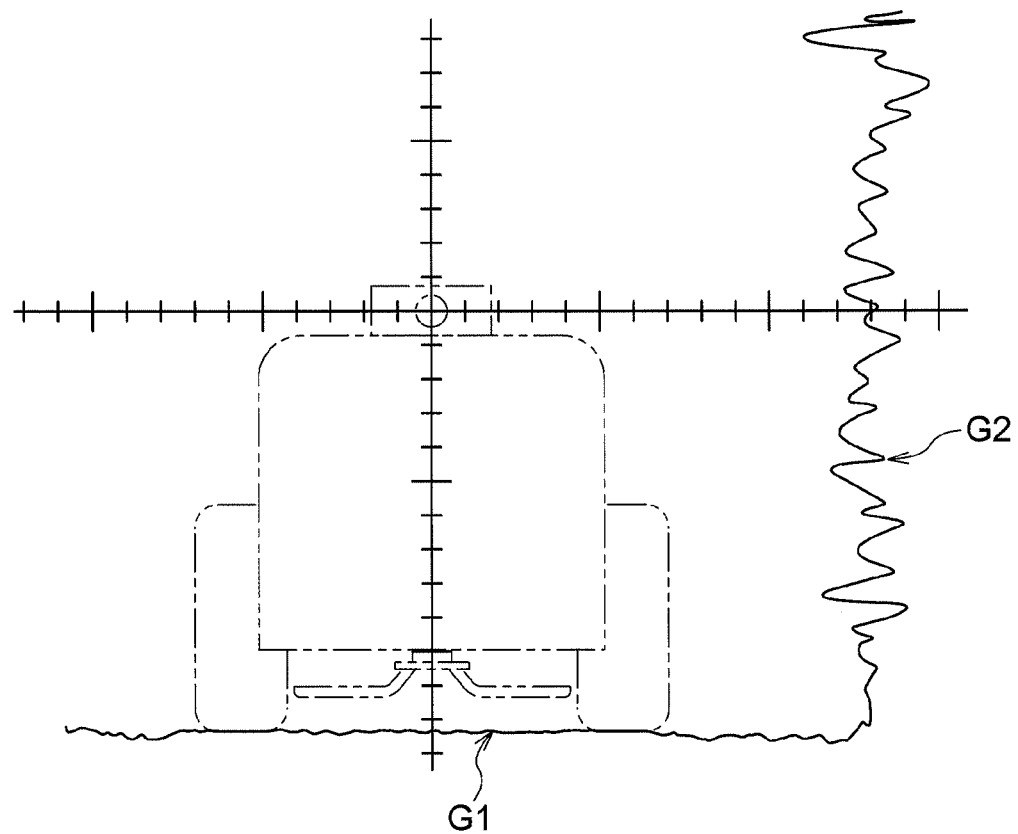
FIG. 28 is a diagram showing the third embodiment, and specifically shows a graph of two-dimensional coordinate position information based on a scan performed by a distance sensor.

The set of two-dimensional coordinate position information is expressed as a waveform as shown in FIG. 28, and this waveform is a digital waveform plotted based on the set of coordinate position information. The coordinate center is the rotation axis center of the scan angle of the distance sensor 210. The waveform extending in the left-right direction below the coordinate center is a ground surface line G1 that indicates the mowed ground surface, and the waveform extending in the up-down direction to the right of the coordinate center is an uncut grass line G2 that indicates uncut grass. Accordingly, ground height data with respect to the uncut grass line G2 and the ground surface line G1 is obtained.

Note that although the uncut grass line G2 in FIG. 28 is located at a distance from the side portion of the machine body, this is merely one example. For example, in the case where the distance sensor 210 is located at the front end portion of the traveling machine body 201, given that uncut grass exists in front of the machine body, the uncut grass line G2 would be thought to be located at a position overlapped with the machine body. As another example, if the distance sensor 210 is located at the rear end portion of the traveling machine body 201, the uncut grass line G2 would be thought to be located at a position contact with a horizontal side portion of the machine body.

Next, an example of a specific procedure for detecting uncut grass will be described based on FIG. 29. In this procedure, in one example of one cycle of scanning, scanning starts at the scan angle Ss, moves over the ground surface, and then ends at the scan angle Sf, and this scanning from the scan angle Ss to the scan angle Sf is performed repeatedly.

The scanning performed by the distance sensor 210 starts at the scan angle Ss (step #1). The scanning continues as the distance sensor 210 rotates over various scan angles (step #2), the distance information acquired through scanning is associated with the scan angles at which scanning was performed, and such information is successively converted into two-dimensional coordinate position information by the decoding control unit 212 (step #3). The processing of step #2 and the processing of step #3 continue until the scan angle of the distance sensor 210 reaches the scan angle Sf.

Figure 30:
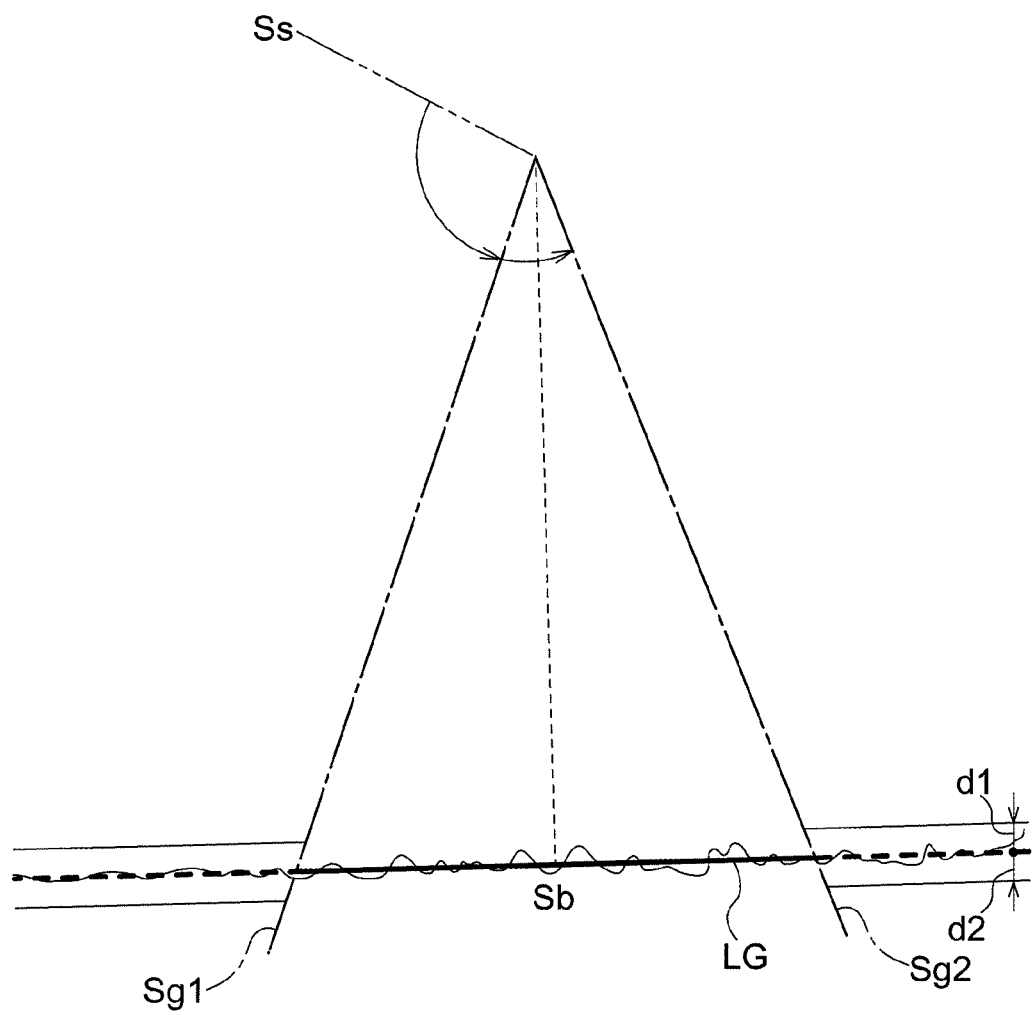
FIG. 30 is a diagram showing the third embodiment, and specifically is an illustrative diagram showing mowed ground surface determination.

If the scan angle of the distance sensor 210 has reached a scan angle Sg2 (see FIG. 30) corresponding to a timing for identifying the mowed ground surface, and furthermore the ground surface reference line LG has not been generated (step #4: Yes), the ground surface reference line LG, which is identified as the mowed ground surface line, is generated by the object detection unit 214 (step #5). As shown in FIG. 30, the generated ground surface reference line LG is an approximate straight line that is based on coordinate information that corresponds to the range between a scan angle Sg1 of the distance sensor 210 and the scan angle Sg2 of the distance sensor 210. The coordinate position information in a range between distances d1 and d2 from the ground surface reference line LG in the up-down direction is identified as ground surface coordinate position information (ground surface data).

The scan angle Sg1 and the scan angle Sg2 are bilaterally symmetrically inclined from a scan angle Sb at which the distance sensor 210 faces vertically downward relative to the traveling machine body 201. In the configuration of the present embodiment, the scan angle Sg1 and the scan angle Sg2 are inclined 10 degrees to the left and right of the scan angle Sb, but these inclination angles can be changed as appropriate, and may be an inclination angles that correspond to the left-right width of the traveling machine body 201, for example. Also, the scan angle Sg1 and the scan angle Sg2 are not required to be bilaterally symmetric about the scan angle Sb.

The distances d1 and d2 from the ground surface reference line LG in the up-down direction are both set to 10 cm for example, but this value can be changed as appropriate. Also, the distances d1 and d2 are not required to be the same value.

Figure 31:
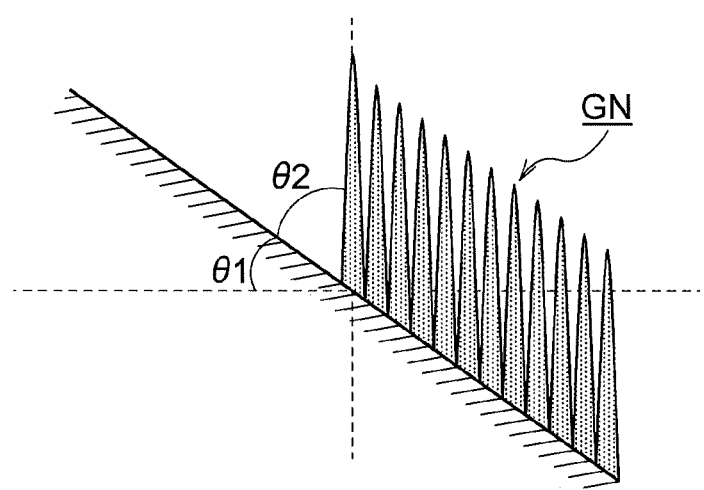
FIG. 31 is a diagram showing the third embodiment, and specifically is an illustrative diagram showing the calculation of a relative angle between an inclined surface and uncut grass.

When the generation of the ground surface reference line LG is complete, a calculated uncut grass inclination angle θ2 relative to the mowed ground surface is calculated by the object detection unit 214 (step #6). A mowed ground surface inclination angle θ1 is calculated based on the detected inclination angle ImC output by the inclination angle detection unit 211. The inclination angle θ1 may be the instantaneous measurement value of the detected inclination angle ImC, or may be the average value of multiple past detected inclination angles ImC that were output periodically. As shown in FIG. 31, it is generally known that uncut grass grows upward in the vertical direction even on sloped land, and the calculated uncut grass inclination angle θ2 relative to the mowed ground surface is calculated using the following expression.

calculated inclination angle θ2=90°−θ1

The distance sensor 210 continues to perform scanning, and the object detection unit 214 determines whether or not the coordinate position information, which is based on the scanning performed by the distance sensor 210, is grass coordinate position information (grass data) (step #7). In the present embodiment, the coordinate position information in the range between distances d1 and d2 from the ground surface reference line LG in the up-down direction is identified as the ground surface data. For this reason, the object detection unit 214 determines that the coordinate position information outside the range between the distances d1 and d2 is grass data.

Figure 32:
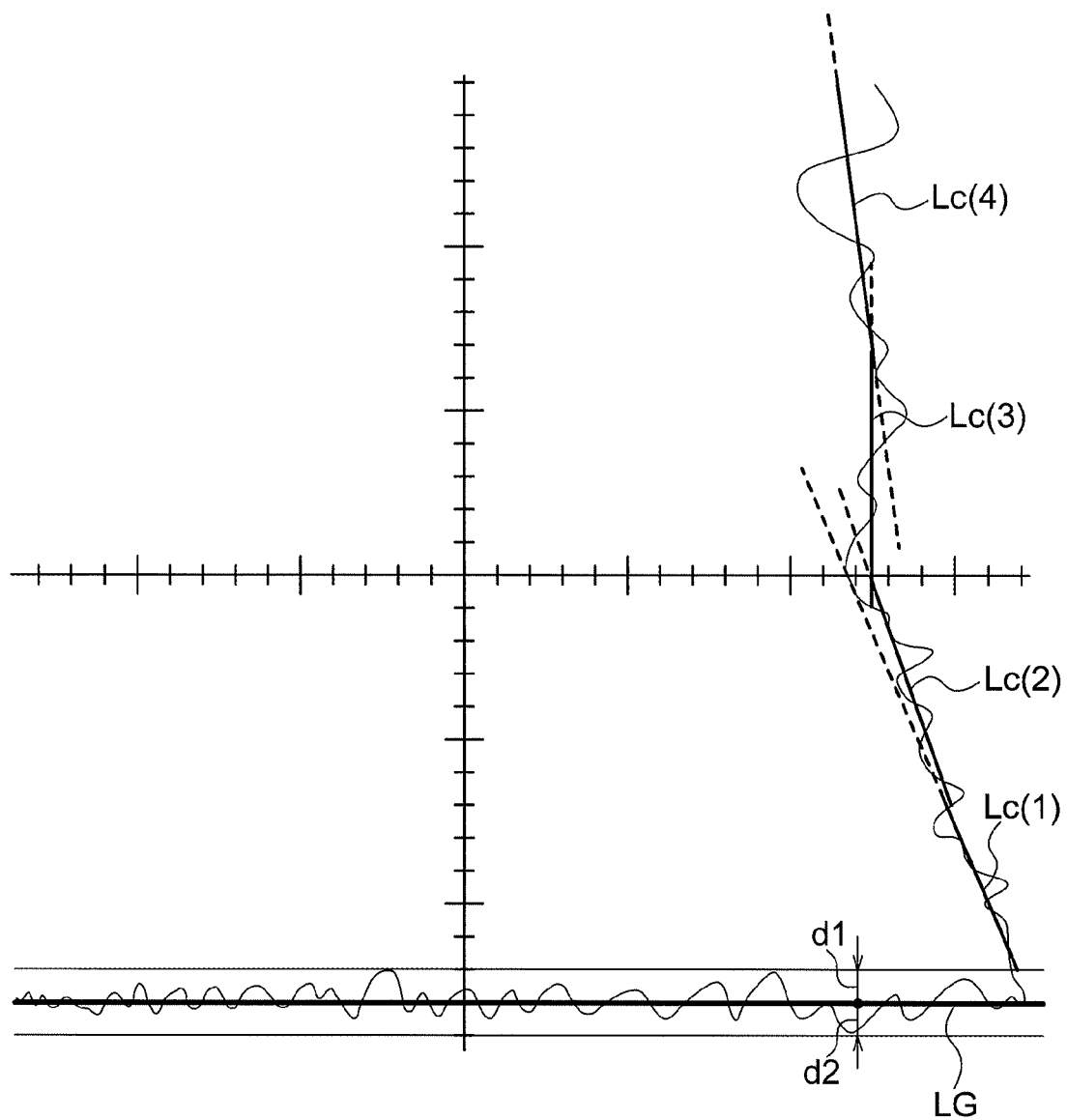
FIG. 32 is a diagram showing the third embodiment, and specifically is an illustrative diagram showing the generation of a grass candidate line and a grass reference line.

In order to prevent erroneous detection, the object detection unit 214 determines whether or not a pre-set number of grass data pieces have been detected consecutively (step #8). If the pre-set number of grass data pieces have been detected consecutively (step #8: Yes), the object detection unit 214 generates a grass candidate line Lc based on that grass data (step #9). The number of consecutive detections used to determine whether or not the grass candidate line Lc can be generated can be changed as appropriate in accordance with the weather, the season, and the type of uncut grass. The object detection unit 214 generates multiple grass candidate lines Lc before the scan angle of the distance sensor 210 reaches the scan angle Sf. FIG. 32 shows a state in which four grass candidate lines Lc have been generated, from a grass candidate line Lc(1) that is closest to the side corresponding to the ground surface reference line LG to a grass candidate line Lc(4) that is farthest from the side corresponding to the ground surface reference line LG. The number of grass candidate lines Lc generated by the object detection unit 214 can be changed as appropriate.

Figure 33:
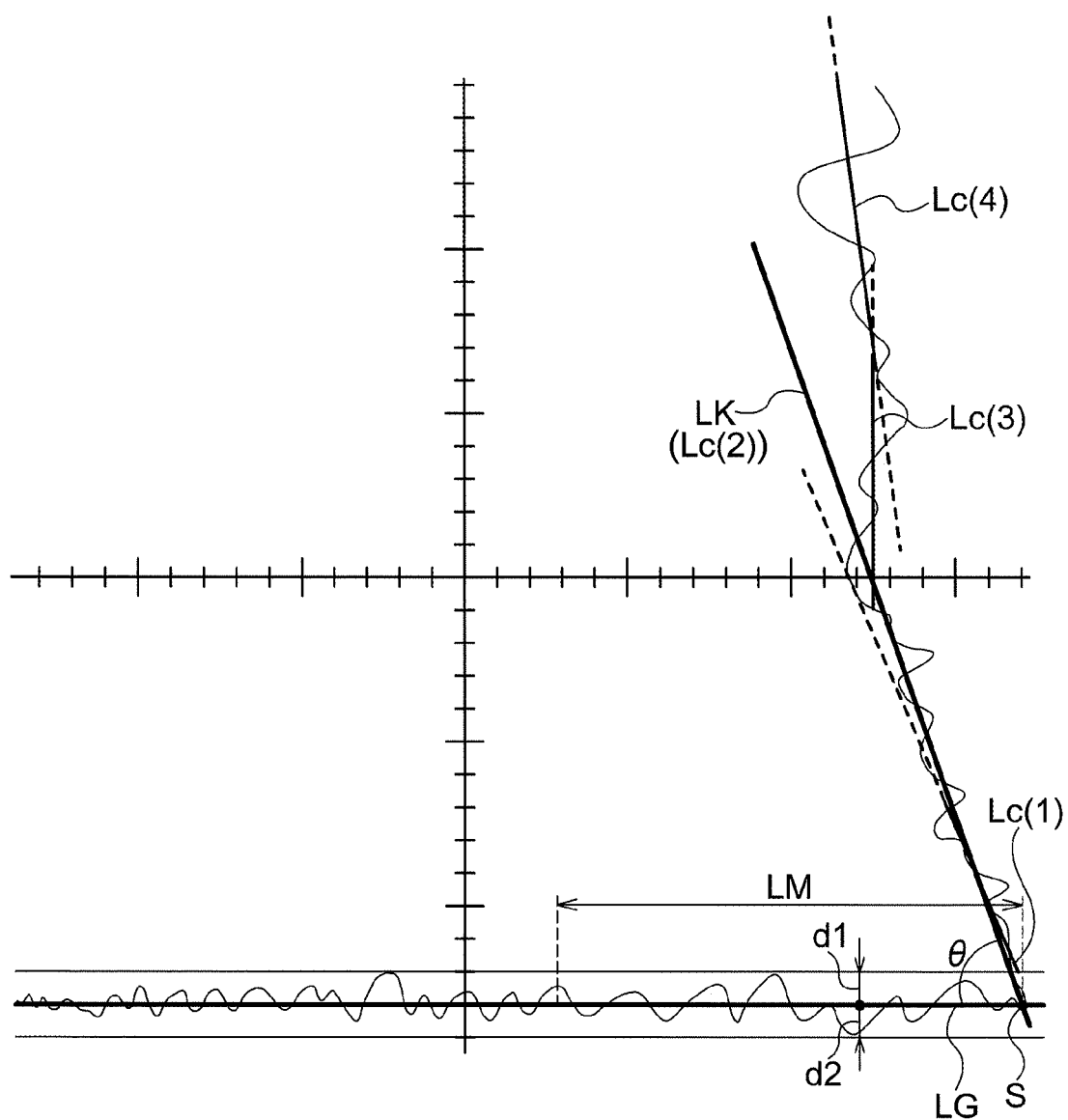
FIG. 33 is a diagram showing the third embodiment, and specifically is an illustrative diagram showing target distance calculation.

When the scan angle of the distance sensor 210 reaches the scan angle Sg2 (step #10: Yes), the scanning performed by the distance sensor 210 ends. Thereafter, the object detection unit 214 repeatedly performs the processing of step #10 and the processing of step #11. Specifically, the inclination angle from the ground surface reference line LG (hereinafter, called the "relative angle θ") is calculated for each grass candidate line Lc (step #11). The object detection unit 214 then compares the relative angle θ and the calculated inclination angle θ2 (step #12). If the relative angle θ is within a pre-set range from the calculated inclination angle θ2 (step #12: match), the object detection unit 214 sets the corresponding grass candidate line Lc as the grass reference line LK (step #13). In FIG. 33, the grass reference line LK is based on the grass candidate line Lc(2). In this case, the object detection unit 214 determines that the relative angle θ of the grass candidate line Lc(2) from the ground surface reference line LG is within the pre-set range from the calculated inclination angle θ2, and that grass candidate line Lc is set as the grass reference line LK.

Here, the object detection unit 214 may be configured to set, as the grass reference line LK, the first grass candidate line Lc whose relative angle θ was determined to be within the pre-set range from the calculated inclination angle θ2. Also, the object detection unit 214 may be configured to calculate the relative angle θ from the ground surface reference line LG for all of the grass candidate line Lc, and then set the grass candidate line Lc whose relative angle θ mostly closely approximates the calculated inclination angle θ2 as the grass reference line LK.

After the grass reference line LK is set, the target distance calculation unit 215 calculates an intersection S between the ground surface reference line LG and the grass reference line LK. The separation distance between the intersection S and the distance sensor 210 is then calculated, and a target distance LM that is favorable for traveling mowing of the traveling machine body 201 is calculated within the separation distance between the intersection S and the traveling machine body 201 (step #14). The target distance LM favorable for traveling mowing of the traveling machine body 201 can be determined based on the inclination angle of the ground surface and the type and height of the uncut grass, the attachment position of the distance sensor 210 on the traveling machine body 201, the advancing direction of the traveling machine body 201, and the like.

In this way, the processing from step #1 to step #14 is periodically performed once each time the distance sensor 210 makes one full rotation over the scan angles. Also, in order to suppress fluctuation of the target distance LM, a configuration is possible in which the target distance LM is calculated based on the moving average of multiple past target distances that were calculated periodically.

Variations of Third Embodiment

The present invention is not limited to the configurations illustrated in the above embodiment, and the following are representative variations of the present invention.

(1) In the above embodiment, the object detection unit 214 is configured to generate multiple grass candidate lines Lc before the scan angle of the distance sensor 210 reaches the scan angle Sf, but the present invention is not limited to the above embodiment. For example, a configuration is possible in which, if the ground height of a piece of grass data relative to the ground surface reference line LG is higher than a pre-set height, the object detection unit 214 does not generate a grass candidate line Lc for that piece of grass data. The upper end of uncut grass tends to sway due to wind or the like, and therefore this configuration makes it possible to prevent erroneous grass detection caused by disturbance from wind or the like.

Figure 34:
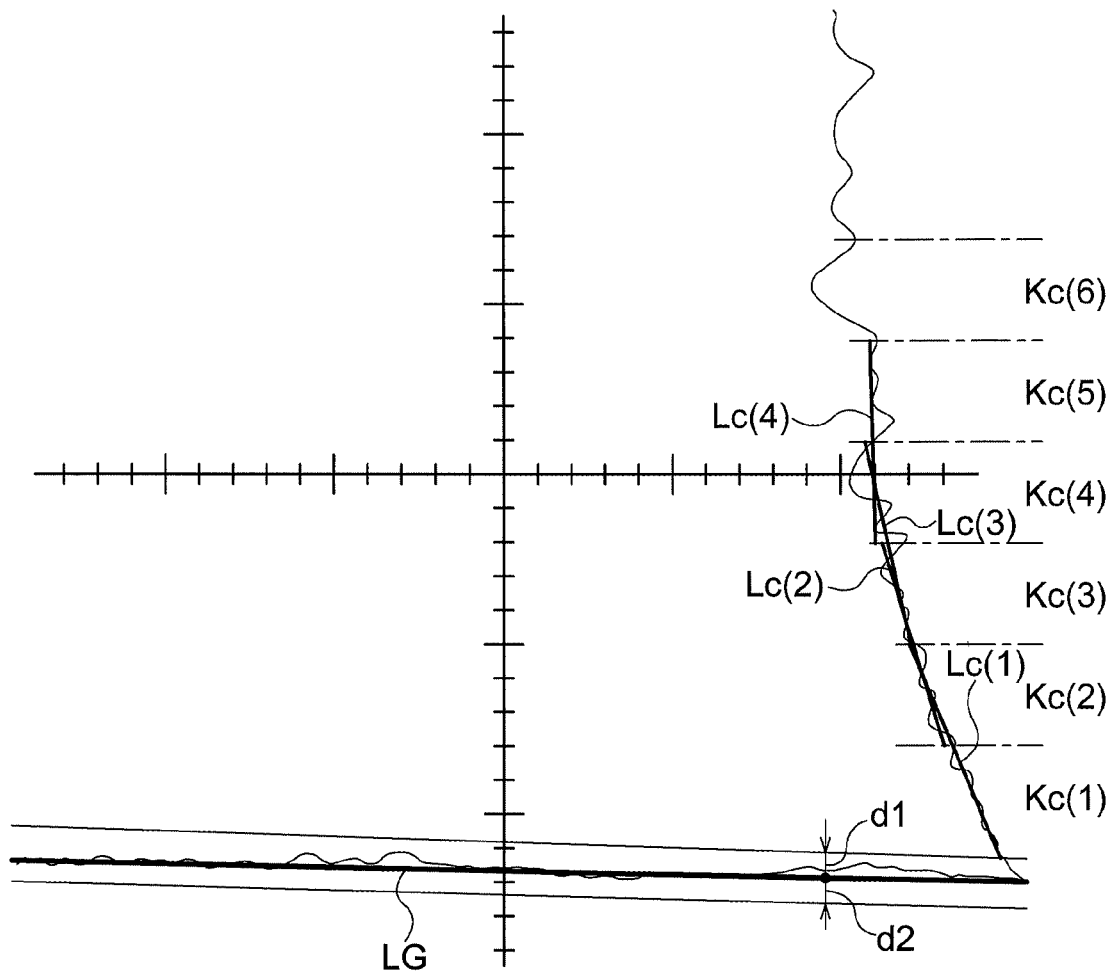
FIG. 34 is a diagram showing the third embodiment, and specifically is an illustrative diagram showing a variation regarding grass candidate line generation.

(2) In the above embodiment, the object detection unit 214 is configured to generate grass candidate lines Lc based on grass data, but the present invention is not limited to the above embodiment. For example, a configuration is possible in which, as shown in FIG. 34, if the pre-set number of grass data pieces have been detected consecutively, the object detection unit 214 stores the grass data pieces as candidate data Kc for generating the grass reference line LK. Specifically, the candidate data Kc is a set of two-dimensional coordinate position information, and multiple pieces of candidate data Kc for the grass reference line LK are stored before the scan angle of the distance sensor 210 reaches the scan angle Sf. Note that the number of consecutive detections used to determine whether or not the candidate data Kc can be stored can be changed as appropriate in accordance with the weather, the season, and the type of uncut grass. The grass candidate lines Lc, which are approximate straight lines, may be generated based on combinations of the pieces of candidate data Kc.

For example, in FIG. 34, candidate data Kc(1) to Kc(6) have been stored. The grass candidate line Lc(1) has been generated based on a combination of the candidate data Kc(1) and the candidate data Kc(2). The grass candidate line Lc(2) has been generated based on a combination of the candidate data Kc(2) and the candidate data Kc(3). The grass candidate lines Lc(3) to Lc(5) have also been generated based on the same pattern as the grass candidate line Lc(1) and the grass candidate line Lc(2). A configuration is possible in which the relative angle θ with respect to the ground surface reference line LG is calculated for each grass candidate line Lc, and if the relative angle θ is in a pre-set range from the calculated inclination angle θ2, that grass candidate line Lc is set as the grass reference line LK. The combination of pieces of candidate data Kc used when generating the grass candidate lines Lc can be changed as appropriate, and for example, a configuration is possible in which if the relative angle θ is not in a pre-set range from the calculated inclination angle θ2, the combination of pieces of candidate data Kc is changed, and the grass candidate line Lc is generated based on a new combination.

Figure 35:
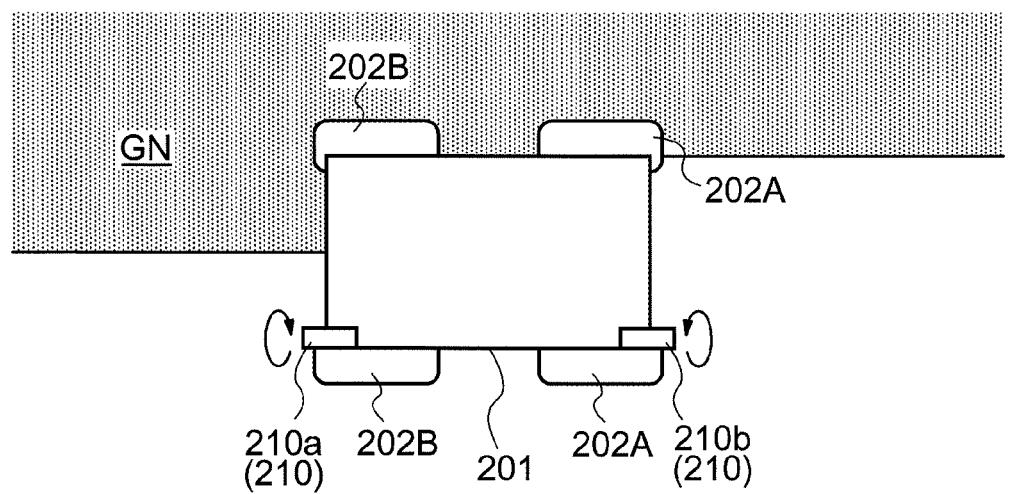
FIG. 35 is a diagram showing the third embodiment, and specifically is a plan view of a variation regarding distance sensor scanning.

(3) Although the distance sensor 210 is provided at the front upper portion or the rear upper portion of the traveling machine body 201 in the above embodiment, the present invention is not limited to the above embodiment. For example, as shown in FIG. 35, two distance sensors 210 may be provided, namely a distance sensor 210a provided at the front upper portion of the traveling machine body 201 and a distance sensor 210b provided at the rear upper portion of the traveling machine body 201. In FIG. 35, GNC denotes uncut grass. Also, the distance sensor 210a and the distance sensor 210b may be provided in left and right side end portions of the traveling machine body 201. The unmowed ground surface and the uncut grass GNC are scanned by the distance sensor 210a provided at the front portion of the traveling machine body 201. Also, the mowed ground surface and the uncut grass GNC are scanned by the distance sensor 210b provided at the rear portion of the traveling machine body 201. According to this configuration, different target distances LM can be calculated independently at the front and the rear of the traveling machine body 201, thus making it possible to increase the favorability of the instruction signals output by the travel instruction unit 216. Also, when traveling mowing is performed in FIG. 35, if a stone, a post, or the like is detected by the distance sensor 210a, it is possible to take a countermeasure such as stopping rotation of the mowing device 203.

Figure 29:
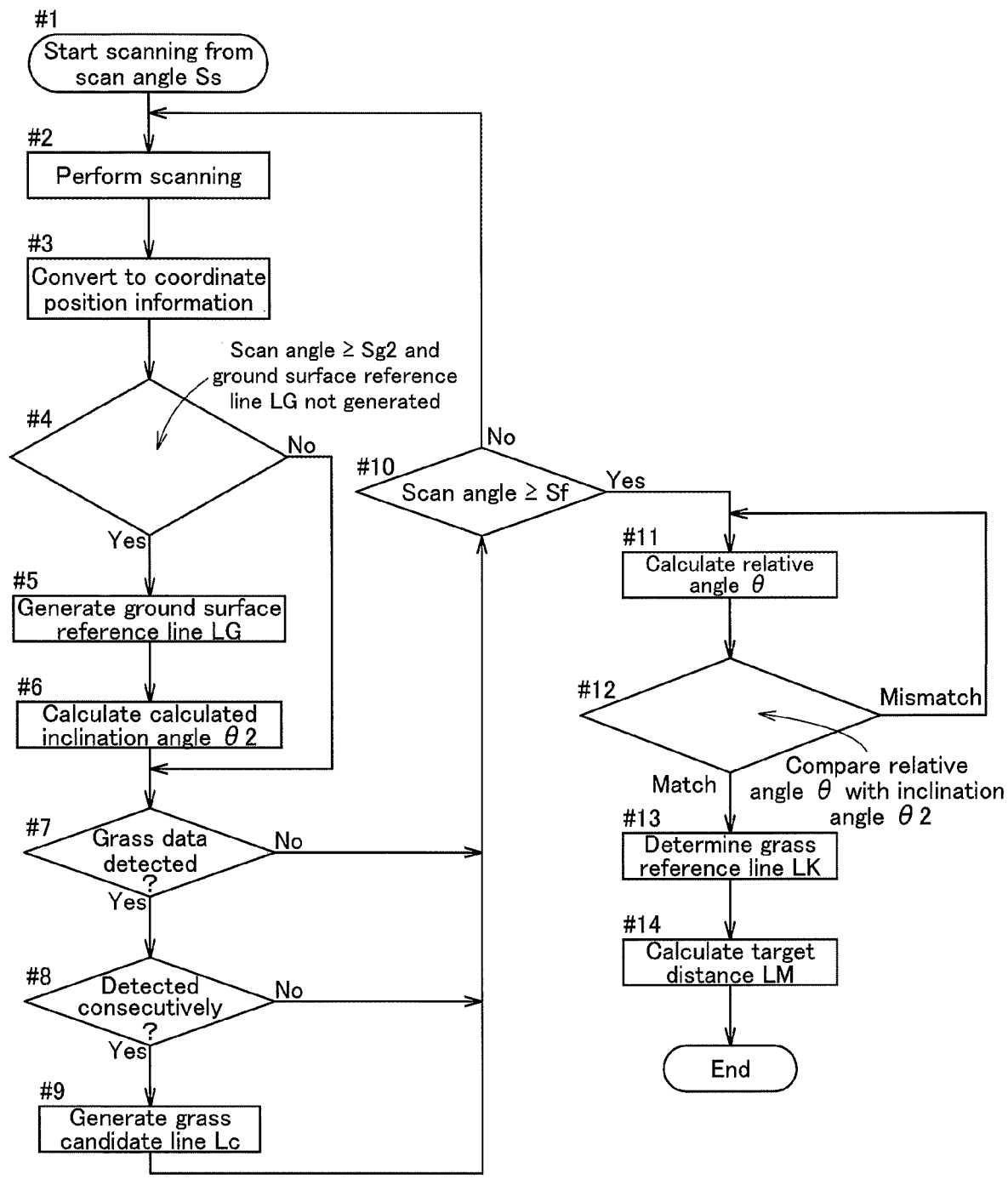
FIG. 29 is a diagram showing the third embodiment, and specifically is a flowchart showing uncut grass detection processing.

(4) In the configuration of the above embodiment, the target distance LM is calculated through the procedure from step #1 to step #14 shown in FIG. 29, but the present invention is not limited to the above embodiment. For example, processing may be performed in which scanning is performed in a range of 270 degrees from the scan angle Ss to the scan angle Sf (step #1 to step #3), the ground surface reference line LG is generated (step #5) and the calculated inclination angle θ2 is calculated (step #6), grass candidate lines Lc are generated based on the detection of grass data (step #7 to step #9), the relative angle θ is calculated (step #11), and then the target distance LM is calculated (step #14). This configuration makes it possible to also handle the case where the scan angle rotates in the reverse direction from the scan angle Sf to the scan angle Ss.

(5) Although the ground surface reference line LG, the grass candidate lines Lc, and the grass reference line LK are each an approximate straight line in the above embodiment, the present invention is not limited to the above embodiment. For example, the ground surface reference line LG, the grass candidate lines Lc, and the grass reference line LK may be approximate curved lines.

(6) Although the case where the mowing machine performs mowing while autonomously traveling is described in the above embodiment, the mowing machine may be a mowing machine in which steering operations in traveling mowing are assisted by manual operation, for example. Also, besides a mowing machine, the above configurations may be applied to a lawn mower or a general mower.

Fourth Embodiment

The following describes a fourth embodiment of the present invention with reference to the drawings.

Basic Configuration of Mowing Machine Autonomous Traveling System

The following describes an embodiment of a mowing machine autonomous traveling system according to the present invention with reference to the drawings.

Figure 36:
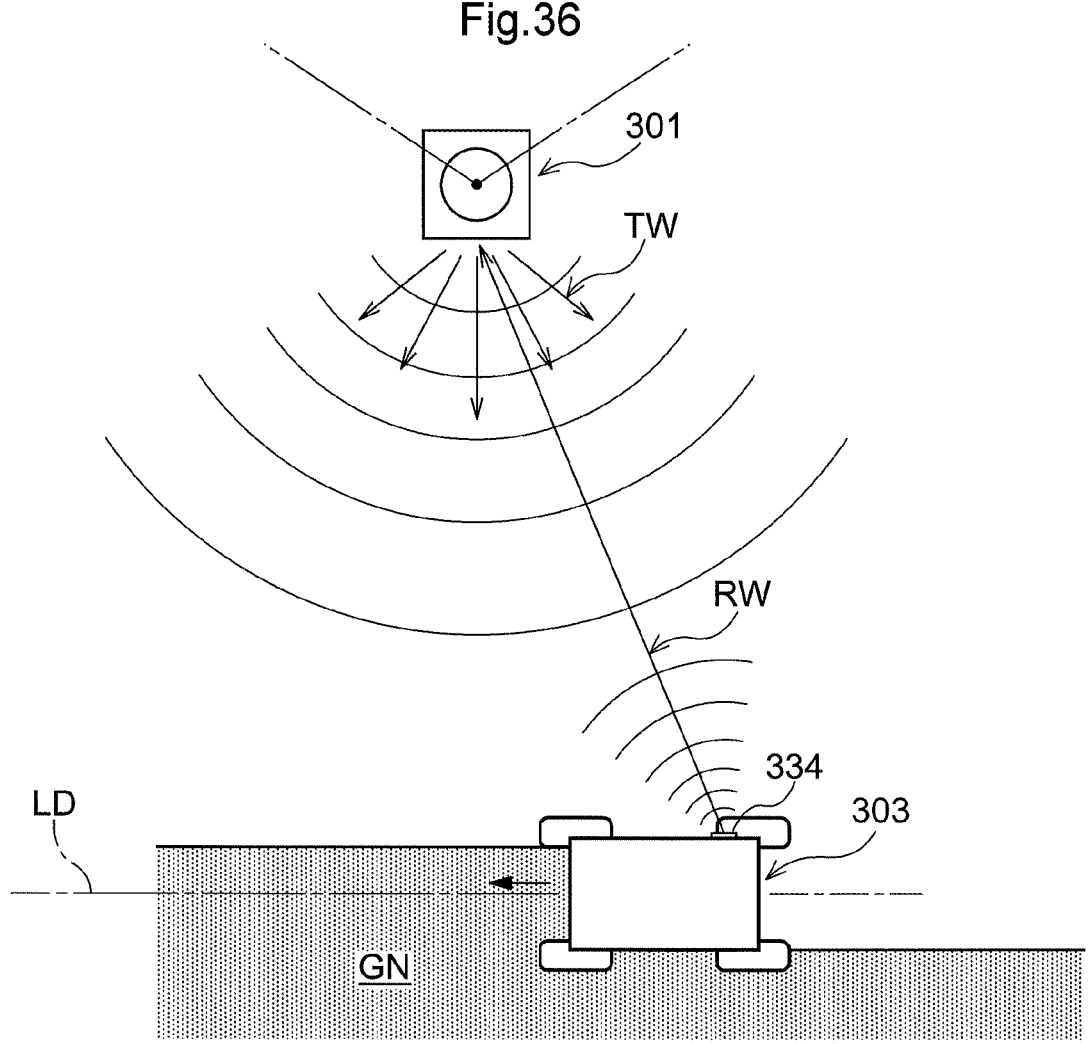
FIG. 36 is a diagram showing a fourth embodiment, and specifically is a plan view of a configuration of a mowing machine autonomous traveling system.
Figure 37:
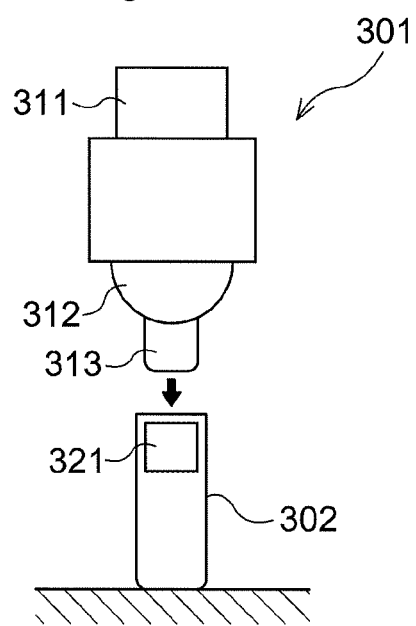
FIG. 37 is a diagram showing the fourth embodiment, and specifically is a side view of an object detection unit and an attachment fixture disposed on the ground surface.
Figure 38:
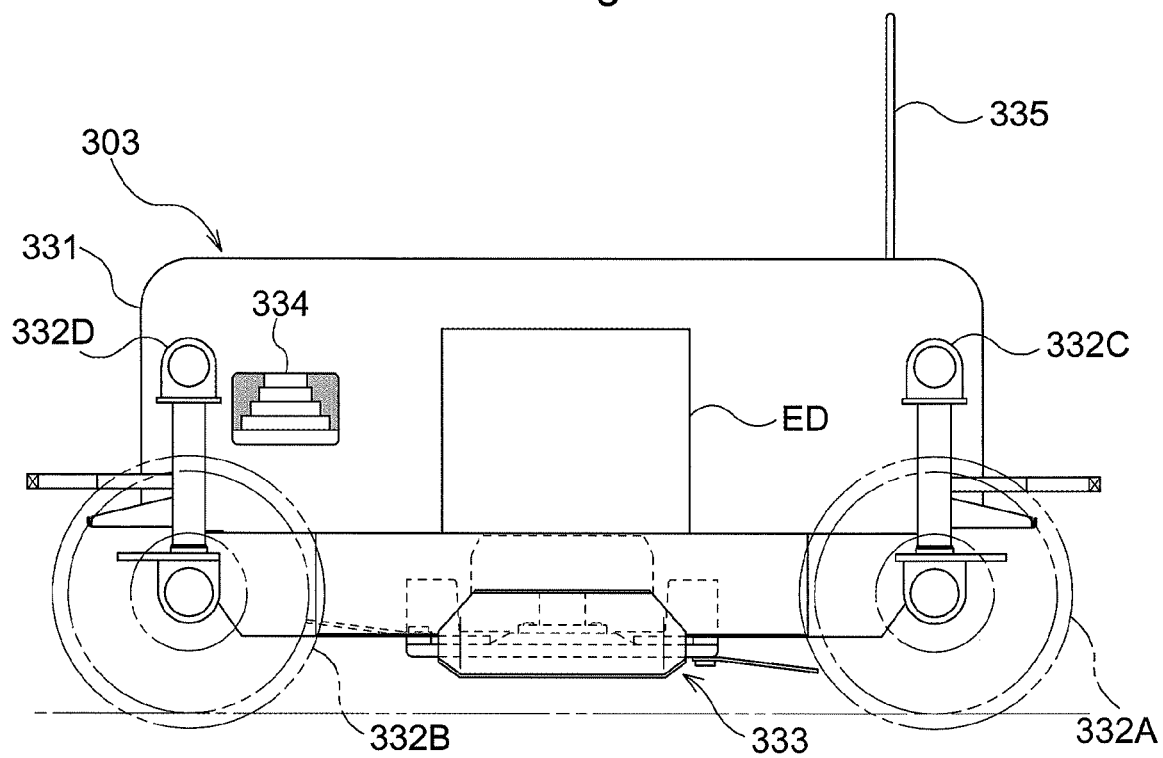
FIG. 38 is a diagram showing the fourth embodiment, and specifically is a side view of a configuration of a mowing machine.

As shown in FIGS. 36 to 38, the mowing machine autonomous traveling system of the present embodiment includes an object detection unit 301, an attachment fixture 302, and a mowing machine 303. The object detection unit 301 is disposed at the upper end portion of a slope, and is configured to detect the position of the mowing machine 303 as it travels on the slope. The object detection unit 301 is used in a state of being attached to the attachment fixture 302. The object detection unit 301 includes a distance sensor 311, a rotation control mechanism 312, and an attachment portion 313. A control unit is provided in the object detection unit 301 in the form of being integrated in a microcomputer, for example. The distance sensor 311 is provided in an upper portion of the object detection unit 301. The rotation control mechanism 312 can rotate with multiple degrees of freedom, and is provided in a lower portion of the object detection unit 301. The attachment portion 313 is provided on a lower end of the rotation control mechanism 312, and is the attachment location for attachment of the object detection unit 301 to the attachment fixture 302.

The attachment fixture 302 is disposed in a state of being fixed at the uppermost end of the slope. The attachment portion 313 of the object detection unit 301 is detachably locked to the upper end portion of the attachment fixture 302, and thus the object detection unit 301 is attached to the attachment fixture 302 and fixed at a fixed point position. Note that the structure and method for attachment and detachment of the attachment portion 313 can be selected as appropriate from among known structures and methods. The attachment fixture 302 is provided with a storage unit 321 such as an RFID (Radio Frequency Identifier) tag, and area information for traveling mowing of the mowing machine 303, operation history information of the mowing machine 303, and the like are stored in the storage unit 321 through data communication with the control unit provided in the object detection unit 301.

After the object detection unit 301 has been attached to the attachment fixture 302, the object detection unit 301 accesses the storage unit 321 of the attachment fixture 302 and checks whether or not the storage unit 321 includes area information and operation history information. If the storage unit 321 has area information and operation history information, that area information and operation history information are read out to a RAM (Random Access Memory; not shown) provided in the object detection unit 301, for example. Also, if the area information and the operation history information are updated during autonomous traveling mowing, the updated information is sent from the RAM of the object detection unit 301 to the storage unit 321 and stored therein. Accordingly, even if a different object detection unit 301 is used when autonomous traveling mowing is performed the next time, the latest area information and operation history information can be read out to that different object detection unit 301.

The mowing machine 303 is configured to mow uncut grass GN while autonomously traveling along line traveling paths LD, which are pre-set traveling paths on a slope, based on instruction signals Tc transmitted by the object detection unit 301. The mowing machine 303 includes a traveling machine body 331, first wheels 332A, second wheels 332B, a mowing device 333, and a reflecting portion 334. A pair of left and right first wheels 332A are provided on one end side of the traveling machine body 331 in the lengthwise direction. A pair of left and right second wheels 332B are provided on the other end side of the traveling machine body 331 in the lengthwise direction. The mowing device 333 is provided between the first wheels 332A and the second wheels 332B in the lower portion of the traveling machine body 331. An antenna 335 for communication with a transmitter 304 (see FIG. 39) and the object detection unit 301 is provided at an upper portion of the mowing machine 303.

Figure 39:
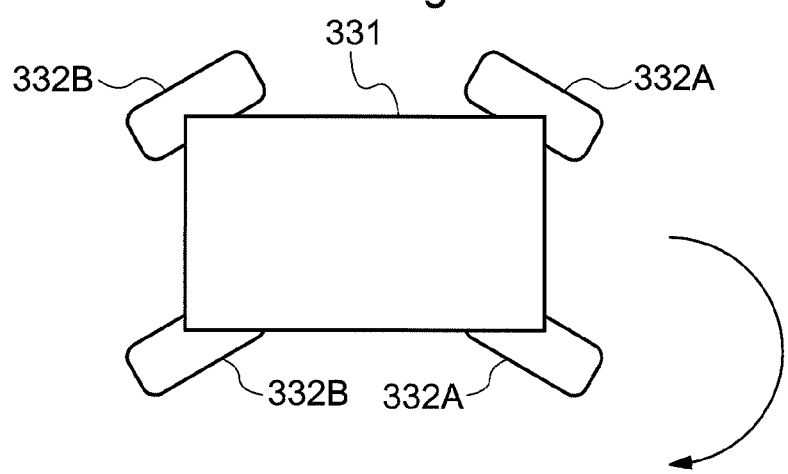
FIG. 39 is a diagram showing the fourth embodiment, and specifically is a plan view of the mowing machine in a turning state.
Figure 40:
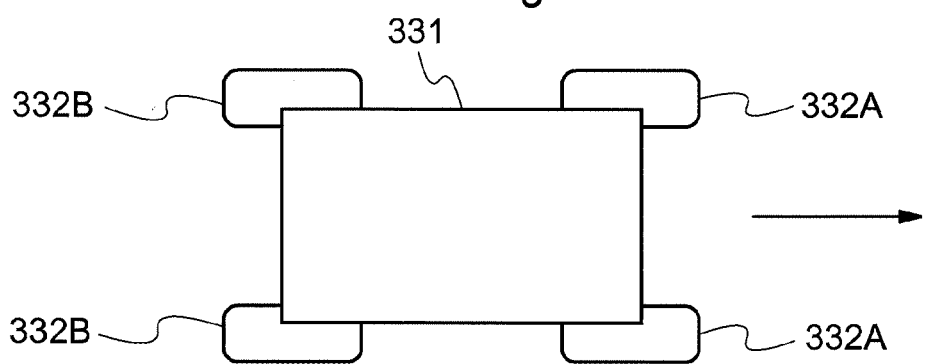
FIG. 40 is a diagram showing the fourth embodiment, and specifically is a plan view of the mowing machine in a straight advancing state.

Although not shown, the traveling machine body 331 is provided with a transmission mechanism that transmits motive power from an engine ED to the first wheels 332A and the second wheels 332B, and also transmits motive power to the mowing device 333. The transmission mechanism is configured to be capable of engaging and disengaging the transmission of motive power to the first wheels 332A and the second wheels 332B and also to the mowing device 333. Due to motive power being transmitted from the engine ED to the first wheels 332A and the second wheels 332B and to the mowing device 333, it is possible to perform mowing while the machine body travels. The first wheels 332A are provided with a first steering motor 332C, and the first wheels 332A are configured to be steerable by swinging about a vertical axis with use of drive power from the first steering motor 332C. Also, the second wheels 332B are provided with a second steering motor 332D, and the second wheels 332B are configured to be steerable by swinging about a vertical axis with use of drive power from the second steering motor 332D. As shown in FIGS. 39 and 40, the first wheels 332A and the second wheels 332B can both change orientation between any of a straight advancing orientation, a right swing orientation, and a left swing orientation.

The distance sensor 311 is an LRF (Laser Range Finder), a LIDAR (Light Detection and Ranging), or the like, and transmits an air-propagating signal, such as laser beams or ultrasonic waves, as a detection signal TW. When the detection signal TW strikes a detection object, the detection signal TW is reflected by the surface of the detection object. The distance sensor 311 then acquires, as a reflection signal RW, the detection signal TW that was reflected by the surface of the detection object. In other words, the distance sensor 311 transmits the detection signal TW toward a detection range of the distance sensor 311, and acquires the reflection signal RW with respect to the detection signal TW. The distance sensor 311 is configured to then calculate the distance between the distance sensor 311 and the detection object based on the time from transmission of the detection signal TW to the acquisition of the reflection signal RW. The process in which the distance sensor 311 transmits the detection signal TW and acquires the reflection signal RW is hereinafter called "scanning".

As shown in FIG. 36, the distance sensor 311 is configured to be able to perform scanning in a scan angle range of 270 degrees over a radial distance range of several tens of meters in a plan view. Accordingly, if multiple attachment fixtures 302 are disposed, the attachment fixtures 302 are disposed at intervals corresponding to the scan range of the distance sensor 311.

The reflecting portion 334 is a detection object that reflects the detection signal TW emitted by the distance sensor 311. The reflecting portion 334 is configured to reflect the reflection signal RW in the same direction as the direction of incidence of the detection signal TW. In other words, the reflecting portion 334 is configured so as to reflect the reflection signal RW back toward the distance sensor 311 regardless of the angle at which the detection signal TW from the distance sensor 311 is incident thereon. For this reason, the reflecting portion 334 is provided on whichever one of the left and right side surfaces of the mowing machine 303 is on the side corresponding to the distance sensor 311, and thus the reflecting portion 334 and the distance sensor 311 always face each other. According to this configuration, the reflecting portion 334 reflects the reflection signal RW to the distance sensor 311 with a higher strength than other objects. For this reason, the distance sensor 311 is configured to detect the reflecting portion 334 by detecting the reflection signal RW whose strength is higher than a pre-set strength threshold value. Note that the reflecting portion 334 is not limited to being provided on only either the left or right side surface of the mowing machine 303, and may be provided on both sides.

Control Configuration

Figure 41:
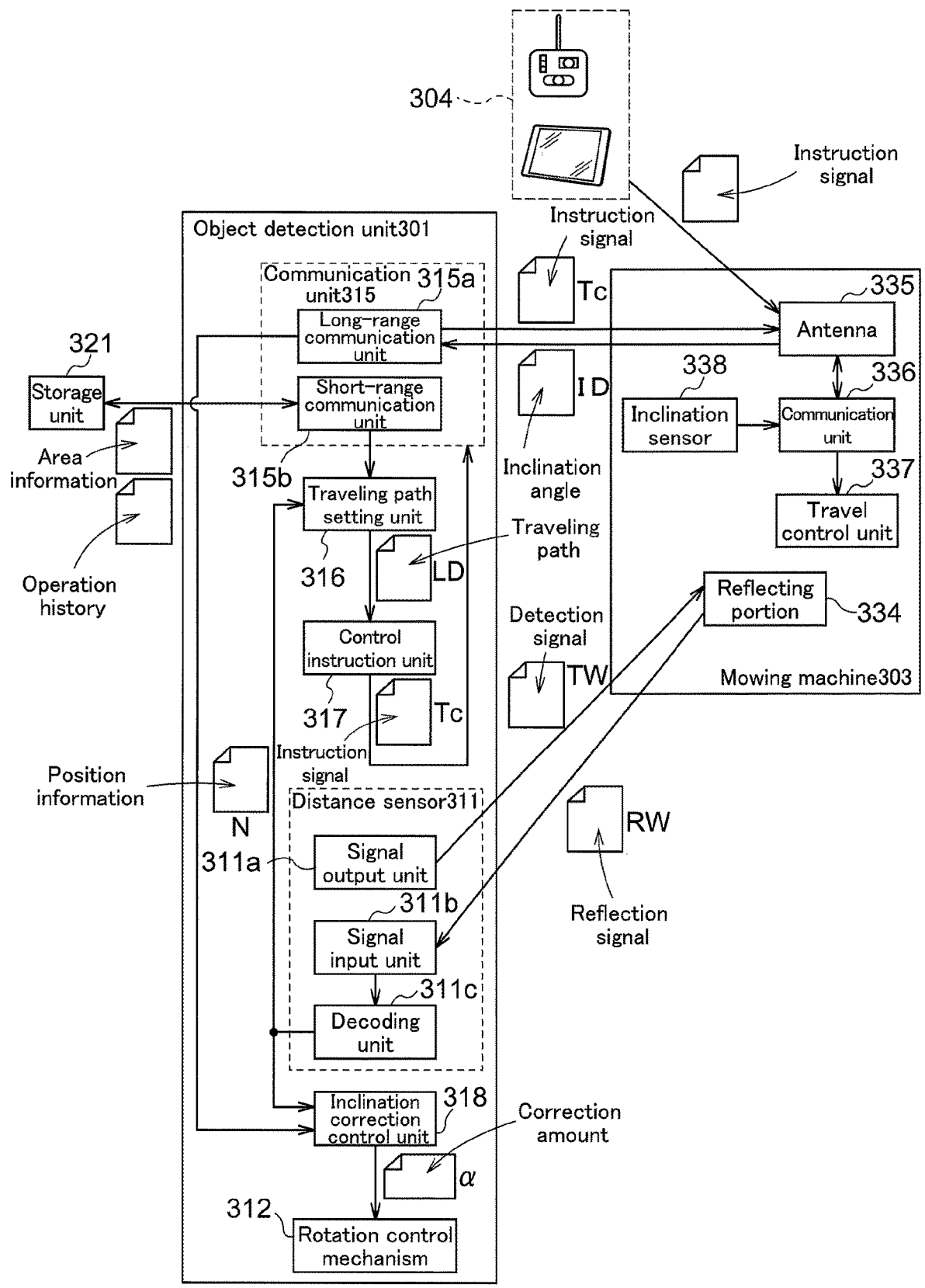
FIG. 41 is a diagram showing the fourth embodiment, and specifically is a block diagram showing a control unit.

As shown in FIG. 41, the mowing machine 303 performs autonomous traveling mowing based on cooperative processing performed by the control unit of the object detection unit 301 and the control unit of the mowing machine 303. The control unit of the object detection unit 301 is provided with a communication unit 315, a traveling path setting unit 316, and a control instruction unit 317. The communication unit 315 is a communication device for accessing data in the storage unit 321 of the attachment fixture 302 and exchanging data and signals with the mowing machine 303. The traveling path setting unit 316 sets line traveling paths LD as traveling paths for autonomous traveling of the mowing machine 303. The control instruction unit 317 outputs instruction signals Tc for causing the mowing machine 303 to travel along the line traveling paths LD, and the instruction signals Tc are transmitted to the mowing machine 303 via the communication unit 315.

The communication unit 315 is provided with a long-range communication unit 315a and a short-range communication unit 315b. The long-range communication unit 315a is a communication device capable for performing communication over a range of approximately 100 meters, for example. The long-range communication unit 315a can transmit the aforementioned instruction signals Tc to the mowing machine 303 and receive information indicating a machine body status, a mowing progress status, and the like from the mowing machine 303. The short-range communication unit 315b is a communication device capable of performing communication over a range of several tends of centimeters, for example. When the object detection unit 301 has been attached to the attachment fixture 302, the short-range communication unit 315b can read data such as area information and operation history information from the storage unit 321, and can write update data regarding area information and operation history information and the like to the storage unit 321.

The control unit of the mowing machine 303 is provided with a communication unit 336 and a travel control unit 337. The communication unit 336 is a communication device for exchanging data and signals with the communication unit 315 of the object detection unit 301. The communication unit 336 can also exchange data and signals with the transmitter 304. The travel control unit 337 causes the mowing machine 303 to perform autonomous traveling mowing based on instruction signals Tc output by the control instruction unit 317 of the object detection unit 301. The travel control unit 337 is also configured to enable switching between an autonomous travel mode and a manual travel mode, and the aforementioned autonomous traveling mowing is performed in the autonomous travel mode. In the case where the travel mode is the manual travel mode, instruction signals that are based on manual operations made on the transmitter 304 are output to the travel control unit 337 via the communication unit 336, and the travel control unit 337 performs control based on such instruction signals.

The mowing machine 303 is provided with an inclination sensor 338, and an inclination angle ID detected by the inclination sensor 338 is transmitted to the object detection unit 301 via the communication unit 336. The inclination sensor 338 is an IMU (Inertial Measurement Unit), which is one example of an inertial sensor, but may be a pendulum type or floating type of inclination angle detector, a gyro-sensor, or an acceleration sensor.

The transmitter 304 is configured to enable manual operation of the mowing machine 303 while being held by an operator. The transmitter 304 may enable operations with use of a proportional type of controller that is operated in the operator's hands, or may enable operations with use of a mobile terminal device that has a touch panel type of display screen.

The distance sensor 311 included in the object detection unit 301 is provided with a signal output unit 311a, a signal input unit 311b, and a decoding unit 311c. The signal output unit 311a outputs the detection signal TW, and here, the detection signal TW is reflected as the reflection signal RW by the reflecting portion 334 of the mowing machine 303, and the reflection signal RW is received by the signal input unit 311b. Ranging data is obtained through scanning performed by the distance sensor 311, and, based on the ranging data and the scan angle, the decoding unit 311c converts the ranging data into position information N that indicates the coordinates at which the mowing machine 303 is located. Note that the position information N may indicate two-dimensional coordinates, or may indicate three-dimensional coordinates. The position information N obtained by the decoding unit 311c is output to the control instruction unit 317. The control instruction unit 317 outputs instruction signal Tc so as to reduce the difference between the line traveling paths LD and a traveling route that is based on the position information N.

The object detection unit 301 is provided with an inclination correction control unit 318 as a control module that controls the rotation control mechanism 312. Although described later, the inclination correction control unit 318 calculates a correction amount α based on the inclination angle ID of the mowing machine 303, and the rotation control mechanism 312 tilts the object detection unit 301 by rotating based on the correction amount α. The distance sensor 311 therefore also tilts in conjunction and can favorably track the mowing machine 303 traveling on the slope.

Traveling Path

Figure 42:
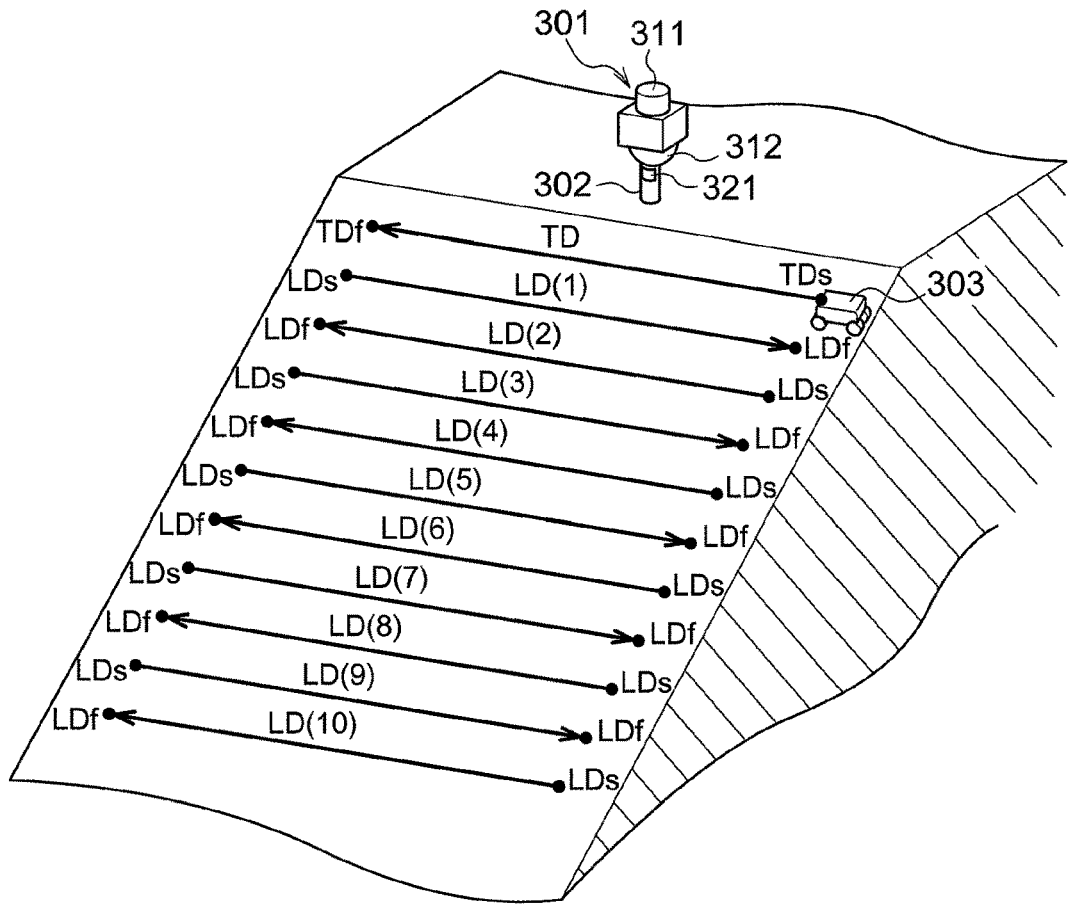
FIG. 42 is a diagram showing the fourth embodiment, and specifically is a perspective view of traveling paths on a slope.

The line traveling paths LD for autonomous traveling mowing of the mowing machine 303 are set in advance by the traveling path setting unit 316. As shown in FIG. 42, multiple straight line traveling paths LD have been set as traveling paths for autonomous traveling on a slope. In the present embodiment, the attachment fixture 302 is set in a fixed state at the upper end portion of the slope, and the object detection unit 301 is detachably attached to the attachment fixture 302. The object detection unit 301 is configured to be capable of performing scanning in the left-right direction at the upper end portion of the slope in this state. In the present embodiment, the line traveling paths LD are generated by the traveling path setting unit 316 through the following procedure.

First, in the manual travel mode, teaching traveling is performed along the upper edge portion of the slope. Teaching traveling is performed based on manual operations given through operations performed on the transmitter 304 by the operator. In the present embodiment, while the mowing machine 303 is located at a start position TDs, the operator performs a start position setting operation on the transmitter 304. The operator then steers the mowing machine 303 along a straight line from the start position TDs to a finish position TDf, and then while the mowing machine 303 is located at the finish position TDf, the operator performs a finish position setting operation on the transmitter 304. Teaching processing is thus executed. In other words, this is processing for setting a teaching traveling route TD that connects the start position TDs to the finish position TDf based on position information N that was acquired through scanning performed by the distance sensor 311 at the start position TDs and position information N that was acquired through scanning performed by the distance sensor 311 at the finish position TDf.

The position information N of the mowing machine 303 during teaching traveling is successively acquired by the object detection unit 301 through the scanning performed by the distance sensor 311. At this time, the position information N may be stored in a RAM (not shown) of the object detection unit 301. According to this configuration, the teaching traveling route TD of the mowing machine 303 is obtained from the set of position information N from the start position TDs in teaching traveling to the finish position TDf in teaching traveling. This configuration is particularly useful in the case where the traveling route in teaching traveling is curved.

Multiple line traveling paths LD are then generated as traveling paths that are parallel with the teaching traveling route TD and are at equal intervals downward along the slope. In the present embodiment, line traveling paths LD(1) to LD(10) that extend along the teaching traveling route TD are generated at equal intervals downward from the teaching traveling route TD on the slope. Note that taking the mowing operation width of the mowing machine 303 into consideration, the line traveling paths LD are set such that the operation widths are slightly overlapped in order to prevent unmowed regions from remaining.

The line traveling paths LD(1) to LD(10) are each assigned a start position LDs and a finish position LDf, and the line traveling paths LD(1) to LD(10) are configured such that the direction from the start position LDs to the finish position LDf is the advancing direction of the mowing machine 303. Also, a route is set such that the mowing machine 303 travels along the line traveling paths LD(1) to LD(10) in order, and in the present embodiment, the route is set such that the mowing machine 303 travels back and forth in straight lines from the upward side of the slope to the downward side. Specifically, traveling paths are set such that the finish position LDf of any one line traveling path LD(n) among the line traveling paths LD(1) to LD(9) has, adjacent thereto on the slope downstream side, the start position LAs of the line traveling path LA(n+1) that has been assigned next along the route.

The mowing machine 303 performs mowing while autonomously traveling along the line traveling paths LD. For example, when the mowing machine 303 arrives at the finish position LDf of the first line traveling path LD(1), the mowing machine 303 then moves to the start position LDs of the line traveling path LD(2) that has been assigned as next along the route. At this time, it is preferable that zig-zag traveling is performed in which the first wheels 332A and the second wheels 332B of the mowing machine 303 repeatedly rotate forward and reverse, for example. If this zig-zag traveling is performed, the direction of the mowing machine 303 does not change, and the reflecting portion 334 and the distance sensor 311 always face each other, and therefore the object detection unit 301 can favorably track the reflecting portion 334 of the mowing machine 303.

Movement from the finish position LDf to the next start position LDs may be performed in the autonomous travel mode, or may be performed in the manual travel mode. In the case of the manual travel mode, after the mowing machine 303 has moved to the next start position LDs, the switch from the manual travel mode to the autonomous travel mode may be performed manually or automatically.

After the mowing machine 303 has arrived at the start position LDs of the line traveling path LD(2) and the advancing direction of the mowing machine 303 matches the advancing direction of the line traveling path LD(2), the mowing machine 303 then performs mowing while autonomously traveling along the line traveling path LD(2). The mowing machine 303 then performs mowing while autonomously traveling along the line traveling paths LD(3), LD (4), LD (5), LD (6), LD (7), LD (8), LD (9), and LD(10) in this order.

Because the line traveling paths LD(1) to LD(10) are set in order from the upward side of the slope to the downward side, the mowed ground surface is always located between the object detection unit 301 and the mowing machine 303, and the distance sensor 311 can favorably track the reflecting portion 334 of the mowing machine 303 without being obstructed by the uncut grass GN (see FIG. 36).

The teaching traveling route TD and the line traveling paths LD are stored as operation history information in the storage unit 321. For this reason, the traveling path setting unit 316 is configured to be able to reproduce the teaching traveling route TD and the line traveling paths LD based on the operation history information in the storage unit 321, and autonomous traveling mowing can be subsequently performed without teaching traveling being performed. Accordingly, even if a different object detection unit 301 is used when autonomous traveling mowing is performed the next time, the teaching traveling route TD and the line traveling paths LD can be reproduced. Also, the control instruction unit 317 is configured to be able to predict variation or the like in the inclination angle of the mowing machine 303 based on past operation history information stored in the storage unit 321. For example, in this case, the control instruction unit 317 outputs a deceleration instruction at a location where the mowing machine 303 was inclined a large amount in the past. This therefore makes it possible to perform autonomous traveling mowing that is more stable than past autonomous traveling mowing.

Inclination Correction Control

Figure 43:
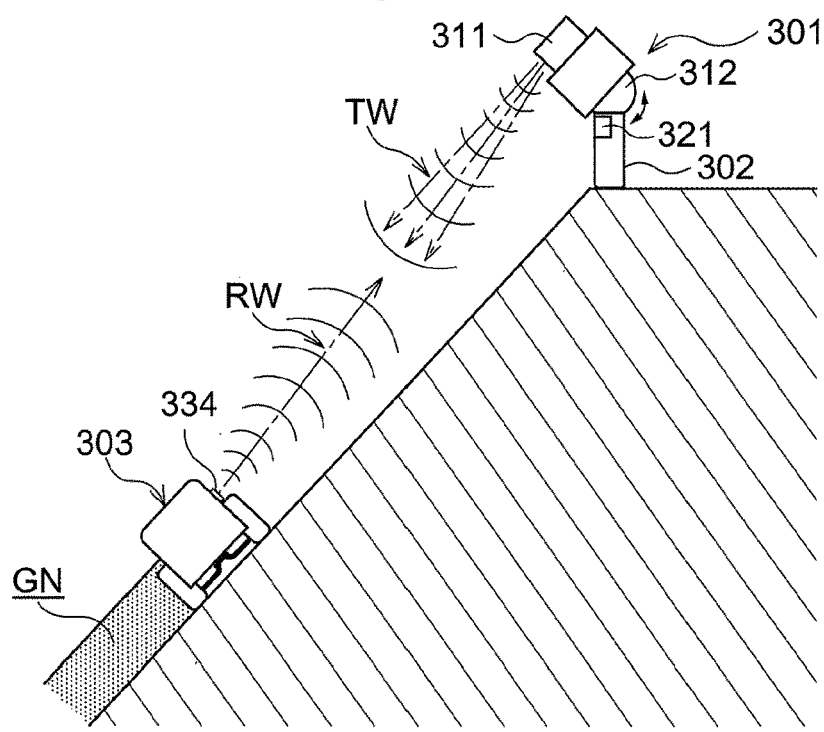
FIG. 43 is a diagram showing the fourth embodiment, and specifically is an illustrative diagram for illustrating the inclination of an object detection unit 301.

In the present embodiment, the mowing machine 303 is configured to perform autonomous traveling mowing from the upper side of the slope to the downstream side. Because the distance sensor 311 is configured to scan a wide range in the left-right direction from the upper end of the slope, if the scan range in the up-down direction is widened, detection of the reflecting portion 334 by the distance sensor 311 becomes time-consuming, and the ability of the control instruction unit 317 to output instruction signals Tc in real-time may be impaired. In order to avoid this problem, the scan range in the up-down direction tends to be a narrow scan angle range of approximately 10 degrees, for example. For this reason, if the mowing machine 303 moves above or below the scan range of the distance sensor 311, the distance sensor 311 may not be able to track the reflecting portion 334 of the mowing machine 303. In view of this, as shown in FIG. 43, the present embodiment employs a configuration in which the distance sensor 311 is arranged at an inclination in accordance with the inclination angle of the slope. The distance sensor 311 and the reflecting portion 334 therefore favorably face each other.

The distance sensor 311 is configured to be changed in inclination by the inclination correction control unit 318. Note that the distance sensor 311 may be configured to change in inclination by inclination of the entirety of the object detection unit 301, and a configuration is possible in which only the distance sensor 311 of the object detection unit 301 is changed in inclination. The inclination of the distance sensor 311 is changed by the inclination correction control unit 318 through the following procedure.

In the teaching traveling described above, the inclination angle ID of the mowing machine 303 during teaching traveling is detected over time by the inclination sensor 338 provided on the mowing machine 303, and is transmitted to the inclination correction control unit 318 via the communication unit 336 of the mowing machine 303 and the communication unit 315 of the object detection unit 301. The average value (or median value) of the inclination angles ID during teaching traveling is used as a reference inclination angle of the slope, and the inclination correction control unit 318 calculates the correction amount α based on the inclination angle ID and outputs the correction amount α to the rotation control mechanism 312. The rotation control mechanism 312 rotates based on the correction amount α, and the inclination of the distance sensor 311 is changed so as to be parallel with the inclined surface of the slope. Accordingly, the distance sensor 311 can perform scanning over a widen range of the slope in accordance with the inclination of the slope.

At this time, if the attachment fixture 302 is already inclined for example, the object detection unit 301 is of course inclined as well, and therefore the inclination of the object detection unit 301 is given consideration when the correction amount α is calculated by the inclination correction control unit 318. If an accurate inclination angle of the attachment fixture 302 is stored in the storage unit 321, the inclination correction control unit 318 may be configured to calculate the correction amount α with consideration given to the inclination angle read out from the storage unit 321. Also, if an IMU is provided in the object detection unit 301, the inclination correction control unit 318 may be configured to calculate the correction amount α with consideration given to an inclination angle detected by the IMU of the object detection unit 301. Note that even after the start of autonomous traveling mowing, the inclination correction control unit 318 is configured to calculate the correction amount α based on the inclination angle ID as necessary.

After autonomous traveling mowing has started, the object detection unit 301 outputs instruction signals Tc such that the mowing machine 303 performs autonomous traveling mowing along the line traveling paths LD, and tracks the reflecting portion 334 of the mowing machine 303 through the scanning performed by the distance sensor 311. However, cases are conceivable in which the angle of the slope is not uniform, but rather has protrusions and recessions, and in such cases, the object detection unit 301 may lose sight of the mowing machine 303 due to a sudden change in the inclination of the mowing machine 303. For this reason, the reflecting portion 334 is configured as described below such that the object detection unit 301 can reliably track the mowing machine 303 even if there is a sudden change in the mowing machine 303.

Figure 44:
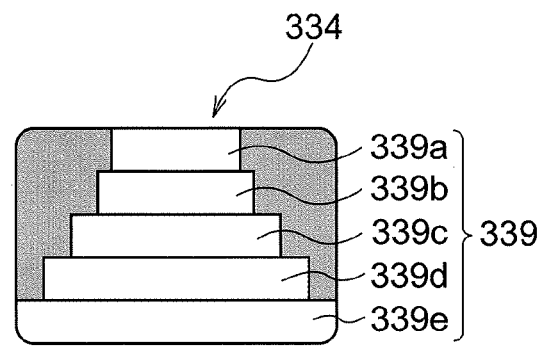
FIG. 44 is a diagram showing the fourth embodiment, and specifically is a diagram showing a reflecting portion.

As shown in FIG. 44, the reflecting portion 334 is provided with multiple reflective sheets 339, or more specifically, horizontal bar-shaped reflective sheets 339a, 339b, 339c, 339d, and 339e are arranged side-by-side in the vertical direction in this order from the upper end side of the reflecting portion 334. The reflective sheets 339 are each configured to reflect the reflection signal RW in the same direction as the direction of incidence of the detection signal TW. The lengthwise direction of the reflective sheets 339 conforms to the front-rear direction of the mowing machine 303, and the reflective sheets 339 are configured to have different lengths in the lengthwise direction. In the configuration of the present embodiment, the lengths of the reflective sheets 339 in the lengthwise direction increase the lower the reflective sheets 339 are located. The lengthwise-direction length of the reflective sheet 339a located at the highest position is the shortest among the reflective sheets 339, and the lengthwise-direction length of the reflective sheet 339e located at the lowest position is the longest among the reflective sheets 339.

Figure 45:
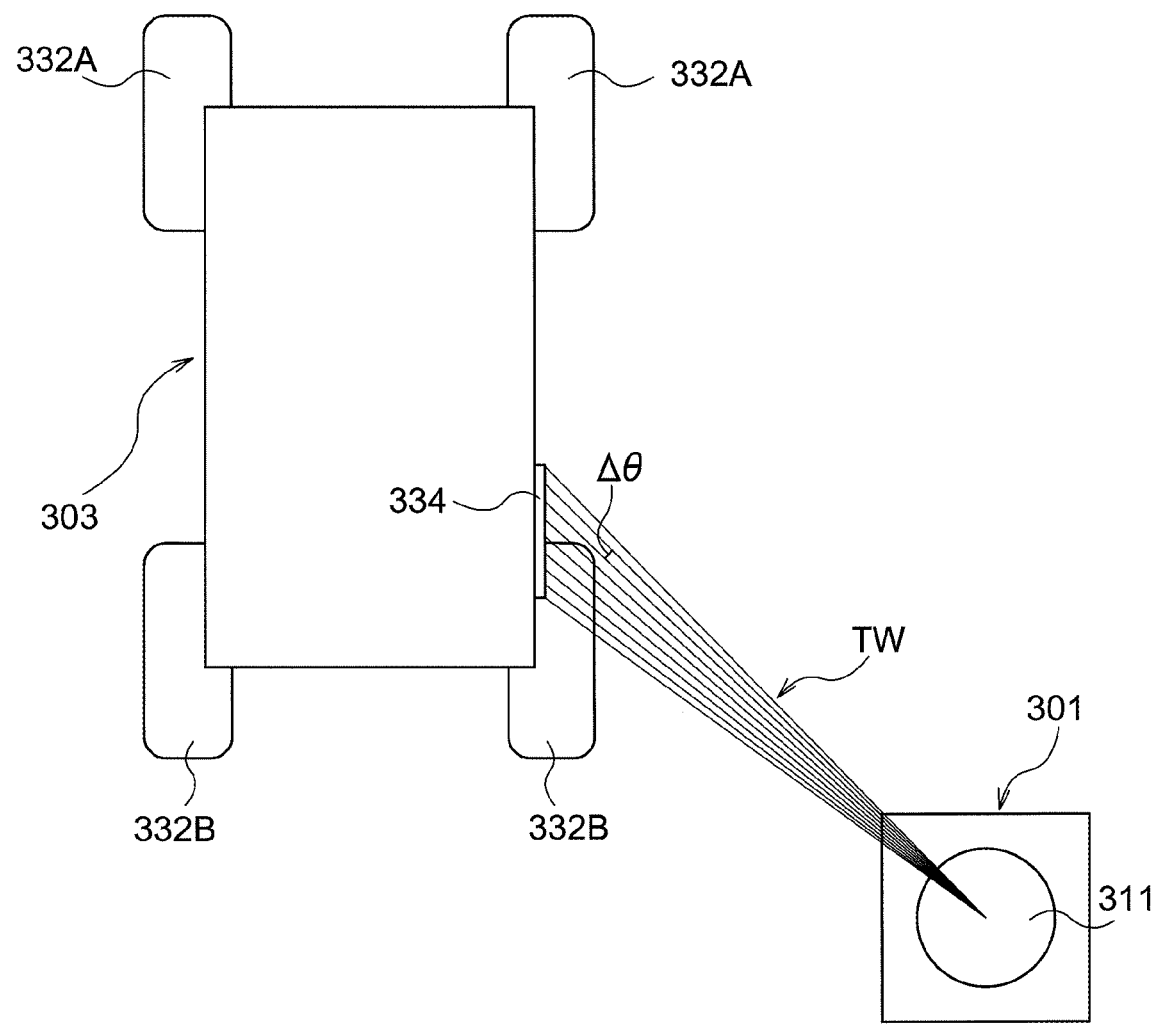
FIG. 45 is a diagram showing the fourth embodiment, and specifically is an illustrative diagram for illustrating the measurement of the length of a reflective sheet.

As shown in FIG. 45, the distance sensor 311 acquires multiple reflection signals RW from the reflective sheets 339 when performing scanning in which the scan angle is changed by Δθ each time. An approximate value of the length of each reflective sheet 339 in the lengthwise direction can be calculated using a trigonometric function or the like based on the reflection signals RW and the scan angle. For this reason, in this configuration, the decoding unit 311c can calculate the difference between the lengths of the reflective sheets 339a, 339b, 339c, 339d, and 339e in the lengthwise direction. In other words, the inclination correction control unit 318 is configured to be able to identify each of the reflective sheets 339a, 339b, 339c, 339d, and 339e.

Among the reflective sheets 339, the difference in length is the largest between the reflective sheet 339a located at the highest position and the reflective sheet 339e located at the lowest position. For this reason, the inclination correction control unit 318 can more easily determine whether a higher position or a lower position of the reflecting portion 334 is being tracked, thus making it possible to suppress an erroneous determination.

The inclination correction control unit 318 identifies an individual reflective sheet 339 among the reflective sheets 339a, 339b, 339c, 339d, and 339e based on the length of the reflective sheet 339 calculated by the decoding unit 311c. In the present embodiment, the reflective sheet 339c is located at the center in the up-down direction, and therefore the location of the reflective sheet 339c serves as a target position in the up-down direction. If the reflective sheet 339a or the reflective sheet 339b is identified, the inclination correction control unit 318 determines that the scan range of the distance sensor 311 in the up-down direction is biased toward the upper side of the mowing machine 303. At this time, the distance sensor 311 of the inclination correction control unit 318 outputs, to the rotation control mechanism 312, a correction amount α for a downward change in inclination. If the reflective sheet 339d or the reflective sheet 339e is identified, the inclination correction control unit 318 determines that the scan range of the distance sensor 311 in the up-down direction is biased toward the lower side of the mowing machine 303. At this time, the distance sensor 311 of the inclination correction control unit 318 outputs, to the rotation control mechanism 312, a correction amount α for an upward change in inclination.

In this way, the inclination correction control unit 318 identifies the differences in lengthwise-direction lengths of the reflective sheets 339a, 339b, 339c, 339d, and 339e, and calculates the correction amount α such that the reflective sheet 339c is located at the center position in the scan range in the up-down direction. Accordingly, the distance sensor 311 can always perform scanning centered on the reflecting portion 334 in the up-down direction, and the object detection unit 301 can favorably track the mowing machine 303 even if there is a sudden change in the inclination of the mowing machine 303.

Also, the inclination correction control unit 318 is configured to be able to predict variation or the like in the inclination angle of the mowing machine 303 based on past operation history information stored in the storage unit 321. For example, the inclination correction control unit 318 biases the correction amount α upward or downward at a location where the reflecting portion 334 shifted a large amount vertically in the past. Accordingly, the object detection unit 301 can track the reflecting portion 334 more favorably than in past autonomous traveling mowing.

Variations of Fourth Embodiment

The present invention is not limited to the configurations illustrated in the above embodiment, and the following are representative variations of the present invention.

(1) Although one reflecting portion 334 is provided on a side surface of the mowing machine 303 in the above-described embodiment, two or more reflecting portions 334 may be provided on a side surface of the mowing machine 303. For example, the front and rear ends of a side surface of the mowing machine 303 may each be provided with a reflecting portion 334. With this configuration, the advancing direction and the turning direction of the machine body can be specified based on the position coordinates of the reflecting portions 334 at the front and rear ends.

(2) Although the reflecting portion 334 is provided on a side surface of the mowing machine 303 in the above-described embodiment, the reflecting portion 334 may be provided on the front surface or the rear surface. Also, the reflecting portion 334 may be provided on the front surface, the rear surface, and the left and right side surfaces. With this configuration, the object detection unit 301 can track the reflecting portions 334 of the mowing machine 303 regardless of the direction in which the mowing machine 303 is facing.

(3) Although the mowing machine 303 is configured to perform autonomous traveling mowing on a slope in the above-described embodiment, the mowing machine 303 may be configured to perform autonomous traveling mowing on a flat ground surface at the bottom of a slope, for example.

(4) In the above-described embodiment, the storage unit 321 is provided in the attachment fixture 302, the object detection unit 301 is fixed to the attachment fixture 302, and the object detection unit 301 can read out area information and operation history information from the storage unit 321 in the fixed state, but the present invention is not limited to the above embodiment. For example, a configuration is possible in which the storage unit 321 is provided in a management computer that is not shown, and the object detection unit 301 can read out area information and operation history information via a WAN or the like. With this configuration, the area information can be easily managed in a centralized manner. Also, the storage unit 321 is not limited to being an RFID tag, and may be a semiconductor storage device, a magnetic storage device, or an optical storage device.

(5) Although the reflective sheets 339 are configured to have a longer length in the lengthwise direction the lower they are located on the machine body in the above-described embodiment, the present invention is not limited to the embodiment described above, and the reflective sheets 339 may be configured to have a longer length in the lengthwise direction the higher they are located on the machine body, for example.

Figure 46:
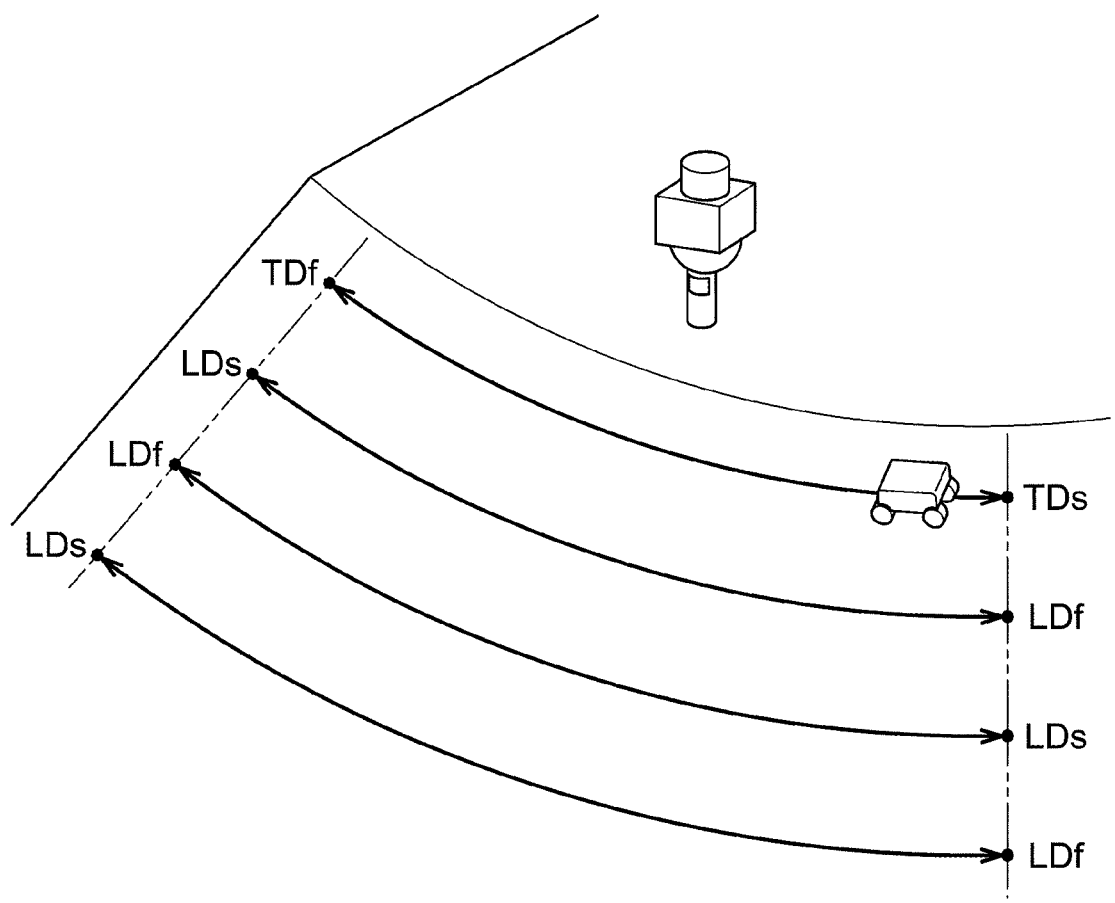
FIG. 46 is a diagram showing the fourth embodiment, and specifically is a perspective view of a variation regarding traveling paths on a slope.

(6) In the above embodiment, the line traveling paths LD are set based on the straight teaching traveling route TD, but they may be set based on a curved teaching traveling route TD. For example, as shown in FIG. 46, based on a curved teaching traveling route TD, curved line traveling paths LD that are parallel with the teaching traveling route TD may be set at equal intervals.

Figure 47:
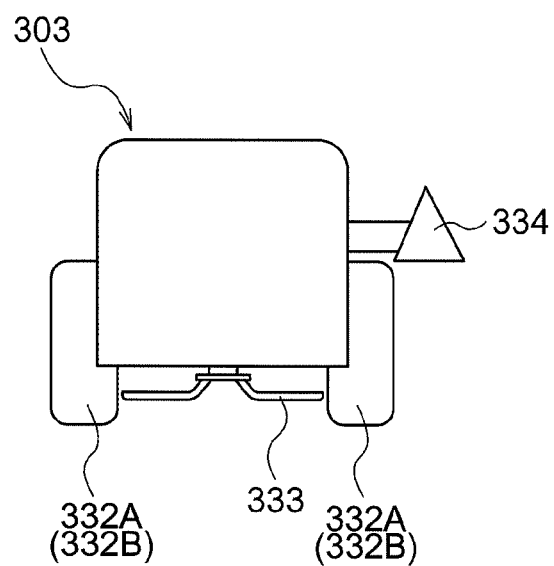
FIG. 47 is a diagram showing the fourth embodiment, and specifically is a side view of a mowing machine and shows a variation of the reflecting portion.

(7) Although the reflecting portion 334 is provided with multiple horizontally long reflective sheets 339 in the above embodiment, the present invention is not limited to the above embodiment. For example, as shown in FIG. 47, a configuration is possible in which the reflecting portion 334 has a conical shape and projects out from the side surface of the mowing machine 303 that corresponds to the object detection unit 301. The cross-sectional diameter of the conical reflecting portion 334 in the horizontal direction of the machine body varies in the up-down direction, and more specifically, the cross-sectional diameter increases toward the lower side of the machine body. In view of this, a configuration is possible in which when the distance sensor 311 performs scanning along the horizontal direction of the machine body, the cross-sectional diameter at the scanned location of the conical reflecting portion 334 is detected.

(8) Although the mowing machine 303 is described as performing mowing while autonomously traveling in the above-described embodiment, the present invention is not limited to the mowing machine 303, and may be applied to a lawn mower or a general mower.

INDUSTRIAL APPLICABILITY

The present invention is applicable to an autonomous traveling work machine that can travel on an inclined ground surface such as a sloped surface.

The present invention is also applicable to an autonomous traveling mowing machine that includes a discharge mechanism that discharges cut grass and a detection device that detects cut grass.

The present invention is also applicable to a mowing machine that performs traveling mowing in a mowing region.

The present invention is also applicable to an autonomous traveling system for a mowing machine that performs autonomous traveling mowing in a pre-set traveling area on a slope.

DESCRIPTION OF REFERENCE SIGNS

First Embodiment

1: Traveling machine body
2A: First wheel
2B: Second wheel
3: Mowing device
4: Positioning receiver
5: Rotation control mechanism
6: Shielding plate
10: Storage unit
11: Traveling path setting unit
12: Autonomous traveling control device
17: Communication unit
31: Inclination angle determination unit
EA: Engine
IA: Inclination angle
ImA: Inclination angle information
TA: Teaching path
LA: Line traveling path Second Embodiment 101: Traveling machine body
103: Mowing device
104: Discharge mechanism
104a: Discharge opening
104b: Discharge path
110: Detection device
111: Target line calculation unit
112: Autonomous traveling control device
141: Switching mechanism
142: Pressure sensor (pressure detecting means)
G: Clumped cut grass
LB: Target line Third Embodiment 201: Traveling machine body
210: Distance sensor 212: Decoding control unit
213: Travel mode determination unit
214: Object detection unit
215: Target distance calculation unit
216: Travel instruction unit
C: Travel control unit
ImC: Detected inclination angle
LG: Ground surface reference line
Lc: Grass candidate line
LK: Grass reference line
LM: Target distance
θ: Relative angle (inclination angle)
θ2: Calculated inclination angle Fourth Embodiment 301: Object detection unit
302: Attachment fixture
303: Mowing machine
315: Communication unit
316: Traveling path setting unit
317: Control instruction unit
318: Inclination correction control unit
321: Storage unit
334: Reflecting portion
336: Communication unit
338: Inclination sensor
339: Reflective sheet
ID: Inclination angle
LD: Line traveling path (traveling path)
TD: Teaching traveling route
TW: Detection signal
RW: Reflection signal

The invention claimed is:

1. An autonomous traveling work machine comprising:
a traveling machine body;
a positioning receiver configured to receive a positioning signal from a navigation satellite;
an autonomous traveling control device configured to perform autonomous traveling along a traveling path based on the positioning signal;
an inclination detection unit configured to detect inclination of the traveling machine body and output inclination angle information;
an inclination angle determination unit configured to determine an inclination angle based on the inclination angle information; and
a rotation control mechanism configured to rotate the positioning receiver with one or more degrees of freedom,
wherein the rotation control mechanism keeps the positioning receiver horizontal based on the inclination angle,
the traveling path includes a plurality of straight line traveling paths for autonomous traveling on a slope, and
the inclination angle determination unit determines, based on the inclination of the traveling machine body, the inclination angle by which the rotation control mechanism rotates the positioning receiver when the autonomous traveling work machine travels on a predetermined line traveling path among the plurality of straight line traveling paths, the inclination of the traveling machine body having been detected while the autonomous traveling work machine was traveling on a line traveling path among the plurality of line traveling paths on which line traveling path the autonomous traveling work machine traveled immediately before the autonomous traveling work machine travels on the predetermined line traveling path.

2. The autonomous traveling work machine according to claim 1,
wherein the rotation control mechanism is provided directly below the positioning receiver.

3. The autonomous traveling work machine according to claim 1,
wherein a shielding plate configured to cover an underside of the positioning receiver and block propagation of the positioning signal is provided.

4. The autonomous traveling work machine according to claim 1,
further comprising a traveling path setting unit configured to set a traveling path for the traveling machine body in advance,
wherein the traveling path setting unit generates a plurality of line traveling paths that are parallel with a teaching traveling route obtained by manual operation of the traveling machine body.

5. The autonomous traveling work machine according to claim 1,
further comprising a storage unit configured to store the inclination angle,
wherein the storage unit stores the traveling path and the inclination angle at each of a plurality of pre-set points on the traveling path,
the autonomous traveling control device performs autonomous traveling along the traveling path stored in the storage unit, and
the rotation control mechanism rotates the positioning receiver at timings when the traveling machine body passes the points.

6. The autonomous traveling work machine according to claim 1,
further comprising a communication unit configured to exchange information with an external unit,
wherein the traveling path and the inclination angle are transmitted to an external terminal via the communication unit and can be displayed by the external terminal.

7. An autonomous traveling work machine comprising:
a traveling machine body;
a positioning receiver configured to receive a positioning signal from a navigation satellite;
an autonomous traveling control device configured to perform autonomous traveling along a traveling path based on the positioning signal;
an inclination detection unit configured to detect inclination of the traveling machine body and output inclination angle information;
an inclination angle determination unit configured to determine an inclination angle based on the inclination angle information;
a rotation control mechanism configured to rotate the positioning receiver with one or more degrees of freedom; and
a traveling path setting unit configured to set a traveling path for the traveling machine body in advance,
wherein the traveling path setting unit generates a plurality of line traveling paths that are parallel with a teaching traveling route obtained by manual operation of the traveling machine body,
the inclination angle determination unit determines the inclination angle based on the inclination angle information detected along the teaching traveling route, and the rotation control mechanism rotates the positioning receiver at a timing before commencement of autonomous traveling on the line traveling paths.

8. An autonomous traveling work machine comprising:
a traveling machine body;
a positioning receiver configured to receive a positioning signal from a navigation satellite;
an autonomous traveling control device configured to perform autonomous traveling along a traveling path based on the positioning signal;
an inclination detection unit configured to detect inclination of the traveling machine body and output inclination angle information;
an inclination angle determination unit configured to determine an inclination angle based on the inclination angle information;
a rotation control mechanism configured to rotate the positioning receiver with one or more degrees of freedom; and
a traveling path setting unit configured to set a traveling path for the traveling machine body in advance,
wherein the traveling path setting unit generates a plurality of line traveling paths that are parallel with a teaching traveling route obtained by manual operation of the traveling machine body,
the inclination angle determination unit updates the inclination angle based on the inclination angle information detected along one of the line traveling paths, and
the rotation control mechanism rotates the positioning receiver at a timing before commencement of autonomous traveling along a subsequent line traveling path.

* * * * *